(12) United States Patent
Miyazaki et al.

(10) Patent No.: US 9,465,531 B2
(45) Date of Patent: Oct. 11, 2016

(54) INFORMATION PROCESSING APPARATUS, DISPLAY CONTROL METHOD, AND DISPLAY CONTROL PROGRAM FOR CHANGING SHAPE OF CURSOR DURING DRAGGING OPERATION

(75) Inventors: Reiko Miyazaki, Tokyo (JP); Tatsushi Nashida, Kanagawa (JP)

(73) Assignee: Line Corporation, Tokyo (JP)

( * ) Notice: Subject to any disclaimer, the term of this patent is extended or adjusted under 35 U.S.C. 154(b) by 367 days.

(21) Appl. No.: 13/187,099

(22) Filed: Jul. 20, 2011

(65) Prior Publication Data
US 2012/0030636 A1 Feb. 2, 2012

(30) Foreign Application Priority Data

Jul. 30, 2010 (JP) ................................ 2010-172893

(51) Int. Cl.
| | |
|---|---|
| G06F 3/00 | (2006.01) |
| G06F 3/0488 | (2013.01) |
| G06F 3/0481 | (2013.01) |
| G06F 3/01 | (2006.01) |

(52) U.S. Cl.
CPC ......... *G06F 3/0488* (2013.01); *G06F 3/04812* (2013.01)

(58) Field of Classification Search
USPC ........ 715/863, 702, 745, 707, 835; 345/173, 345/174, 647
See application file for complete search history.

(56) References Cited

U.S. PATENT DOCUMENTS

| | | | |
|---|---|---|---|
| 5,347,589 A * | 9/1994 | Meeks et al. ................. | 382/119 |
| 5,434,956 A * | 7/1995 | Son et al. ..................... | 358/1.5 |
| 5,611,036 A * | 3/1997 | Berend et al. ................ | 345/441 |
| 6,677,965 B1 | 1/2004 | Ullmann et al. | |
| 7,656,406 B1 * | 2/2010 | Bartell et al. ................ | 345/441 |
| 7,728,818 B2 * | 6/2010 | Yu et al. ...................... | 345/172 |
| 8,427,445 B2 * | 4/2013 | Kennedy ...................... | 345/173 |
| 2004/0196267 A1 * | 10/2004 | Kawai et al. ................ | 345/173 |
| 2006/0007123 A1 * | 1/2006 | Wilson et al. ............... | 345/156 |
| 2006/0041847 A1 * | 2/2006 | Maw ............................ | 715/793 |
| 2006/0129933 A1 * | 6/2006 | Land et al. .................. | 715/723 |
| 2006/0132460 A1 * | 6/2006 | Kolmykov-Zotov et al. ......................... | 345/173 |
| 2006/0244719 A1 * | 11/2006 | Brigham et al. ............. | 345/156 |
| 2007/0146341 A1 | 6/2007 | Medler et al. | |

(Continued)

FOREIGN PATENT DOCUMENTS

| | | |
|---|---|---|
| CN | 101727230 A | 6/2010 |
| DE | 102005047650 A1 | 4/2007 |

(Continued)

OTHER PUBLICATIONS

Jan. 28, 2014, Japanese Office Action for related JP application No. 2010-172893.
Oshige, Lingo Super Manual—Correspondence to DIRECTOR8—First Version Macromedia DIRECTOR8 Shockwave Studio, Japan, Ohmsha, Ltd, Masatsugu Sato, Sep. 19, 2000, First Version, p. 193-210.

(Continued)

*Primary Examiner* — Toan Vu
(74) *Attorney, Agent, or Firm* — Paratus Law Group, PLLC

(57) ABSTRACT

An information processing apparatus includes: an operation unit; and a control unit performing a process corresponding to dragging and displaying, on a display unit, a cursor which elongates from a start point of the dragging to an end point of the dragging and of which at least one of a size and a shape is different at one end portion, which is on a side of the start point of the dragging, and at the other end portion, which is on a side of the end point of the dragging, when the dragging is executed through the operation unit.

16 Claims, 27 Drawing Sheets

(56) References Cited

U.S. PATENT DOCUMENTS

| | | |
|---|---|---|
| 2007/0176893 A1 | 8/2007 | Sato |
| 2007/0273663 A1* | 11/2007 | Park et al. .................... 345/173 |
| 2007/0273666 A1* | 11/2007 | Shin et al. .................... 345/173 |
| 2008/0180410 A1* | 7/2008 | McCall et al. ................ 345/179 |
| 2008/0224998 A1* | 9/2008 | Lo et al. ....................... 345/157 |
| 2009/0077488 A1* | 3/2009 | Ording .......................... 715/784 |
| 2009/0213086 A1* | 8/2009 | Chae et al. ................... 345/173 |
| 2009/0284532 A1* | 11/2009 | Kerr et al. .................... 345/442 |
| 2009/0313567 A1* | 12/2009 | Kwon et al. .................. 715/769 |
| 2010/0088634 A1* | 4/2010 | Tsuruta et al. ............... 715/800 |
| 2010/0156789 A1* | 6/2010 | Aymeric et al. .............. 345/161 |
| 2010/0299638 A1* | 11/2010 | Choi ............................. 715/835 |
| 2011/0010619 A1* | 1/2011 | Brown .......................... 715/702 |
| 2011/0016390 A1* | 1/2011 | Oh et al. ....................... 715/702 |
| 2011/0055753 A1* | 3/2011 | Horodezky et al. .......... 715/810 |
| 2011/0061021 A1* | 3/2011 | Kang et al. ................... 715/800 |
| 2011/0107275 A1* | 5/2011 | Kuo et al. ..................... 715/856 |

FOREIGN PATENT DOCUMENTS

| | | |
|---|---|---|
| EP | 1942401 A1 | 7/2008 |
| EP | 2144148 A2 | 1/2010 |
| JP | 2002-328040 | 11/2002 |
| JP | 2006-24039 | 1/2006 |
| JP | 2006-99178 | 4/2006 |
| JP | 2006-314349 | 11/2006 |

OTHER PUBLICATIONS

Aug. 25, 2015, CN communication issued for related CN application No. 201110217351.4.

Mar. 20, 2015, Cn communication issued for related Cn application no. 201110217351.4.

Nov. 2, 2015, EP communication issued for related EP application No. 11172838.2.

* cited by examiner

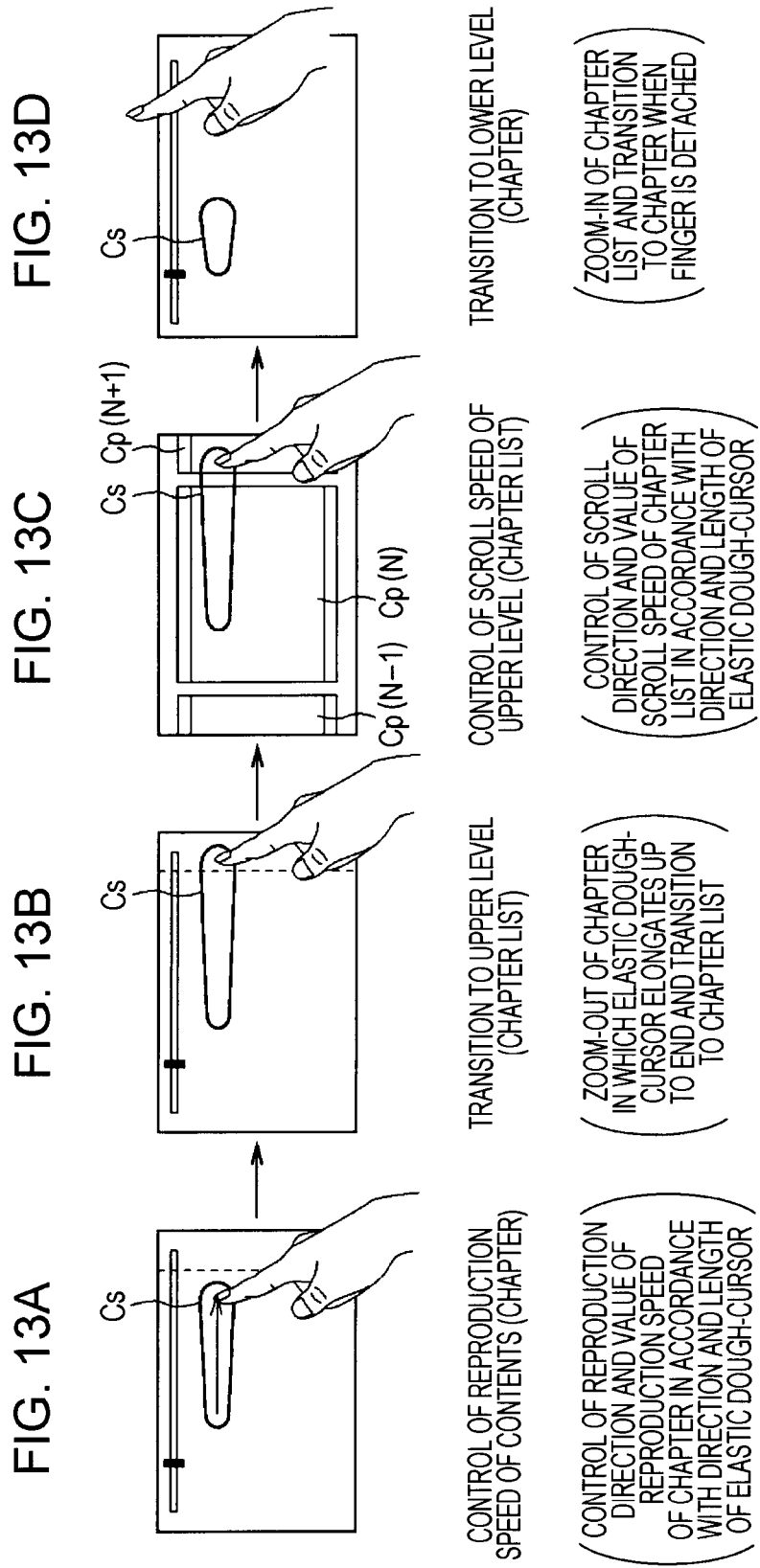

ADJUSTMENT OF PARAMETER (VOLUME)

(CONTROL OF VALUE OF ADJUSTMENT DIRECTION AND ADJUSTMENT SPEED OF VOLUME IN ACCORDANCE WITH DIRECTION AND LENGTH OF ELASTIC DOUGH-CURSOR)

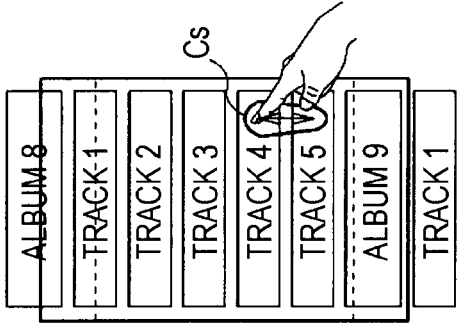
FIG. 16A / FIG. 16B / FIG. 16C / FIG. 16D
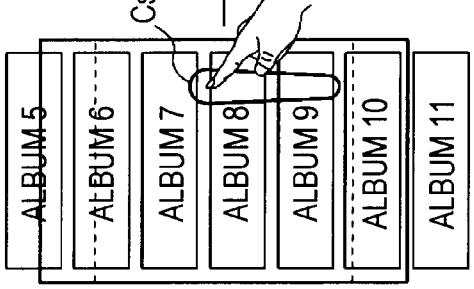
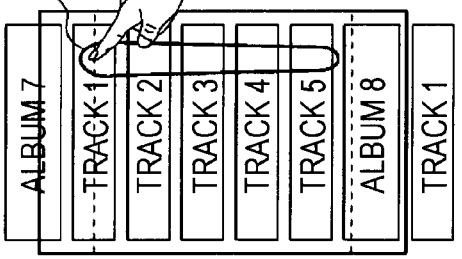
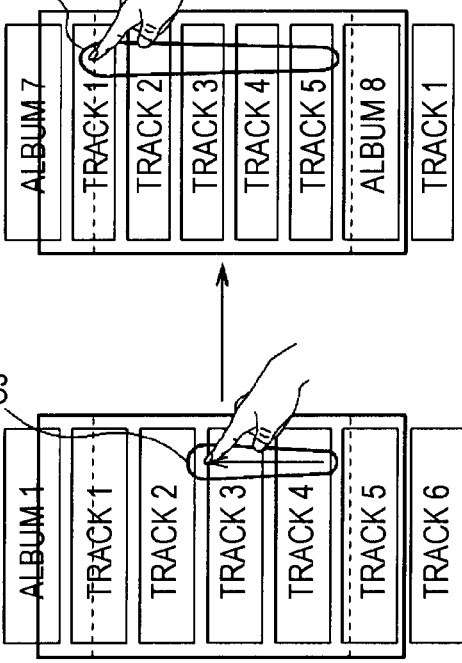

SETTING OF ZOOM CENTER (SETTING OF LONG-PRESSED POSITION AS ZOOM CENTER AND DISPLAY OF ELASTIC DOUGH-CURSOR AT LONG-PRESSED POSITION)

ADJUSTMENT OF ZOOM RATE (CONTROL OF ADJUSTMENT DIRECTION OF ZOOM RATE AND VALUE OF ADJUSTMENT SPEED IN ACCORDANCE WITH DIRECTION AND LENGTH OF ELASTIC DOUGH-CURSOR)

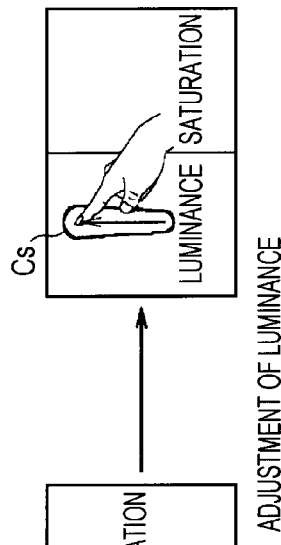
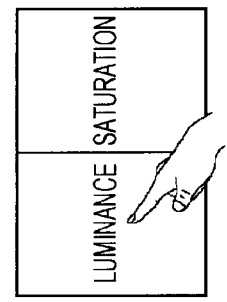
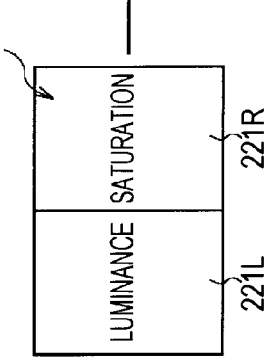
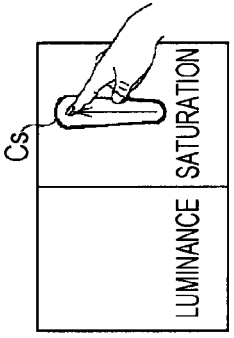
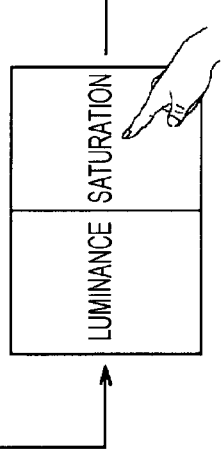

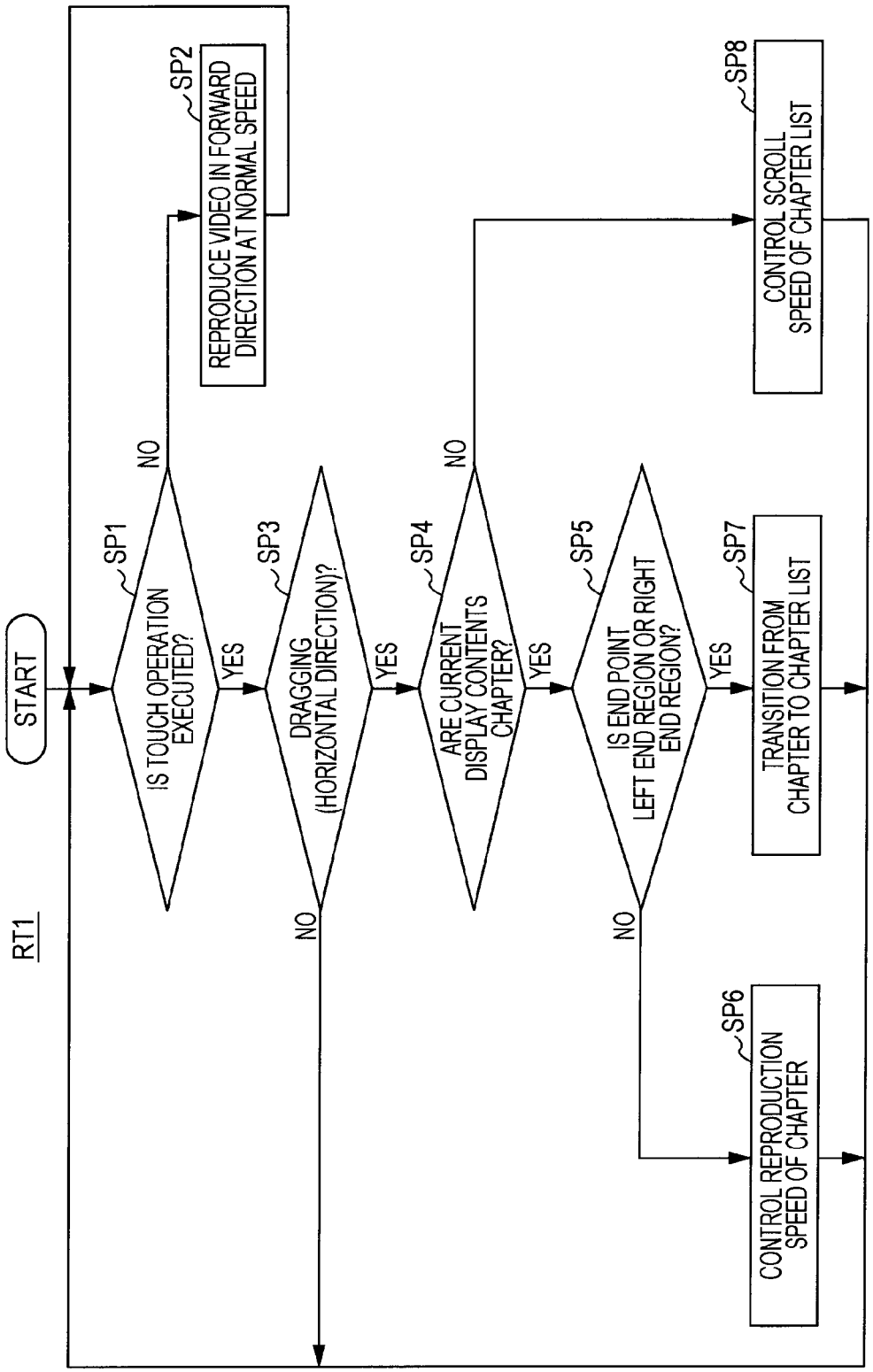

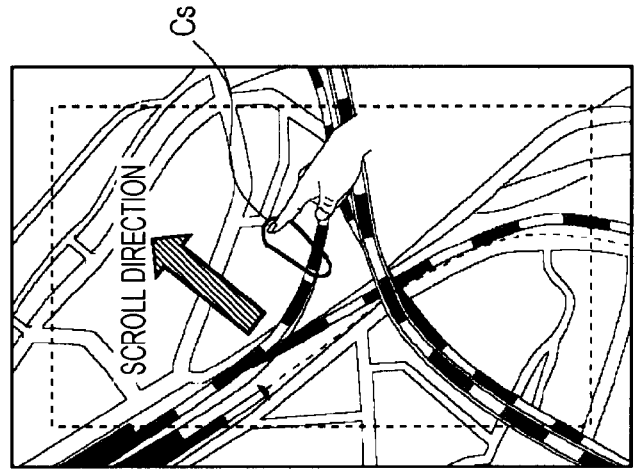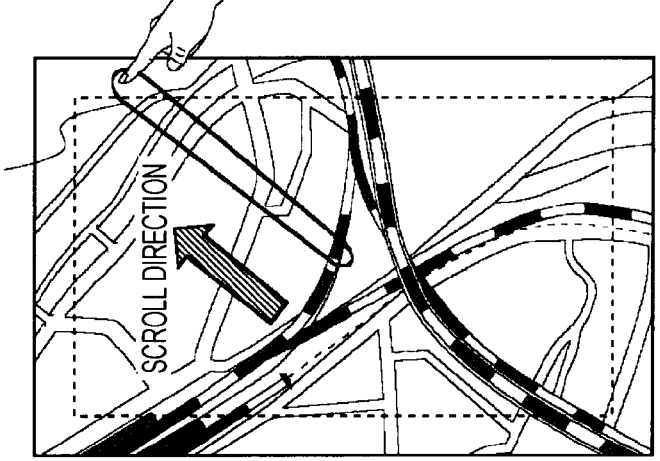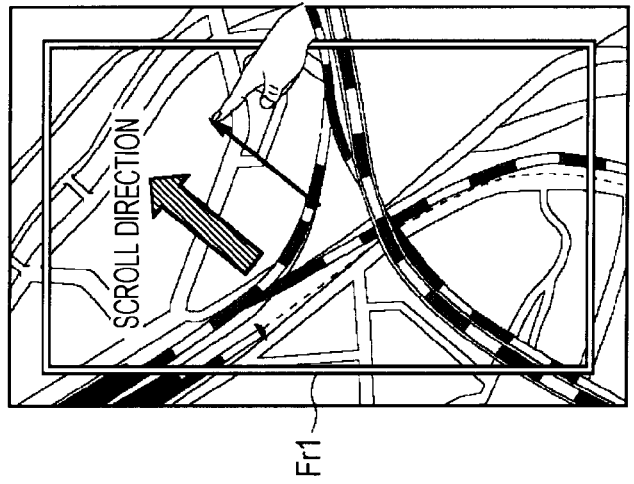

SETTING OF ZOOM CENTER (SETTING OF TAPPED POSITION AS ZOOM CENTER AND DISPLAY OF ELASTIC DOUGH-CURSOR AT TAPPED POSITION)

ADJUSTMENT OF ZOOM RATE (CONTROL OF ADJUSTMENT DIRECTION OF ZOOM RATE AND VALUE OF ADJUSTMENT SPEED IN ACCORDANCE WITH DIRECTION AND LENGTH OF ELASTIC DOUGH-CURSOR)

INFORMATION PROCESSING APPARATUS, DISPLAY CONTROL METHOD, AND DISPLAY CONTROL PROGRAM FOR CHANGING SHAPE OF CURSOR DURING DRAGGING OPERATION

BACKGROUND

The present disclosure relates to an information processing apparatus, a display control method, and a display control program, and more particularly, to an information processing apparatus capable of performing an input operation, for example, by an intuitive operation such as dragging.

In recent years, information processing apparatuses with various operation devices have come into wide use. For example, in information processing apparatuses with a touch screen, an intuitive operation can be executed by touch operations (touching, tapping, dragging, flicking, and the like) on a screen.

As such information processing apparatuses, for example, there have been suggested navigation apparatuses capable of changing the scale on a map displayed on a screen in response to dragging (for example, see Japanese Unexamined Patent Application Publication No. 2002-328040).

SUMMARY

A lot of information processing apparatuses according to the related art execute processing in accordance with the direction and length of dragging. For example, the processing is executed in accordance with the positions of a start point and an end point of dragging, the distance between the start point and the end point, a direction from the start point to the end point, and the like.

Here, when dragging is executed while allowing a user to recognize the positions of a start point and an end point of dragging, the distance between the start point and the end point, and the direction from the start point to the end point, it is considered that operability can be dramatically improved.

It is desirable to provide an information processing apparatus, a display control method, and a display control program capable of further improving operability in executing an input operation by dragging.

According to an embodiment of the disclosure, there is provided an information processing apparatus including: an operation unit; and a control unit performing a process corresponding to dragging and displaying, on a display unit, a cursor which elongates from a start point of the dragging to an end point of the dragging and of which at least one of a size and a shape is different at one end portion, which is on a side of the start point of the dragging, and at the other end portion, which is on a side of the end point of the dragging, when the dragging is executed through the operation unit.

Thus, since the cursor elongates from the start point to the end point of the dragging, the user can recognize the distance between the start point and the end point of the dragging. Further, since at least one of the size or shape of the cursor is different at the one end portion, which is on the side of the start point of the dragging, and at the other end portion, which is on the side of the end point of the dragging, the user can distinguish the side of the start point of the dragging from the side of the end point of the dragging in the cursor. As a consequence, the user can recognize the direction from the start point to the end point of the dragging and the positions of the start point and the end point. According to the embodiment of the disclosure, the user can execute the dragging, while recognizing the positions of the start point and the end point of the dragging, the distance between the start point and the end point, and the direction from the start point to the end point.

According to the embodiments of the disclosure, it is possible to execute dragging while allowing a user to recognize the positions of a start point and an end point of dragging, the distance between the start point and the end point, and the direction from the start point to the end point. Thus, it is possible to realize an information processing apparatus, a display control method, and a display control program capable of further improving operability in executing an input operation by dragging.

BRIEF DESCRIPTION OF THE DRAWINGS

FIGS. 13A to 13D are schematic diagrams illustrating an example of an input operation (1) executed with the elastic dough-cursor in a video reproduction app.

FIGS. 16A to 16D are schematic diagrams illustrating an example of an input operation executed with the elastic dough-cursor in a music reproduction app.

FIGS. 19A to 19E are schematic diagrams illustrating an example of an input operation (2) executed with the elastic dough-cursor in the still image reproduction app.

FIG. 20 is a flowchart illustrating an input operation processing sequence (1).

FIGS. 26A to 26C are schematic diagrams illustrating an example of an input operation executed with the elastic dough-cursor in a map display app.

DETAILED DESCRIPTION OF EMBODIMENTS

Hereinafter, preferred embodiments (hereinafter, referred to as embodiments) of the disclosure will be described.

The description will be made in the following order.
1. Overview of Embodiments
2. First Embodiment
3. Second Embodiment
4. Other Embodiments

1. OVERVIEW OF EMBODIMENTS

First, the overview of the embodiments will be described. After the overview of the embodiments is described, a first embodiment, a second embodiment, and other embodiments will be described in sequence.

Figure 1:
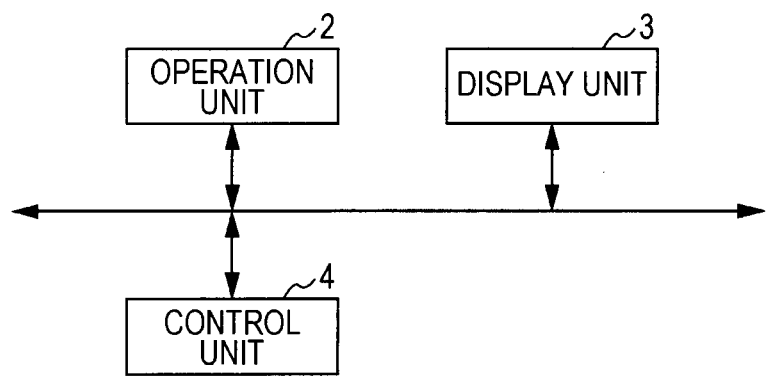
FIG. 1 is a block diagram illustrating the overview of the functional configuration of an information processing apparatus according to embodiments.

In FIG. 1, Reference Numeral 1 denotes an information processing apparatus. The information processing apparatus 1 includes an operation unit 2. The information processing apparatus 1 further includes a control unit 4 that performs a process corresponding to the dragging and displays, on a display unit 3, a cursor which elongates from a start point of the dragging to an end point of the dragging and of which at least one of a size and a shape is different at one end portion, which is on a side of the start point of the dragging, and at the other end portion, which is on a side of the end point of the dragging, when the dragging is executed through the operation unit 2.

Thus, since the cursor elongates from the start point to the end point of the dragging, the user can recognize the distance between the start point and the end point of the dragging. Further, since at least one of the size or shape of the cursor is different at the one end portion, which is on the side of the start point of the dragging, and at the other end portion, which is on the side of the end point of the dragging, the user can distinguish the side of the start point of the dragging from the side of the end point of the dragging in the cursor. As a consequence, the user can recognize the direction from the start point to the end point of the dragging and the positions of the start point and the end point. Accordingly, in the information processing apparatus 1, the user can execute the dragging, while recognizing the positions of the start point and the end point of the dragging, the distance between the start point and the end point, and the direction from the start point to the end point.

More specifically, the control unit 4 may display the cursor with the shape thickening from the one end portion to the other end portion.

The control unit 4 may display the cursor with a shape connecting a first circle that has the start point of the dragging as a center to a second circle that is larger than the first circle and has the end point of the dragging as a center.

The control unit 4 may also thin the cursor, as the cursor is longer. In this case, the control unit 4 may also thin the cursor so that a display area of the cursor keeps constant, as the cursor is longer.

The control unit 4 may also display the cursor in response to the dragging and change the color of the cursor when the process is newly changed.

The control unit 4 may also display the cursor in response to the dragging and change the color of the cursor in response to the change in at least one of the direction from the one end portion of the displayed cursor to the other end portion of the displayed cursor and the length of the cursor.

The control unit 4 may also change transmittance of the cursor in response to the change in the length of the cursor.

The control unit 4 may also shrink and delete the cursor, when the dragging ends. In this case, when the dragging ends, the control unit 4 may shrink the cursor, display an animation effect of bouncing an elastic portion, and delete the cursor.

A specific example of the information processing apparatus 1 with the above-described configuration will be described in detail below.

2. FIRST EMBODIMENT 2-1. Outer Appearance Configuration of Portable Terminal

Figure 2:
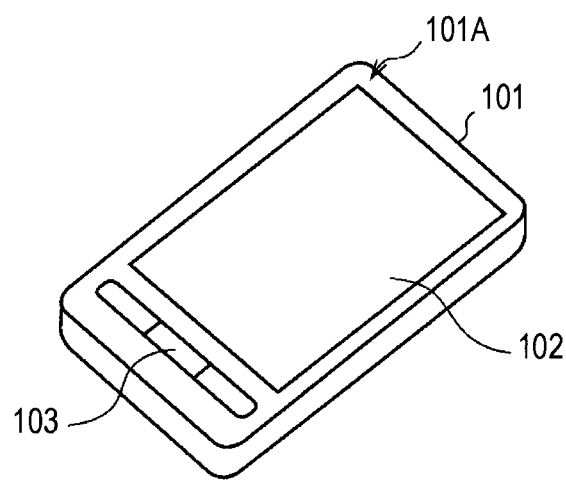
FIG. 2 is a schematic diagram illustrating the outer appearance of a portable terminal.

Next, the first embodiment will be described. The outer appearance configuration of a portable terminal 100 will be first described as a specific example of the information processing apparatus 1 described above with reference to FIG. 2.

The portable terminal 100 has a chassis 101 with a substantially flat rectangular shape of a size to be grasped with one hand.

A rectangular touch screen 102 is installed in the middle of the front surface 101A of the chassis 101. The touch screen 102 includes a liquid crystal panel and a transparent touch panel with a thin shape covering the display surface of the liquid crystal panel. For example, the touch panel is an electrostatic capacity-type touch panel.

The portable terminal 100 is configured to receive a touch operation executed on the touch screen 102 with a finger (touch pen or the like can be used) as an input operation of a user.

An operation button 103 is also installed near the touch screen 102 on the front surface 101A of the chassis 101 of the portable terminal 100.

The rectangular touch screen 102 of the portable terminal 100 is configured so as to be used in a vertically long direction (which is also referred to as a vertical direction) and a horizontally long direction (which is also referred to as a horizontal direction).

2-2. Hardware Configuration of Portable Terminal

Figure 3:
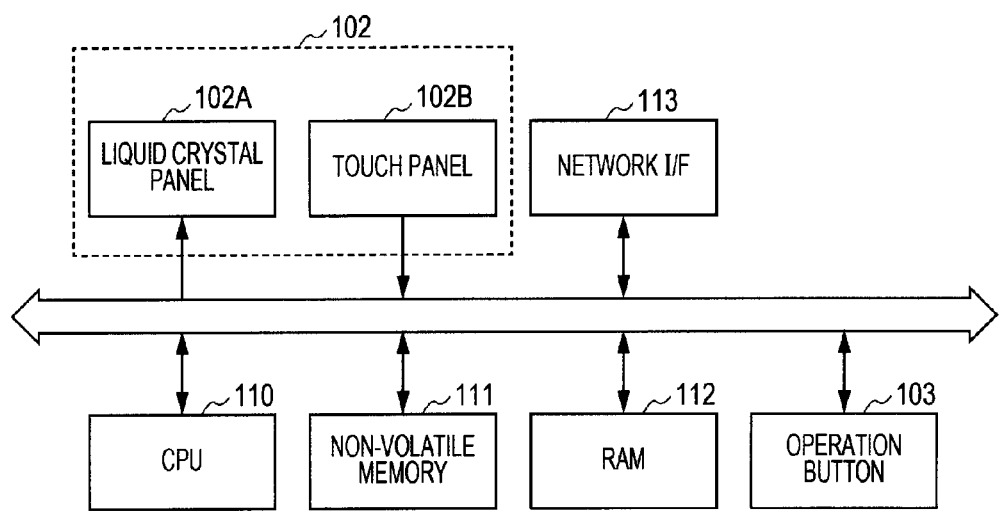
FIG. 3 is a block diagram illustrating the hardware configuration of the portable terminal.

Next, the hardware configuration of the portable terminal 100 will be described with reference to FIG. 3. In the portable terminal 100, a CPU 110 develops and reads a program stored in a non-volatile memory 111 into a RAM 112, executes various kinds of processes in accordance with the program, and controls each unit. A central processing unit is abbreviated to a CPU and a random Access Memory is abbreviated to a RAM.

The touch screen 102 includes a liquid crystal panel 102A that is a display device displaying various kinds of information and a touch panel 102B that is an input operation device receiving an input operation.

The touch panel 102B detects the coordinates of a touched position (that is, a touch position) when an arbitrary position on the touch panel 102B is touched with a finger. The touch panel 102B transmits an input signal indicating the coordinates of the touch position to the CPU 110.

The touch panel 102B is configured to transmit, to the CPU 110, the input signal indicating the coordinates of the touch position at a constant time interval while a touch operation such as dragging continues.

When the CPU 110 acquires the coordinates of the touch position from the input signal transmitted from the touch panel 102B, the CPU 110 converts the coordinates of the touch position into the screen coordinates of the liquid crystal panel 102A to recognize which position is touched on the screen of the liquid crystal panel 102A. That is, the CPU 110 recognizes the touch position on the screen.

Moreover, the CPU 110 sequentially converts the coordinates of the touch positions acquired from the input signals transmitted at the constant time interval into the screen coordinates of the liquid crystal panel 102A to recognize how the touch positions are moved (that is, the trajectory of the touch positions).

The CPU 110 specifies which touch operation is executed on the screen based on the recognized touch positions and the trajectory of the touch positions, receives the touch operation as an input operation, and performs a process in accordance with the input operation.

The CPU 110 is configured to receive touch operations such as touching, tapping, dragging, and flicking as input operations.

When the CPU 110 recognizes a pressing operation of pressing down the operation button 103, the CPU 110 receives the pressing operation as an input operation of the user and performs a process in accordance with the input operation.

For example, it is supposed that the user taps a desired thumbnail when a thumbnail list of images stored as image files in the non-volatile memory 111 is displayed on the touch screen 102.

The CPU 110 receives this touch operation as an input operation of reproducing an image and thus reads the image file corresponding to the tapped thumbnail from the non-volatile memory 111.

Here, when the corresponding image file is a still image file, the CPU 110 extracts still image data from the still image file. The CPU 110 obtains a still image signal by performing predetermined reproduction processes, such as a decoding process and a digital analog conversion process, on the still image data and displays the result on the liquid crystal panel 102A of the touch screen 102.

On the other hand, when the corresponding image file is a video file, the CPU 110 separates video data and audio data from the video file. Then, the CPU 110 obtains a video signal by performing predetermined reproduction processes, such as a decoding process and digital analog conversion process, on the video data and displays the result on the liquid crystal panel 102A of the touch screen 102. In addition, the CPU 110 obtains an audio signal by performing predetermined reproduction processes, such as a decoding process, a digital analog conversion process, and an amplification process, on the audio data and outputs the result from a headphone terminal (not shown).

Thus, the portable terminal 100 is configured to reproduce an image designated by the user.

For example, it is supposed that the user taps a desired title when the list of music (track) titles stored as music files in the non-volatile memory 111 is displayed on the touch screen 102.

The CPU 110 receives the touch operation as an input operation of reproducing music and reads a music file corresponding to the tapped title from the non-volatile memory 111.

The CPU 110 extracts audio data from the music file. Then, the CPU 110 obtains an audio signal by performing predetermined reproduction processes, such as a decoding process, a digital analog conversion process, and an amplification process, on the audio data and outputs the result to a headphone terminal (not shown).

Thus, the portable terminal 100 is configured to reproduce the music designated by the user.

At this time, the CPU 110 extracts association information such as a jacket image, a track title, an album title, and an artist name from the read music file and displays the association information on the liquid crystal panel 102A of the touch screen 102.

Thus, the portable terminal 100 is configured to reproduce the music designated by the user and display information regarding the music.

In the portable terminal 100, the CPU 110 manages the music file so as to have a hierarchical structure in which the album title is set as an upper level and the track title is set as a lower level based on the association information regarding each music file.

For example, it is supposed that the user taps an icon for activating a Web browser when this icon is displayed on the touch screen 102.

The CPU 110 receives this touch operation as an input operation of activating the Web browser and activates the Web browser by reading a program for the Web browser from the non-volatile memory 111 and executing the program.

Here, the CPU 110 displays a screen for the Web browser on the liquid crystal panel 102A of the touch screen 102 and receives page data regarding Web pages from a server on a network via the network interface 113. Then, the CPU 110 displays page images which are based on the page data on the screen for the Web browser.

Thus, the portable terminal 100 is configured to activate the Web browser and display the Web pages.

Further, the portable terminal 100 is mounted with a user interface capable of executing various kinds of input operations only with dragging which is one of the touch operations.

Specifically, in the portable terminal 100, various kinds of input operations can match information (hereinafter, also referred to as dragging information) regarding the positions of a start point and an end point of the dragging, a direction from the start point to the end point, and a distance between the start point and the end point.

Here, the start point of the dragging refers to a touch position (that is, an initial touch position) when the dragging starts. The end point of the dragging refers to a current touch position after the dragging starts. That is, during the dragging, the start point is fixed and the end point is moved with the movement of a finger. Hereinafter, the positions of the start point and the end point of the dragging are referred to as start/end point positions, the direction from the start point to the end point of the dragging is referred to as a start/end point direction, and the distance between the start point and the end point of the dragging is referred to as a start/end point distance.

When the dragging is actually executed, the CPU 110 obtains the dragging information regarding the start/end point positions, the start/end point direction, the start/end point distance, and the like from the dragging and receives an input operation which matches the dragging information.

Thus, the portable terminal 100 is configured to execute various kinds of input operations by changing the start/end point positions, the start/end point direction, the start/end distance, and the like only with the dragging.

In order to achieve good operability using the user interface, it is preferable that the user can easily recognize the start/end point positions, the start/end point direction, and the start/end point distance of the dragging.

Figure 4:
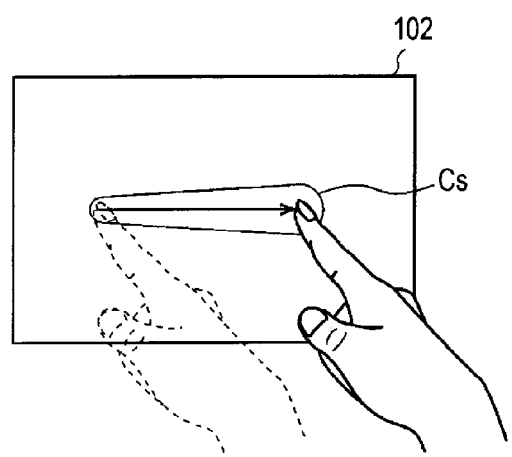
FIG. 4 is a schematic diagram illustrating the display of an elastic dough-cursor.

As shown in FIG. 4, the portable terminal 100 is configured to display a cursor Cs visually expressing the start/end point positions, the start/end point direction, and the start/end distance on the touch screen 102 when the dragging is executed.

The cursor Cs elongates like elastic dough (Japanese rice dough) from the start point to the end point of the dragging and changes its direction (direction in which the cursor elongates) and its length to follow the dragging with the movement of the end point of the dragging. Moreover, this cursor Cs is referred below to as an elastic dough-cursor Cs in that the cursor Cs extends and contracts in response to the dragging like elastic dough.

By displaying the elastic dough-cursor Cs, the portable terminal 100 can allow the user to easily recognize the start/end point positions, the start/end point direction, and the start/end point distance of the dragging.

The elastic dough-cursor Cs and an input operation executed with the elastic dough-cursor Cs will be described in more detail below.

A specific hardware example of the operation unit 2 of the information processing apparatus 1 described in the overview of the embodiments is the touch panel 102B of the portable terminal 100 described above. A specific hardware example of the display unit 3 of the information processing apparatus 1 is the liquid crystal penal 102A of the portable terminal 100. A specific hardware example of the control unit 4 of the information processing apparatus 1 is the CPU 110 of the portable terminal 100.

2-3. Input Operation Executed with Elastic Dough-Cursor 2-3-1. Basic Operation

Figure 5A:
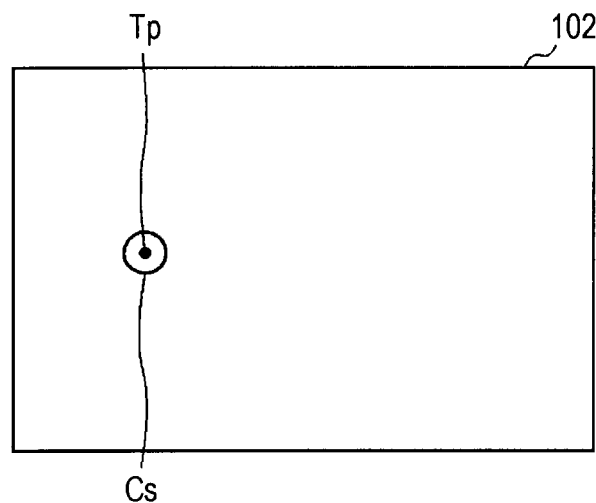
FIGS. 5A and 5B are schematic diagrams illustrating the shape of the elastic dough-cursor.

When the user touches the touch screen 102 with his or her finger, as shown in FIG. 5A, the CPU 110 displays the elastic dough-cursor Cs with a circle shape having a touch position Tp at its center on the touch screen 102.

Figure 5B:
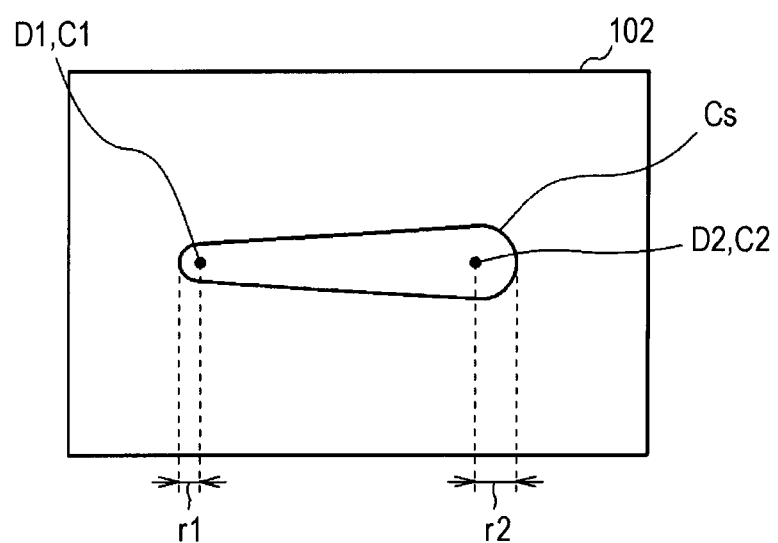

Thereafter, when the user continues dragging without detaching his or her finger, as shown in FIG. 5B, the CPU 110 elongates the elastic dough-cursor Cs from a start point D1 (that is, the initial touch position Tp) of the dragging to an end point D2 (the current touch position).

Then, the portable terminal 100 can allow the user to recognize that the touch operation is received as the dragging and can perform the dragging so that the user has a sensation of directly elongating the elastic dough-cursor Cs with his or her finger.

When the elastic dough-cursor Cs elongates from the start point D1 to the end point D2 of the dragging in this way, the user is allowed to recognize the distance (the start/end point distance) between the start point D1 and the end point D2 of the dragging.

Hereinafter, it is supposed that the position corresponding to the start point D1 of the dragging in the elastic dough-cursor Cs is a start point C1 of the elastic dough-cursor Cs and the position corresponding to the end point D2 of the dragging in the elastic dough-cursor Cs is an end point C2 of the elastic dough-cursor Cs. That is, the elastic dough-cursor Cs is configured to elongate from the start point C1 corresponding to the start point D1 of the dragging to the end point C2 corresponding to the end point D2 of the dragging.

The elastic dough-cursor Cs has a shape thickening from the start point C1 to the end point C2. That is, the shape of the elastic dough-cursor Cs near the start point C1 is the thinnest and the shape of the elastic dough-cursor Cs near the end point C2 is the thickest.

By displaying the elastic dough-cursor Cs with such a shape, the user can distinguish the start point D1 from the end point D2 in the elastic dough-cursor Cs. As a consequence, the user can recognize the direction (that is, the start/end point direction) from the start point D1 to the end point D2 of the dragging. Further, the user can recognize the position (that is, the start/end point positions) of the start point D1 and the end point D2 of the dragging.

During the dragging, the start point C1 of the elastic dough-cursor Cs corresponding to the start point D1 of the dragging is fixed, whereas the end point C2 of the elastic dough-cursor Cs corresponding to the end point D2 of the dragging moves and follows the movement of the finger. Thus, the portable terminal 100 can perform the dragging, while allowing the user to recognize the start/end point distance, the start/end point direction, and the start/end point positions of the dragging.

In the elastic dough-cursor Cs, an end portion of the start point C1 is a semi-circle with a radius r1 having the start point C1 as its center. In this way, the user can recognize that the center of the semi-circle is the position of the start point D1 of the dragging. Thus, the user can more clearly recognize the position of the start point D1 of the dragging.

Likewise, in the elastic dough-cursor Cs, the end portion of the end point C2 is a semi-circle with a radius r2 having the end point C2 as its center. In this way, the user can recognize that the center of the semi-circle is the position of the end point D2 of the dragging. Thus, the user can more clearly recognize the position of the end point D2 of the dragging as well.

The radius r2 at the end point C2 is set to be larger than the radius r1 at the start point C1 so that the elastic dough-cursor Cs gradually thickens from the start point C1 to the end point C2. Thus, the elastic dough-cursor Cs has a shape in which a circle of the radius r1 having the start point C1 as its center is connected to a circle of the radius r2, which is larger than the radius r1, having the end point C2 as its center.

Moreover, the CPU 110 displays the elastic dough-cursor Cs in a translucent manner so that the background image to the elastic dough-cursor Cs can be viewed transparently.

When the user detaches his or her finger from the touch screen 102 and thus the dragging ends, the CPU 110 shrinks the end point C2 of the elastic dough-cursor Cs toward the start point C1 of the elastic dough-cursor Cs until the elastic dough-cursor Cs becomes a circle shape, and then deletes the elastic dough-cursor Cs on the screen.

The CPU 110 receives various kinds of input operations in accordance with the positions of the start point C1 and the end point C2 of the elastic dough-cursor Cs, the direction from the start point C1 to the end point C2, the distance between the start point C1 and the end point C2, and the like.

Hereinafter, it is supposed that the direction from the start point C1 to the end point C2 of the elastic dough-cursor Cs is the direction of the elastic dough-cursor Cs and the distance between the start point C1 of the elastic dough-cursor Cs and the end point C2 is the length of the elastic dough-cursor Cs.

For example, the CPU 110 controls the reproduction speed of a video in response to an input operation executed with the elastic dough-cursor Cs.

Figure 6:
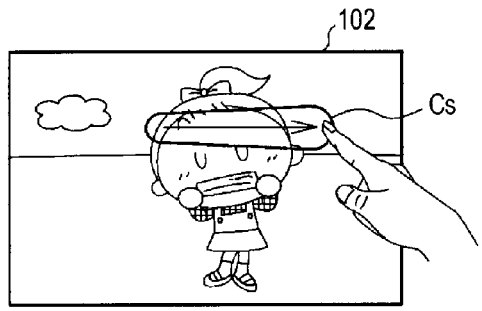
FIG. 6 is a schematic diagram illustrating the control (1) of a reproduction speed.

In effect, the CPU 110 reproduces a video in a forward direction at a normal speed and displays the video in a horizontally long direction with respect to the horizontal touch screen 102, for example, as shown in FIG. 6.

For example, it is supposed that dragging is executed in a horizontal direction of the screen. Then, the CPU 110 displays the elastic dough-cursor Cs elongating horizontally from the start point to the end point of the dragging in response to the dragging on the screen.

Figure 7A:
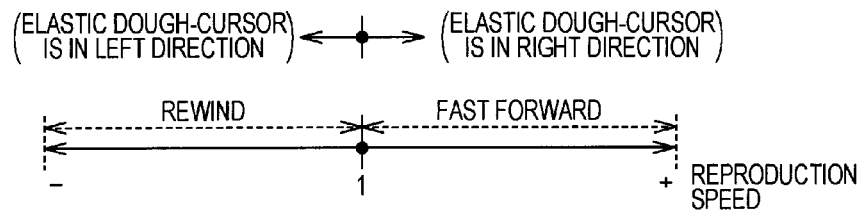
FIGS. 7A to 7C are schematic diagrams illustrating the control (2) of a reproduction speed.

When the direction of the elastic dough-cursor Cs is a right direction, as shown in FIG. 7A, the CPU 110 sets the sign of the reproduction speed to "+" (that is, the reproduction direction is the forward direction) and reproduces the video in the forward direction at a speed faster than the normal speed (that is, performs fast forward). On the other hand, when the direction of the elastic dough-cursor Cs is a left direction, the CPU 110 sets the sign of the reproduction speed to "−" (that is, the reproduction is a backward direction) and reproduces the video in the backward direction at a speed faster than the normal speed (that is, performs rewind).

Figure 8:
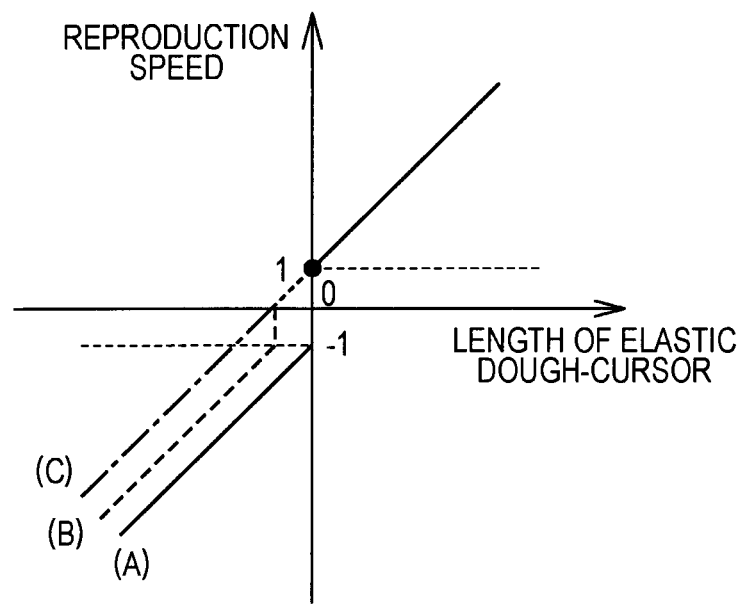
FIG. 8 is a schematic diagram illustrating the control (3) of a reproduction speed.

As shown in part A of FIG. 8, the CPU 110 sets the value of the reproduction speed to a larger value, as the length of the elastic dough-cursor Cs is longer. After the graph shown in FIG. 8, it is supposed that the sign of the length of the elastic dough-cursor Cs is set to "+" when the direction of the elastic dough-cursor Cs is the right (or the upper) direction, whereas the sign of the length of the elastic dough-cursor Cs is set to "−" when the direction of the elastic dough-cursor Cs is the left (or lower) direction.

Thus, the portable terminal 100 allows the user to view the start/end point direction and the start/end point distance of the dragging using the elastic dough-cursor Cs and can perform fast forward or rewind to display the video at a desired reproduction speed by an input operation executed with the elastic dough-cursor Cs.

Thereafter, when the user detaches his or her finger from the touch screen 102 and thus the dragging ends, the CPU 110 shrinks the elastic dough-cursor Cs and deletes the elastic dough-cursor Cs from the screen. Simultaneously, the CPU 110 again reproduces the video in the forward direction at the normal speed.

Figure 7B:
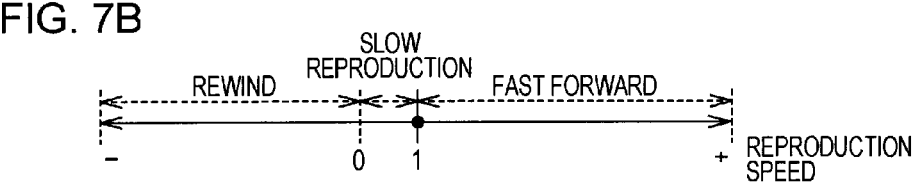

As shown in FIG. 7B and part B of FIG. 8, a reproduction mode of reproducing the video slowly (that is, reproducing the video at a speed slower than the normal speed in the forward direction) may be separately provided in response to an input operation executed with the elastic dough-cursor Cs.

In this case, when the direction of the elastic dough-cursor Cs is the right direction, as in the case described with reference to FIG. 7A and part A of FIG. 8, the CPU 110 reproduces the video at a speed faster than the normal speed in the forward direction (that is, performs fast forward). At this time, the CPU 110 sets the value of the reproduction speed to be larger, as the length of the elastic dough-cursor Cs is longer.

On the other hand, when the direction of the elastic dough-cursor Cs is the left direction and the length of the elastic dough-cursor Cs is less than a predetermined value, the CPU 110 reproduces the video at a speed slower than the normal speed in the forward direction reproduces (performs slow reproduction). At this time, the CPU 110 sets the value of the reproduction speed to be smaller (that is, sets the reproduction speed of the slow reproduction slower), as the length of the elastic dough-cursor Cs is longer.

When the direction of the elastic dough-cursor Cs is the left direction and the length of the elastic dough-cursor Cs is equal to or greater than the predetermined value, the CPU 110 reproduces the video in the backward direction at a speed faster than the normal speed (that is, performs rewind). At this time, the CPU 110 sets the value of the reproduction speed to be larger (that is, sets the reproduction speed of the rewind faster), as the length of the elastic dough-cursor Cs is longer.

Figure 7C:
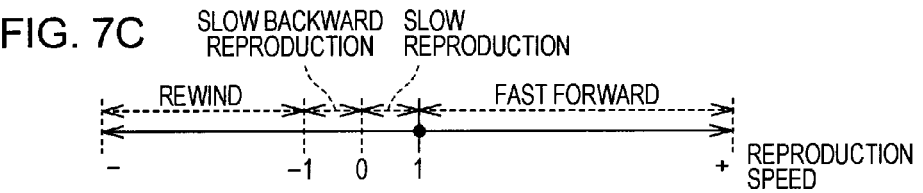

Further, as shown in FIG. 7C and part C of FIG. 8, a reproduction mode of reproducing a video slowly in the backward direction (that is, reproducing the video in the backward direction at a speed slower than the normal speed) may be separately provided in response to the input operation executed with the elastic dough-cursor Cs in addition to the slow reproduction of the video.

In this case, when the direction of the elastic dough-cursor Cs is the right direction, as in the case described with reference to FIG. 7A and part A of FIG. 8, the CPU 110 reproduces the video in the forward direction at a speed faster than the normal speed (that is, performs the rewind). At this time, the CPU 110 sets the value of the reproduction speed to be larger, as the length of the elastic dough-cursor Cs is longer.

On the other hand, when the direction of the elastic dough-cursor Cs is the left direction and the length of the elastic dough-cursor Cs is less than a predetermined first value, as in the case described above with reference to FIG. 7B and part B of FIG. 8, the CPU 110 reproduces the video in the forward direction at a speed slower than the normal speed (performs slow reproduction). At this time, the CPU 110 sets the value of the reproduction speed to be smaller, as the length of the elastic dough-cursor Cs is longer.

When the direction of the elastic dough-cursor Cs is the left direction and the length of the elastic dough-cursor Cs is equal to or greater than the predetermined first value and less than a predetermined second value, the CPU 110 reproduces the video in the backward direction at a speed slower than the normal speed (performs slow backward reproduction). At this time, the CPU 110 sets the value of the reproduction speed to be larger (that is, sets the reproduction speed faster than the reproduction speed of the slow backward reproduction), as the length of the elastic dough-cursor Cs is longer.

Moreover, when the direction of the elastic dough-cursor Cs is the left direction and the length of the elastic dough-cursor Cs is equal to or greater than the predetermined second value, the CPU 110 reproduces the video in the backward direction at a speed faster than the normal speed. At this time the CPU 110 sets the value of the reproduction speed to be larger (that is, sets the reproduction speed faster than the reproduction speed of the rewind), as the length of the elastic dough-cursor Cs is longer.

The embodiment of the disclosure is not limited to these reproduction modes, but an edit mode of editing the video may be separately provided.

In the case of the edit mode, the CPU 110 sets the reproduction speed to "0" (that is, displays the video in a pause state) in a state where the dragging is not executed.

Figure 9:
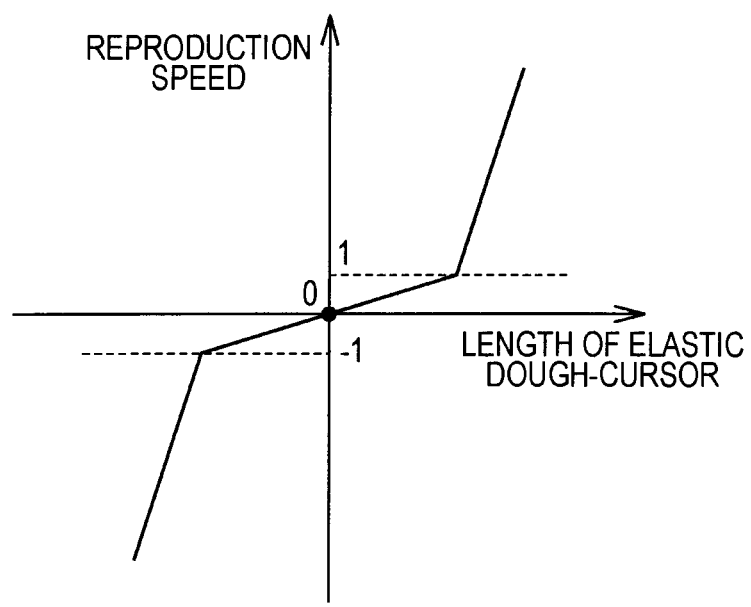
FIG. 9 is a schematic diagram illustrating the control of the reproduction speed in an edit mode.

Here, when the dragging is executed and the direction of the elastic dough-cursor Cs is the right direction, as shown in FIG. 9, the CPU 110 sets the sign of the reproduction speed to "+" (that is, sets the reproduction direction to the forward direction) and gradually increases the value of the reproduction speed from the reproduction speed of "0" as the length of the elastic dough-cursor Cs is longer.

On the other hand, when the direction of the elastic dough-cursor Cs is the left direction, the CPU 110 sets the sign of the reproduction speed to "−" (that is, sets the backward direction as the reproduction direction) and gradually increases the value of the reproduction speed from the reproduction speed of "0" as the length of the elastic dough-cursor Cs is longer.

At this time, the CPU 110 slows an increase degree or a decrease degree of the reproduction speed slow with respect to the length of the elastic dough-cursor Cs when the reproduction speed is slower than the normal speed in the forward direction or the backward direction, in comparison to the case where the reproduction speed is faster than the normal speed in the forward direction or the backward direction.

Accordingly, in the edit mode, the reproduction speed can be adjusted more minutely during the slow reproduction or the slow backward reproduction of the video.

Thereafter, when the user detaches his or her finger from the touch screen 102 and the dragging ends, the CPU 110 shrinks the elastic dough-cursor Cs and deletes the elastic dough-cursor Cs from the screen. Simultaneously, the CPU 110 again sets the reproduction speed of the video to "0" (that is, displays the video in a pause state).

Thus, the CPU 110 is configured to control the reproduction speed of the video in response to an input operation executed with the elastic dough-cursor Cs.

For example, the CPU 110 controls a scroll speed of various lists or images in response to an input operation executed with the elastic dough-cursor Cs.

Specifically, the CPU 110 controls the sign (that is, a scroll direction) of the scroll speed in accordance with the direction of the elastic dough-cursor Cs and controls the value of the scroll speed in accordance with the length of the elastic dough-cursor Cs.

Figure 10A:
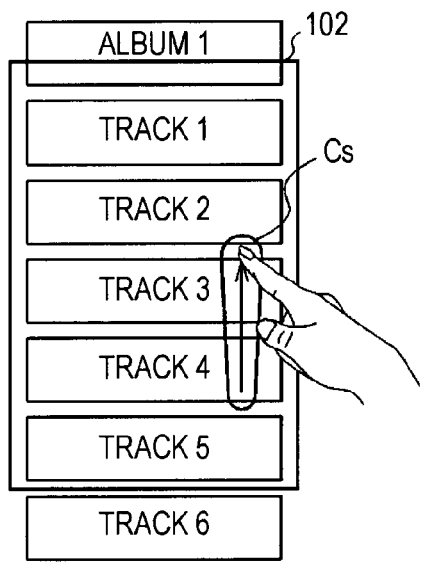
FIGS. 10A to 10C are schematic diagrams illustrating the control of a scroll speed.

For example, as shown in FIG. 10A, it is supposed that a list (which is also referred to as a track list) in which the titles of music (tracks) are vertically arranged in a row is displayed on the touch screen 102 in the vertical direction.

Here, when the dragging is executed in a vertical direction of the screen, the CPU 110 displays the elastic dough-cursor Cs elongating vertically from the start point to the end point of the dragging on the screen in response to the dragging.

When the direction of the elastic dough-cursor Cs is an upward direction, the CPU 110 sets the sign of the scroll speed to "+" and sets, as a scroll direction, a direction in which the track list is scrolled from the upper side to the down side. On the other hand, when the direction of the elastic dough-cursor Cs is a downward direction, the CPU 110 sets the sign of the scroll speed to "−" and sets, as a scroll direction, a direction in which the track list is scrolled from the down side to the upper side.

As shown in FIG. 10O, the CPU 110 sets the value of the scroll speed to be larger, as the length of the elastic dough-cursor Cs is longer.

Figure 10B:
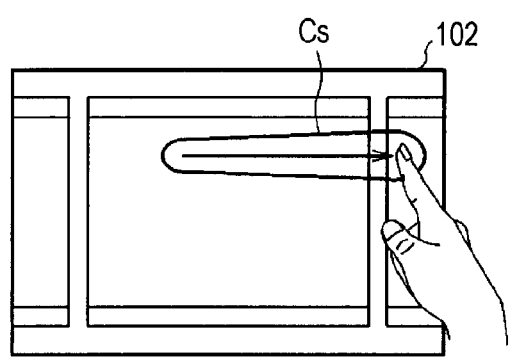

For example, as shown in FIG. 10B, it is supposed that a list a plurality of still images is horizontally arranged in a row is displayed in the horizontal direction on the touch screen 102.

Here, when the dragging is executed in the horizontal direction of the screen, the CPU 110 displays the elastic dough-cursor Cs elongating horizontally from the start point to the end point of the dragging on the screen in response to the dragging.

When the direction of the elastic dough-cursor Cs is the right direction, the CPU 110 sets the sign of the scroll speed to "+" and sets, as the scroll direction, a direction in which the still images are scrolled from the right side to the left side. On the other hand, when the direction of the elastic dough-cursor Cs is the left direction, the CPU 110 sets the sign of the scroll speed to "−" and sets, as the scroll direction, a direction in which the still images are scrolled from the left side to the right side.

Figure 10C:
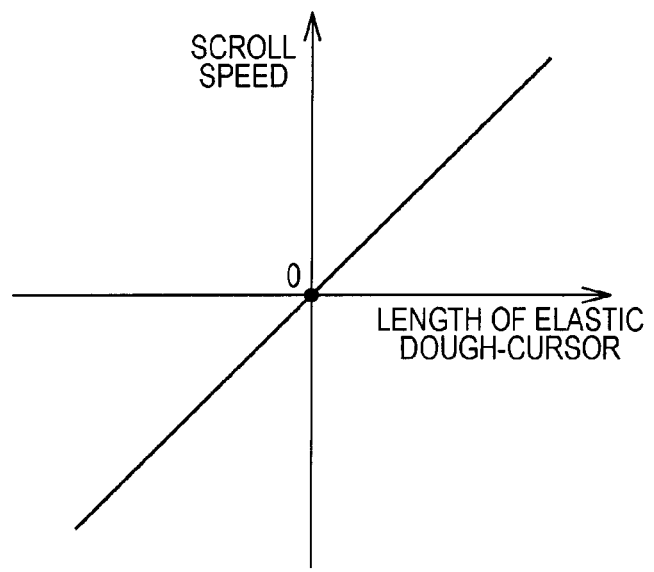

As shown in FIG. 10C, the CPU 110 sets the value of the scroll speed to be larger, as the length of the elastic dough-cursor Cs is longer.

Thus, the portable terminal 100 can scroll the various lists, images, or the like in a desired direction at a desired speed by the input operation executed with the elastic dough-cursor Cs, while showing the user the start/end point direction and the start/end point distance of the dragging.

When the dragging ends, the CPU 110 approaches the end point of the elastic dough-cursor Cs toward the start point of the elastic dough-cursor Cs, shrinks the elastic dough-cursor Cs having elongated up to the circle shape of the elastic dough-cursor Cs, deletes the elastic dough-cursor Cs from the screen, and then ends the scroll.

Further, for example, the CPU 110 controls the adjustment speeds of various parameters (a volume, a zoom rate, a luminance, and a saturation of an image, or the like) in response to an input operation executed with the elastic dough-cursor Cs.

Specifically, the CPU 110 controls the sign (that is, an adjustment direction) of the adjustment speed of the parameter in accordance with the direction of the elastic dough-cursor Cs and controls the value of the adjustment speed in accordance with the length of the elastic dough-cursor Cs.

Figure 11A:
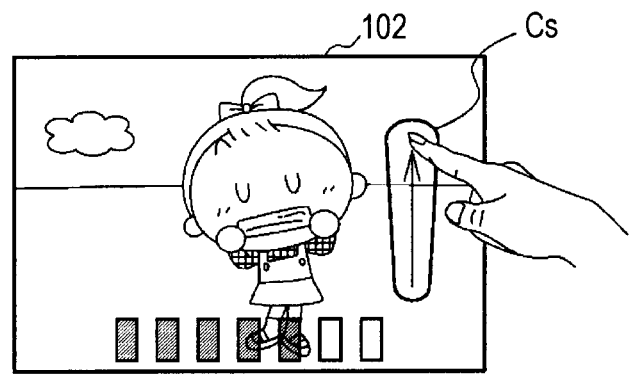
FIGS. 11A and 11B are schematic diagrams illustrating the control of an adjustment speed of a parameter.

For example, as shown in FIG. 11A, it is supposed that a video with a horizontally long shape is displayed on the horizontally long touch screen 102.

Here, when the dragging is executed in a vertical direction of the screen, the CPU 110 displays the elastic dough-cursor Cs elongating vertically from the start point to the end point of the dragging on the screen in response to the dragging.

When the direction of the elastic dough-cursor Cs is an upward direction, the CPU 110 sets the sign of the adjustment speed of the volume to "+" and sets the adjustment direction to a volume-up direction. On the other hand, when the direction of the elastic dough-cursor Cs is a downward direction, the CPU 110 sets the sign of the adjustment speed of the volume to "−" and sets the adjustment direction to a volume-down direction.

Figure 11B:
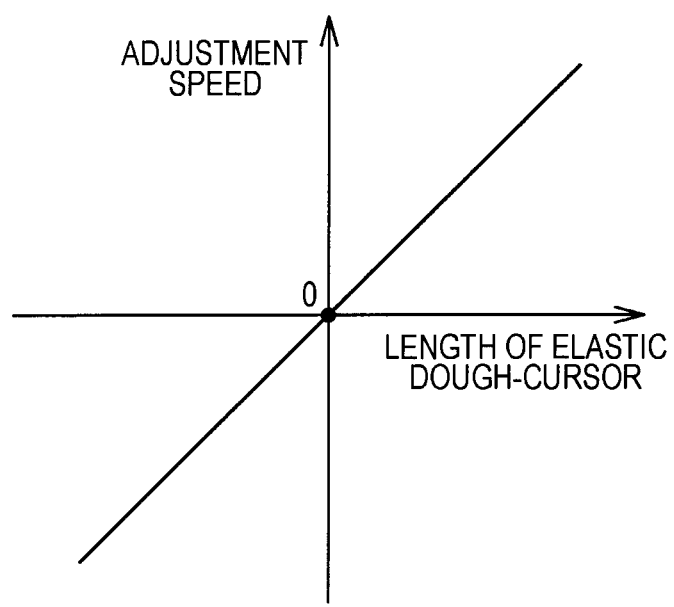

As shown in FIG. 11B, the CPU 110 sets the value of the adjustment speed of the volume to be larger, as the length of the elastic dough-cursor Cs of this time is longer.

When the dragging ends, the CPU 110 shrinks the elastic dough-cursor Cs, deletes the elastic dough-cursor Cs from the screen, and then ends the adjustment of the volume. Thereafter, the volume set immediately before the end of the dragging is maintained.

Thus, the portable terminal 100 can adjust the volume, which is an audio parameter pertaining to the video, by increasing or decreasing the volume at a desired adjustment speed by the input operation executed with the elastic dough-cursor Cs, while displaying to the user the start/end point direction and the start/end point distance of the dragging with the elastic dough-cursor Cs.

Thus, when the dragging is executed, the portable terminal 100 displays the elastic dough-cursor Cs expressing the start/end point positions, the start/end point direction, and the start/end point distance of the dragging and receives the various kinds of input operations in accordance with the direction and the length of the elastic dough-cursor Cs.

2-3-2. Example of Input Operation of Each Application

Next, an example of an input operation in an application (also referred to as app) installed in the portable terminal 100 in the input operation executed with the elastic dough-cursor Cs described above will be described in more detail.

Various kinds of applications can be installed in the portable terminal 100. Here, for example, it is supposed that an app for reproducing music, an app for reproducing still images, and an app for reproducing videos are installed.

Here, an input operation executed with the elastic dough-cursor Cs in an app (also referred to as a video reproduction app) for reproducing a video will be first described in detail.

When an icon used to operate the video reproduction app is displayed on the touch screen 102 and the icon is tapped in this state, the CPU 110 receives this touch operation as an input operation of operating the video reproduction app.

Then, the CPU 110 operates the video reproduction app by reading a program for the video reproduction app from the non-volatile memory 111 and executing the program.

When the video reproduction app is operated, the CPU 110 displays a list of thumbnails of the videos stored as video files in the non-volatile memory 111 on the touch screen 102.

Further, when one of the thumbnails is tapped from the list, the CPU 110 receives the touch operation as an input operation of reproducing the video.

Then, the CPU 110 acquires the video from the video file corresponding to the tapped thumbnail.

Figure 12:
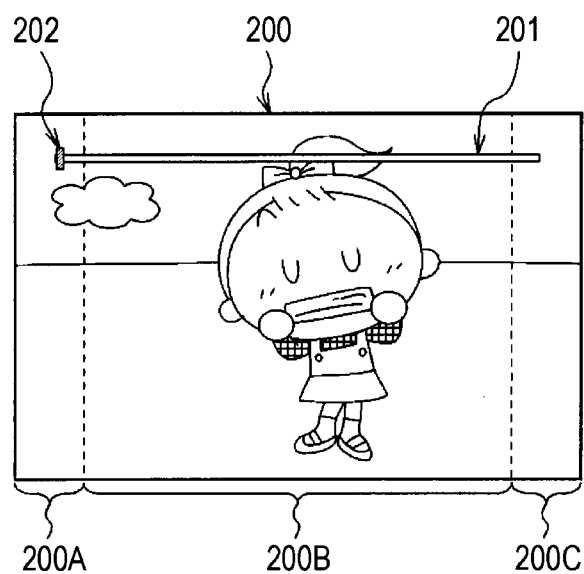
FIG. 12 is a schematic diagram illustrating the configuration of a video reproduction screen.

At this time, the CPU 110 displays a video reproduction screen 200 shown in FIG. 12 on the touch screen 102. The video reproduction screen 200 is a horizontally long screen and is displayed on the entire surface of the horizontally long touch screen 102 on the assumption that the video reproduction screen 200 is used in the horizontal direction.

A video is displayed so as to be nearly full on the video reproduction screen 200. On the video reproduction screen 200, a bar 201 extending from the left end to the right end of the screen is displayed so as to overlap with the video near the upper end of the screen. In the bar 201, one end of the left end side of the screen indicates the start of the video and the other end of the right end side of the screen indicates the end of the video. The current reproduction position of the video is indicated by a pointer 202 moving along the bar 201. Hereinafter, the bar 201 is referred to as a reproduction bar 201.

The video reproduction screen 200 is divided horizontally by a left end region 200A, a middle region 200B, and a right end region 200C. Here, for example, the left end region 200A and the right end region 200C each have an about ⅙ size of the entire screen and the middle region 200B has an about remaining ⅘ size of the entire screen. The roles of the left end region 200A, the middle region 200B, and the right end region 200C will be described below.

The CPU 110 sequentially displays the video reproduced in the forward direction at the normal speed from the leading chapter on the video reproduction screen 200. Hereinafter, reproduction in the forward direction at the normal speed is referred to as normal reproduction.

One video is partitioned in a predetermined unit (for example, each scene). Here, a partial video of each unit is referred to as a chapter. That is, one video is formed by the plurality of chapters.

Here, the reproduction of the video can be configured to be controlled by the dragging in the horizontal direction on the video reproduction screen 200.

In effect, as shown in FIG. 13A, it is supposed that the dragging is executed in the horizontal direction of the screen. Then, the CPU 110 displays the elastic dough-cursor Cs elongating horizontally from the start point to the end point of the dragging in response to the dragging on the screen. The elastic dough-cursor Cs continues to be displayed until the user detaches his or her finger from the touch screen 102 and the dragging ends.

When the CPU 110 recognizes that the direction of the elastic dough-cursor Cs being displayed is the horizontal direction, the CPU 110 determines whether the end point (the end point of the dragging) of the elastic dough-cursor Cs is within the middle region 200B of the screen. When the end point of the elastic dough-cursor Cs is within the middle region 200B, the CPU 110 controls the reproduction speed (the reproduction direction and the values of the reproduction speed) of the video (that is, the chapter) being displayed on the screen in accordance with the direction and the length of the elastic dough-cursor Cs.

Specifically, when the direction of the elastic dough-cursor Cs being displayed is the right direction, the CPU 110 sets the sign of the reproduction speed to "+" and sets the forward direction as the reproduction direction. On the other hand, when the direction of the elastic dough-cursor Cs being displayed is the left direction, the CPU 110 sets the sign of the reproduction speed to "−" and sets the backward direction as the reproduction direction. Further, the CPU 110 sets the value of the reproduction speed to be larger, as the length of the elastic dough-cursor Cs is longer.

As a consequence, for example, when the elastic dough-cursor Cs elongates a long way to the right by the dragging in the rightward side of the screen, the video displayed on the video reproduction screen 200 is reproduced fast in the forward direction (that is, rewound).

On the other hand, when the elastic dough-cursor Cs elongates a long way to the left by the dragging in the leftward side of the screen, the video displayed on the video reproduction screen 200 is reproduced slowly in the backward direction (that is, backward rewound).

When the dragging is executed in the horizontal direction of the screen and then the user does not move his or her finger without detaching his or her finger from the touch screen 102, the elastic dough-cursor Cs continues to be displayed without any change in the direction and the length of the elastic dough-cursor Cs and the reproduction speed (the reproduction direction and the value of the reproduction speed) of this time is maintained.

Thus, the video can be reproduced in the desired reproduction direction at the desired reproduction speed by the input operation executed with the elastic dough-cursor Cs, while the start/end point direction and the start/end point distance of the dragging are shown for the user on the video reproduction screen 200 by the elastic dough-cursor Cs.

The description of the audio pertaining to the video has not been described, but the audio is also controlled by the dragging in the same way as that of the video.

For example, as shown in FIG. 13B, it is supposed that the dragging continues and thus the end point of the elastic dough-cursor Cs comes at a position out of the middle region 200B of the screen (that is, comes at the left end region 200A or the right end region 200C).

Then, the CPU 110 transitions the display contents of the video reproduction screen 200 from the chapter to a list (also referred to as a chapter list) of the chapters.

The chapter list refers to a list in which representative still images (also referred to as chapter images) respectively extracted from the chapters are arranged temporally in one horizontal row in a reproduction time order.

Here, since the chapter list is a list of the representative chapter images respectively extracted from the chapters, the chapter list can be said to be information of a higher level with respect to the chapters.

That is, the CPU 110 transitions the display contents of the video reproduction screen 200 from the chapters to the chapter list which is the information of the higher level with respect to the chapters.

Specifically, as shown in FIG. 13C, the CPU 110 zooms out the chapters being displayed and displays a part of the chapter list including the chapter image Cp (N) of the chapter reproduced immediately before the transition on the video reproduction screen 200.

In effect, in FIG. 13C, the chapter image Cp (N) is displayed in the middle of the video reproduction screen 200, a part of the immediately previous chapter image CP (N−1) is displayed on the left side of the chapter image Cp (N), and a part of the subsequent chapter image Cp (N+1) is displayed on the right side of the chapter image Cp (N).

Thus, when the display contents of the video reproduction screen 200 is transitioned from the chapters to the chapter list, the chapter list is displayed on the video reproduction screen 200 so that the chapter image Cp (N) of the chapter reproduced immediately before the transition is located in the middle of the screen.

In this way, the display contents can be transitioned from the chapters to the chapter list seamlessly on the video reproduction screen 200 without giving a sense of discomfort to the user.

At this time, the elastic dough-cursor Cs continues to be displayed on the video reproduction screen 200 irrespective of the transition of the display contents, until the user detaches his or her finger from the touch screen 102 and thus the dragging ends.

That is, on the video reproduction screen 200, the elastic dough-cursor Cs is displayed which elongates horizontally from the inside of the middle region 200B to a region (that is, the left end region 200A or the right end region 200C) other than the middle region 200B.

Here, the CPU 110 controls the scroll speed (the scroll direction and the value of the scroll speed) of the chapter list being displayed on the screen in accordance with the direction and the length of the elastic dough-cursor Cs and scrolls the chapter list.

Specifically, when the direction of the elastic dough-cursor Cs being displayed is the right direction, the CPU 110 sets the left direction (that is, the direction in which the chapter image Cp is moved left) as the scroll direction of the chapter list. On the other hand, when the direction of the elastic dough-cursor Cs being displayed is the left direction, the CPU 110 sets the right direction (that is, the direction in which the chapter image Cp is moved right) as the scroll direction of the chapter list. Further, the CPU 110 sets the value of the scroll speed to be larger, as the length of the elastic dough-cursor Cs is longer.

As a consequence, for example, when the elastic dough-cursor Cs elongates a long way to the right by the dragging in the right direction of the screen, the chapter list being displayed on the video reproduction screen 200 is scrolled left fast.

On the other hand, when the elastic dough-cursor Cs elongates a short way to the left by the dragging in the left direction of the screen, the chapter list being displayed on the video reproduction screen 200 is scrolled right slowly.

Further, when the user executes the dragging in the horizontal direction of the screen and then does not move his or her finger without detaching his or her finger from the touch screen 102, the elastic dough-cursor Cs continues to be displayed without change in the direction and the length of the elastic dough-cursor Cs and the scroll speed (the scroll direction and the value of the scroll speed) of this time is maintained.

Thus, when the end point of the elastic dough-cursor Cs comes within the left end region 200A or the right end region 200C, the display contents are transitioned from the chapters to the chapter list on the video reproduction screen 200.

Thus, the chapter list can be scrolled at the desired scroll speed by the input operation executed with the elastic dough-cursor Cs, while the start/end point direction and the start/end point distance of the dragging are shown for the user on the video reproduction screen 200 by the elastic dough-cursor Cs.

In this way, the user can easily retrieve the chapter image Cp of the desired chapter from the chapter list through the video reproduction screen 200.

Here, it is supposed that when an arbitrary chapter image Cp is displayed in the middle of the video reproduction screen 200, the dragging ends (that is, the user detaches his or her finger from the touch screen 102).

Then, as shown in FIG. 13D, the CPU 110 approaches the end point of the elastic dough-cursor Cs to the start point of the elastic dough-cursor Cs, shrinks the elastic dough-cursor Cs having elongated in the horizontal direction up to the circle shape, and then deletes the elastic dough-cursor Cs from the screen.

At this time, the CPU 110 transitions the display contents of the video reproduction screen 200 from the chapter list to the chapter serving as information of the lower level.

Specifically, the CPU 110 zooms in the chapter list being displayed and normally reproduces the chapters corresponding to the chapter image Cp displayed in the middle immediately before the transition from the leading chapter to display the video reproduction screen 200.

When the display contents are transitioned from the chapter list to the chapters, the chapters start to be reproduced from the chapter corresponding to the chapter image Cp being displayed in the middle of the screen immediately before the transition.

In this way, the display contents can be transitioned from the chapter list to the chapters seamlessly on the video reproduction screen 200 without giving a sense of discomfort to the user. Moreover, the series of processes from the retrieval of the chapters to the reproduction of the chapters can be simply performed only by single dragging.

Further, it is supposed that the dragging continues without detaching the finger after the transition to the chapter list and the end point of the elastic dough-cursor Cs is returned from the region other than the middle region 200B to the middle region 200B.

Even in this case, when the currently displayed contents are the chapter list, the CPU 110 continues to control the scroll speed of the chapter list in accordance with the direction and the length of the elastic dough-cursor Cs.

As described above, in the video reproduction app, the elastic dough-cursor Cs of the horizontal direction is displayed on the video reproduction screen 200 in response to the dragging in the horizontal direction. In the video reproduction app, when the end point of the elastic dough-cursor Cs being displayed is within the middle region 200B, the reproduction direction of the chapter and the value of the reproduction speed are set in accordance with the direction (left or right) and the length of the elastic dough-cursor Cs.

Thus, in the video reproduction app, the reproduction direction of the chapter and the value of the reproduction speed can be freely set only by the input operation executed with the elastic dough-cursor Cs to reproduce the chapter.

In the video reproduction app, when the end point of the elastic dough-cursor Cs comes within the left end region 200A or the right end region 200C in response to the dragging, the display contents are transitioned from the chapters to the chapter list serving as information of the upper level.

At this time, in the video reproduction app, the scroll direction of the chapter list and the value of the scroll speed are set in accordance with the direction and the length of the elastic dough-cursor Cs.

Thereafter, in the video reproduction app, when the dragging ends, the display contents are transitioned again from the chapter list to the chapters serving as the information of the lower level and the reproduction starts from the leading chapter.

Thus, in the video reproduction app, the chapters and the chapter list are newly switched or the chapter list can be scrolled at the desired scroll speed only by the input operation executed with the elastic dough-cursor Cs in the dragging in the horizontal direction.

Moreover, the volume which is a parameter of the audio pertaining to the video can be adjusted on the video reproduction screen 200 by the dragging in the vertical direction.

Figure 14A:
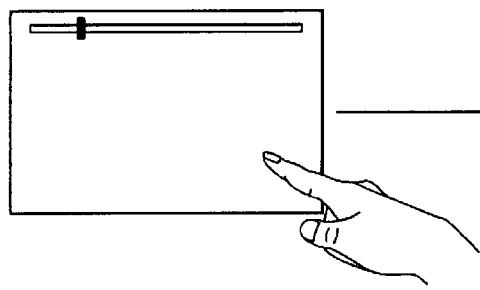
FIGS. 14A and 14B are schematic diagrams illustrating an example of an input operation (2) executed with the elastic dough-cursor in the video reproduction app.
Figure 14B:
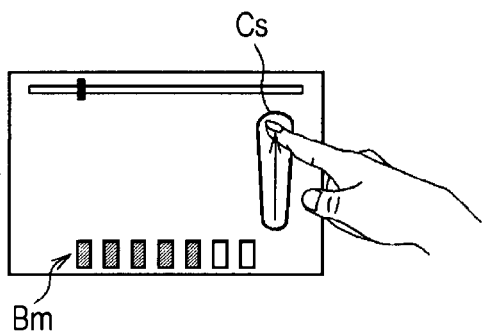

In effect, as shown in FIGS. 14A and 14B, it is supposed that the dragging is executed in the vertical direction of the screen. Then, the CPU 110 displays the elastic dough-cursor Cs elongating vertically from the start point to the end point of the dragging on the screen in response to the dragging.

Here, when the CPU 110 recognizes that the direction of the elastic dough-cursor Cs being displayed is the vertical direction, the CPU 110 controls the adjustment speed (the adjustment direction and the value of the adjustment speed) of the volume to increase or decrease the volume in accordance with the direction and the length of the elastic dough-cursor Cs of this time.

Specifically, when the direction of the elastic dough-cursor Cs being displayed is the upward direction, the CPU 110 sets the sign of the adjustment speed of the volume to "+" and sets the adjustment direction of the volume to the volume-up direction. On the other hand, when the direction of the elastic dough-cursor Cs being displayed is the downward direction, the CPU 110 sets the sign of the adjustment speed of the volume to "−" and sets the adjustment direction of the volume to a volume-down direction. Further, the CPU 110 sets the value of the adjustment speed of the volume to be larger, as the length of the elastic dough-cursor Cs is longer.

As a consequence, for example, when the elastic dough-cursor Cs elongates upwards for a long way by the dragging in the upward direction of the screen, the volume is increased at once.

For example, when the elastic dough-cursor Cs elongates downwards for a short way by the dragging in the downward direction of the screen, the volume is decreased slowly.

When the user does not move his or her finger after the dragging in the vertical direction of the screen without detaching his or her finger from the touch screen 102, the elastic dough-cursor Cs continues to be displayed without any change in the direction and the length thereof and the adjustment speed (the adjustment direction and the value of the adjustment speed) of this time is maintained.

Thus, the volume can be adjusted at the desired adjustment speed in accordance with the direction and the length of the dragging, while the user is enabled to recognize the direction and the length of the dragging with the elastic dough-cursor Cs on the video reproduction screen 200.

Further, the CPU 110 displays a volume bar Bm indicating the current volume at a predetermined position (for example, the middle lower side) of the screen. Thus, the user can adjust the volume, while viewing the volume bar Bm and confirming the current volume.

Thereafter, when the dragging ends, the CPU 110 approaches the end point of the elastic dough-cursor Cs to the start point of the elastic dough-cursor Cs, shrinks the elastic dough-cursor Cs having elongated in the vertical direction up to the circle shape, deletes the elastic dough-cursor Cs from the screen, and then ends the adjustment of the volume. Thereafter, the volume immediately before the end of the dragging is maintained.

In the video reproduction app, as described above, the elastic dough-cursor Cs of the vertical direction is displayed on the video reproduction screen 200 in response to the dragging in the vertical direction. In the video reproduction app, the adjustment direction of the volume and the value of the adjustment speed are set in accordance with the direction (upward or downward) and the length of the elastic dough-cursor Cs being displayed.

Thus, in the video reproduction app, the volume can be adjusted while the adjustment direction and the value of the adjustment speed can be freely shifted only by the input operation executed with the elastic dough-cursor Cs in the dragging in the vertical direction.

In the video reproduction app, the volume can be adjusted even when the dragging is executed at any portion on the screen, as long as the dragging is executed in the vertical direction. For example, the user can adjust the volume by executing the dragging at an unimportant portion of the video, while viewing the video.

For example, when the user listens to only a sound of the video, the user can easily adjust the volume by a blind touch operation without watching the screen.

Next, an input operation executed with the elastic dough-cursor Cs in an app (also referred to as a music reproduction app) that reproduces music (track) will be described in detail.

When an icon used to operate the music reproduction app is displayed on the touch screen 102 and the icon is tapped in this state, the CPU 110 receives this touch operation as an input operation of operating the music reproduction app.

Then, the CPU 110 operates the music reproduction app by reading a program for the music reproduction app from the non-volatile memory 111 and executing the program.

Figure 15:
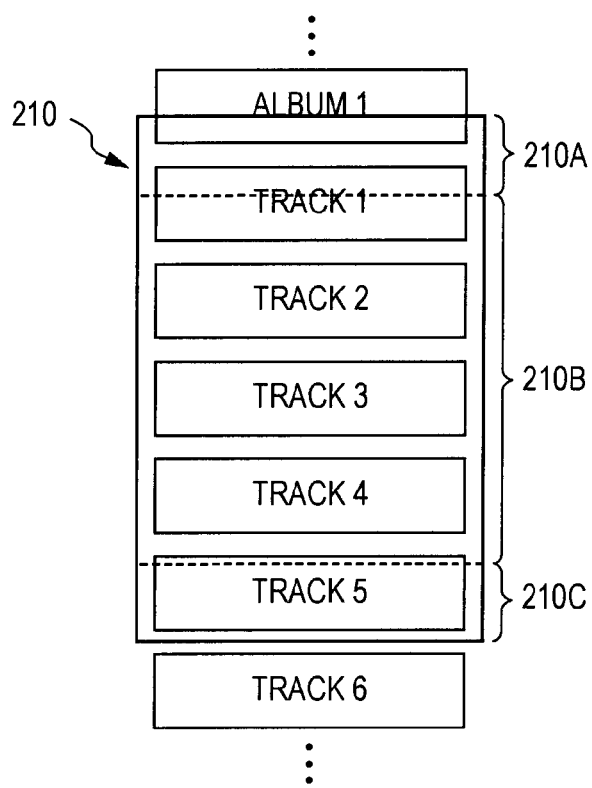
FIG. 15 is a schematic diagram illustrating the configuration of a track selection screen.

When the music reproduction app is operated, the CPU 110 displays a track selection screen 210 shown in FIG. 15 on the touch screen 102.

The track selection screen 210 is a vertically long screen and is displayed on the entire surface of the vertically long touch screen 102 on the assumption that the track selection screen 210 is used in the vertical direction.

The track selection screen 210 is divided vertically into three regions: an upper end region 210A, a middle region 210B, and a lower end region 210C. Here, for example, the upper end region 210A and the lower end region 210C each have about a ⅙ of the size of the entire screen and the middle region 210B has about a remaining ⅘ of the size of the entire screen. The roles of the upper end region 210A, the middle region 210B, and the lower end region 210C will be described below.

The CPU 110 displays a track list on the track selection screen 210. The track list is a list in which the titles of tracks (music) stored as music files in the non-volatile memory 111 are arranged vertically in a row based on, for example, the titles of contained albums and track numbers.

Specifically, the track list is a list in which the tracks are grouped in accordance with respective albums arranged in a title order and are arranged in the track number order.

In the track list, the title of the album is inserted before (upper side on the screen) the title of the leading track of each album in addition to the titles of the tracks.

That is, the titles such as the title of Album 1, the title of Track 1 of Album 1, . . . , the title of Track 5, the title of Album 2, the title of Track 1 of Album 2, and so on can be arranged in the track list.

At least a part of the track list is displayed on the track selection screen 210. In effect, FIG. 15 shows an example in which the titles of five tracks are displayed on the track selection screen 210 among the titles included in the track list.

Here, the scroll speed (the scroll direction and the value of the scroll speed) of the track list can be controlled on the track selection screen 210 by the dragging in the vertical direction.

In effect, as shown in FIG. 16A, it is supposed that the dragging is executed in the vertical direction of the screen. Then, the CPU 110 displays the elastic dough-cursor Cs elongating vertically from the start point to the end point of the dragging on the screen in response to the dragging. The elastic dough-cursor Cs continues to be displayed until the user detaches his or her finger from the touch screen 102 and the dragging ends.

When the CPU 110 recognizes that the direction of the elastic dough-cursor Cs being displayed is the vertical direction, the CPU 110 determines whether the end point (the end point of the dragging) of the elastic dough-cursor Cs is within the middle region 210B of the screen. When the end point of the elastic dough-cursor Cs is within the middle region 210B, the CPU 110 controls the scroll speed of the track list in accordance with the direction and the length of the elastic dough-cursor Cs to scroll the track list.

Specifically, when the direction of the elastic dough-cursor Cs being displayed is the upward direction, the CPU 110 sets the upward direction (that is, a direction in which the titles are moved downward) as the scroll direction of the track list. On the other hand, when the direction of the elastic dough-cursor Cs being displayed is the downward direction, the CPU 110 sets the downward direction (that is, a direction in which the titles are moved upward) as the scroll direction of the track list. Further, the CPU 110 sets the value of the scroll speed to be larger, as the length of the elastic dough-cursor Cs is longer.

As a consequence, for example, when the elastic dough-cursor Cs elongates upwards for a long way by the dragging in the upward side of the screen, the track list displayed on the track selection screen 210 is scrolled fast in the downward direction.

On the other hand, when the elastic dough-cursor Cs elongates downwards for a short way by the dragging in the downward side of the screen, the track list displayed on the track selection screen 210 is scrolled slowly in the upward direction.

When the dragging is executed in the vertical direction of the screen and then the user does not move his or her finger without detaching his or her finger from the touch screen 102, the elastic dough-cursor Cs continues to be displayed without changing the direction and the length of the elastic dough-cursor Cs and the scroll speed (the scroll direction and the value of the scroll speed) of this time is maintained.

Thus, the track list can be scrolled at the desired scroll speed by the input operation executed with the elastic dough-cursor Cs, while the start/end point direction and the start/end point distance of the dragging are shown for the user on the track selection screen 210 by the elastic dough-cursor Cs.

In this way, the user can easily retrieve the title of a desired track from the track list.

Further, as shown in FIG. 16B, the CPU 110 gradually decreases the display size of only the title of the track among the titles included in the track list, as the end point of the elastic dough-cursor Cs becomes closer to the upper end region 210A or the lower end region 210C.

In this way, the display gap between the titles of the albums included in the track list is gradually narrowed by shrinking the bellows with the gradual decrease in the display size of the title of the track.

Further, the end point of the elastic dough-cursor Cs is assumed to come within the upper end region 210A or the lower end region 210C. Then, as shown in FIG. 16C, the CPU 110 finally deletes the title of the track from the screen and transitions the display contents to a list in which only the titles of the albums of the track list are arranged. This list is also referred to as an album list.

Since the album list is a list of the titles of the albums which are the upper level of the titles of the tracks, the album is information of the upper level with respect to the track list.

That is, the CPU 110 transitions the display contents of the track selection screen 210 from the track list to the album list serving as the information of the upper level of the track list.

Thus, the display contents of the screen are transitioned from the track list to the album list by gradually decreasing the display size of only the title of the track among the titles included in the track list and finally deleting the title of the track from the screen.

In this way, the display contents can be transitioned from the track list to the album list seamlessly on the track selection screen 210 without giving a sense of discomfort to the user.

At this time, the elastic dough-cursor Cs continues to be displayed on the track selection screen 210 irrespective of the transition of the display contents, until the dragging ends.

That is, on this track selection screen 210, the elastic dough-cursor Cs is displayed which elongates vertically from the middle region 210B to a region (that is, the upper end region 210A or the lower end region 210C) other than the middle region 210B.

Here, while the length of the elastic dough-cursor Cs being displayed exceeds a predetermined threshold value, the CPU 110 controls the scroll speed of the album list being displayed on the screen to scroll the album list in accordance with the direction and the length of the elastic dough-cursor Cs.

Specifically, when the direction of the elastic dough-cursor Cs being displayed is the upward direction, the CPU 110 sets the upward direction (that is, the direction in which the titles are moved downward) as the scroll direction of the album list. On the other hand, when the direction of the elastic dough-cursor Cs being displayed is the downward direction, the CPU 110 sets the downward direction (that is, the direction in which the titles are moved upward) as the scroll direction of the album list. Further, the CPU 110 sets the value of the scroll speed to be larger, as the length of the elastic dough-cursor Cs is longer.

As a consequence, for example, when the elastic dough-cursor Cs elongates upwards for a long way by the dragging in the upward direction of the screen, the album list being displayed on the track selection screen 210 is scrolled downward fast.

For example, when the elastic dough-cursor Cs elongates downwards for a short way by the dragging in the downward direction of the screen, the album list being displayed on the track selection screen 210 is scrolled upward slowly.

Further, when the user executes the dragging in the vertical direction of the screen and then does not move his or her finger without detaching his or her finger from the touch screen 102, the elastic dough-cursor Cs continues to be displayed without change in the direction and the length of the elastic dough-cursor Cs and the scroll speed of this time (the scroll direction and the value of the scroll speed) is maintained.

Thus, the album list can be scrolled at the desired scroll speed by the input operation executed with the elastic dough-cursor Cs, while the start/end point direction and the start/end point distance of the dragging are shown for the user on the track selection screen 210 by the elastic dough-cursor Cs.

In this way, the user can easily retrieve the title of the desired album from the album list.

Here, as shown in FIG. 16D, it is supposed that the dragging further continues and the end point of the dragging becomes closer to the start point of the dragging so that the length of the elastic dough-cursor Cs shrinks up to a value equal to or less than a predetermined threshold value.

Then, the CPU 110 transitions the display contents of the track selection screen 210 from the album list to the track list serving as information of the lower level.

Specifically, the display contents are transitioned from the album list to the track list by inserting and displaying the title of the track between the title of the album and the title of the album included in the album list. Further, for example, the display size of the title of the track is assumed to be the same as the display size immediately before the transition from the track list to the album list.

The CPU 110 returns the display size to the original size of the title of the track while gradually increasing the display size of the title of the track, as the length of the elastic dough-cursor Cs is shorter.

In this way, the display gap between the titles of the albums included in the track list is gradually enlarged by increasing the bellows with the gradual increase in the display size of the title of the track.

The display contents are transitioned from the track list to the album list by inserting the titles of the tracks between the titles of the albums included in the album list and gradually returning the display size to the original size.

In this way, the display contents can be transitioned from the album list to the track list seamlessly on the track selection screen 210 without giving a sense of discomfort to the user.

Accordingly, the user can smoothly perform the operations from the retrieval of the albums to the retrieval of the tracks by executing only the dragging in the vertical direction.

Thereafter, it is supposed that the dragging ends (that is, the user detaches his or her finger from the touch screen 102).

Then, the CPU 110 approaches the end point of the elastic dough-cursor Cs to the start point of the elastic dough-cursor Cs, shrinks the elastic dough-cursor Cs having elongated in the vertical direction up to the circle shape of the elastic dough-cursor Cs, and then deletes the elastic dough-cursor Cs from the screen.

Further, the CPU 110 returns the display size of the title of the track included in the track list to its original size. When the album list is displayed in the state where the dragging ends, the CPU 110 transitions the display contents to the track list by inserting the title of the track into the album list.

Here, it is supposed that one of the titles of the tracks being displayed on the track selection screen 210 is tapped to select this track.

Then, the CPU 110 obtains a sound of the track from the music file corresponding to the title of the tapped track and outputs the sound from the headphone terminal (not shown).

As described above, in the music reproduction app, the elastic dough-cursor Cs of the vertical direction is displayed on the track selection screen 210 in response to the dragging in the vertical direction. Further, in the music reproduction app, when the end point of the elastic dough-cursor Cs is within the middle region 210B, the scroll direction of the track list and the value of the scroll speed are set in accordance with the direction (upward or downward direction) and the length of the elastic dough-cursor Cs.

In the music reproduction app, when the end point of the elastic dough-cursor Cs comes out of the middle region 210B and comes within the upper end region 210A or the lower end region 210C in response to the dragging, the display contents are transitioned from the track list to the album list serving as the information of the upper level.

At this time, in the music reproduction app, the scroll direction of the album list and the value of the scroll speed are set in accordance with the direction and the length of the elastic dough-cursor Cs.

Thereafter, when the length of the elastic dough-cursor Cs is equal to or less the predetermined threshold value, the display contents are transitioned again from the album list to the track list serving as the information of the lower level in the music reproduction app.

Thus, in the music reproduction app, the track list and the album list can be newly switched or the track list and the album list can be scrolled at the desired scroll speed only by the input operation executed with the elastic dough-cursor Cs.

Accordingly, the user can easily perform the operations from the retrieval of the albums to the retrieval of the tracks.

Next, an input operation executed with the elastic dough-cursor Cs in an app (also referred to as still image reproduction app) of reproducing a still image will be described in detail.

When an icon used to operate the still image reproduction app is displayed on the touch screen 102 and the icon is tapped in this state, the CPU 110 receives this touch operation as an input operation of operating the still image reproduction app.

Then, the CPU 110 operates the still image reproduction app by reading a program for the still image reproduction app from the non-volatile memory 111 and executing the program.

When the still image reproduction app is operated, the CPU 110 displays a list of thumbnails of the still images stored as still image files in the non-volatile memory 111 on the touch screen 102.

Further, when one of the thumbnails is tapped from the list, the CPU 110 receives the touch operation as an input operation of reproducing the still images.

Then, the CPU 110 acquires the still image from the still image file corresponding to the tapped thumbnail.

Figure 17:
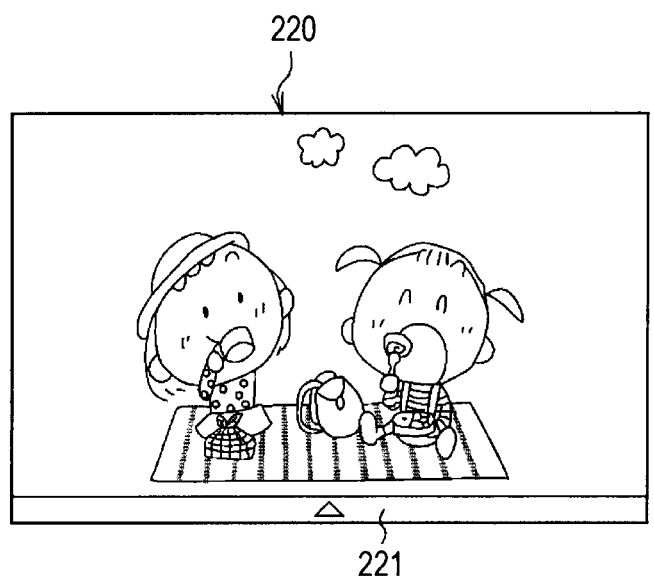
FIG. 17 is a schematic diagram illustrating the configuration of a still image reproduction screen.

At this time, the CPU 110 displays a still image reproduction screen 220 shown in FIG. 17 on the touch screen 102. The still image reproduction screen 220 is a horizontally long screen and is displayed on the entire surface of the horizontally long touch screen 102 on the assumption that the still image reproduction screen 220 is used in the horizontal direction.

A still image is displayed so as to be nearly full on the still image reproduction screen 220. An upper portion of a palette 221 is displayed on the lower end of the still image reproduction screen 220. The palette 221 is configured to be extracted and displayed on the still image reproduction screen 220 by touching the upper end portion of the palette 221 and executing dragging in the upward direction of the screen. The palette 221 is also referred to as a luminance saturation palette) used to adjust the luminance and saturation which are parameters of the still image. The palette 221 will be described in detail.

On the still image reproduction screen 220, the adjustment speed (the adjustment direction and the value of the adjustment speed) of the zoom rate (magnification rate/reduction rate) which is a parameter of the still image can be controlled with the dragging in the vertical direction on the still image being displayed.

Figure 18A:
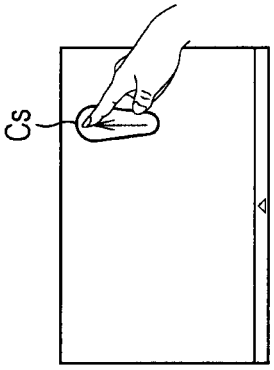
FIGS. 18A to 18C are schematic diagrams illustrating an example of an input operation (1) executed with the elastic dough-cursor in a still image reproduction app.

In effect, as shown in FIG. 18A, it is supposed that an arbitrary portion of the still image continues to be touched for a predetermined time. The touch executed for a time equal to or longer than a predetermined time is referred to as a long press and the touch executed for a time shorter than the predetermined time is referred to as a short press.

Figure 18B:
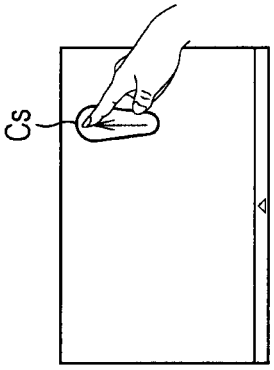

As shown in FIG. 18B, the CPU 110 displays the elastic dough-cursor Cs with a circle shape having its center at the position at which the still image is long pressed and sets this position as a zoom center. Moreover, this position is the start point of the elastic dough-cursor Cs.

For example, the size of the elastic dough-cursor Cs being displayed at this time is set to be slightly larger the touched finger.

Figure 18C:
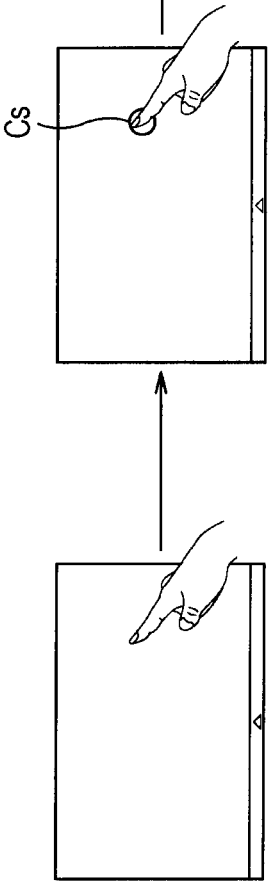

Furthermore, as shown in FIG. 18C, it is supposed that the dragging is executed in the vertical direction of the screen without detaching the finger long pressing the screen.

Then, the CPU 110 vertically elongates the elastic dough-cursor Cs from the start point (that is, the position initially long pressed) to the end point of the dragging in response to the dragging.

Here, when the CPU 110 recognizes that the direction of the elastic dough-cursor Cs is the vertical direction, the CPU 110 sets the start point of the elastic dough-cursor Cs as the zoom center and increases or decreases the zoom rate by controlling the adjustment speed of the zoom rate (magnification rate/reduction rate) of the still image in response to the direction and the length of the elastic dough-cursor Cs.

Specifically, when the direction of the elastic dough-cursor Cs being displayed is the upward direction, the CPU 110 sets the adjustment direction of the zoom rate as a zoom-in (magnification) direction (that is, a direction in which the zoom rate increases from 100%). On the other hand, when the direction of the elastic dough-cursor Cs being displayed is the downward direction, the CPU 110 sets the adjustment direction of the zoom rate as a zoom-out (reduction) direction (that is, a direction in which the zoom rate decreases from 100%). Further, the CPU 110 sets the value of the adjustment speed of the zoom rate (magnification rate/reduction rate) to be larger, as the length of the elastic dough-cursor Cs is longer.

As a consequence, for example, when the elastic dough-cursor Cs long elongates in the upward direction of the screen by the dragging in the upward direction of the screen, the magnification rate of the still image increases at once. Thus, the still image being displayed on the still image reproduction screen 220 is magnified at once using the start point of the elastic dough-cursor Cs as a center.

For example, when the elastic dough-cursor Cs short elongates downward by the dragging executed in the downward direction of the screen, the reduction rate of the still image slowly decreases. Thus, the still image being displayed on the still image reproduction screen 220 is slowly reduced using the start point of the elastic dough-cursor Cs as a center.

When the dragging is executed in the vertical direction of the screen and then the user does not move his or her finger without detaching his or her finger from the touch screen 102, the elastic dough-cursor Cs continues to be displayed without changing the direction and the length of the elastic dough-cursor Cs and the adjustment speed (the adjustment direction and the value of the adjustment speed) of this time is maintained.

Thus, the zoom rate of the still image can be adjusted at the desired adjustment speed by the input operation executed with the elastic dough-cursor Cs, while the start/end point direction and the start/end point distance of the dragging are shown for the user on the still image reproduction screen 220 by the elastic dough-cursor Cs.

Further, the series of operations from the setting of the zoom center to the adjustment of the zoom rate can be performed seamlessly on the still image reproduction screen 220 only by the dragging from the long press.

Accordingly, the user can easily and swiftly view the entire still image or view a desired part of the still image with a desired size on the still image reproduction screen 220.

Thereafter, when the dragging ends, the CPU 110 approaches the end point of the elastic dough-cursor Cs toward the start point of the elastic dough-cursor Cs, shrinks the elastic dough-cursor Cs having elongated in the vertical direction up to the circle shape, deletes the elastic dough-cursor Cs from the screen, and then ends the adjustment of the zoom rate. At this time, the zoom center is reset. Thereafter, the zoom rate immediately before the end of the dragging is maintained.

The still images being displayed can be scrolled on the still image reproduction screen 220 by executing the dragging (also by executing flicking) in an arbitrary direction from the short press without executing the long press.

In effect, it is supposed that the dragging (or flicking) is executed in an arbitrary direction from the short press. Then, the CPU 110 scrolls the still images by controlling the scroll of the still images in accordance with the direction and the length (or the direction and speed of the flicking) of the dragging.

Specifically, the CPU 110 scrolls the still images only to a distance (or the distance corresponding to the speed of the flicking) corresponding to the length of the dragging in a direction opposite to the direction of the dragging (or the flicking).

Thus, on still image reproduction screen 220, the input operation executed with the dragging can be newly changed to the adjustment or the scroll of the zoom rate using the long press.

When an arbitrary portion of the still image can be long pressed on the still image reproduction screen 220, the elastic dough-cursor Cs with the size slightly larger than the finger executing the long pressing at the position of the portion is displayed. Thus, since the portion long pressed can be set as the zoom center, the user can easily recognize the fact that the input operation executed by the dragging is completely changed to the adjustment of the zoom rate.

On the other hand, it is supposed that the upper end portion of the luminance saturation palette 221 being displayed on the lower end of the still image reproduction screen 220 is touched and flicking is executed (the dragging can also be executed) in the upward direction of the screen.

Then, as shown in FIG. 19A, the CPU 110 extracts the luminance saturation palette 221 upward from the lower end of the still image reproduction screen 220 in response to the flicking.

The horizontal width of the luminance saturation palette 221 is the same as the horizontal width of the still image reproduction screen 220. For example, the luminance saturation palette 221 appears so as to cover the lower end to the upper end (that is, the entire screen) of the still image reproduction screen 220.

Further, the luminance saturation palette 221 is divided into two regions: a left region 221L used to adjust the luminance and a right region 211R used to adjust the saturation. The left region 221L is also referred to as a luminance setting region and the right region 221R is also referred to as a saturation setting region.

The luminance setting region 221L and the saturation setting region 221R are each transparent in a portion other than the outer frame and a still image displayed on the still image reproduction screen 220 can be seen therethrough.

The word "luminance" is configured to be displayed in the luminance setting region 221L and the word "saturation" is configured to be displayed in the saturation setting region 221R.

In the luminance saturation palette 221, the luminance of the still image can be adjusted by vertical dragging of which a start point is within the luminance setting region 221L and the saturation of the still image can be adjusted by vertical dragging of which a start point is within the saturation setting region 221R.

In effect, as shown in FIGS. 19B and 19C, it is supposed that the inside of the luminance setting region 221L is touched and the dragging is executed in the vertical direction of the screen. Then, the CPU 110 displays the elastic dough-cursor Cs vertically elongating from the start point to the end point of the dragging on the screen in response to the dragging.

Here, when the CPU 110 recognizes that the direction of the elastic dough-cursor Cs being displayed is the vertical direction, the CPU 110 controls the adjustment speed (the adjustment direction and the value of the adjustment speed) of the luminance of the still image being displayed in accordance with the direction and the length of the elastic dough-cursor Cs.

Specifically, when the direction of the elastic dough-cursor Cs being displayed is the upward direction, the CPU 110 sets the adjustment direction of the luminance so as to increase the luminance. On the other hand, when the direction of the elastic dough-cursor Cs being displayed is the downward direction, the CPU 110 sets the adjustment direction of the luminance so as to decrease the luminance. Further, the CPU 110 sets the value of the adjustment speed of the luminance to be larger, as the length of the elastic dough-cursor Cs is longer.

As a consequence, for example, when the elastic dough-cursor Cs elongates upwards for a long way by the dragging in the upward direction of the screen, the luminance of the still image being displayed increases at once.

For example, when the elastic dough-cursor Cs elongates downwards for a short way by the dragging in the downward direction of the screen, the luminance of the still image being displayed decreases slowly.

When the user does not move his or her finger after the dragging in the vertical direction of the screen without detaching his or her finger from the touch screen 102, the elastic dough-cursor Cs continues to be displayed without any change in the direction and the length thereof and the adjustment speed (the adjustment direction and the value of the adjustment speed) of this time is maintained.

On the other hand, as shown in FIGS. 19D and 19E, it is supposed that the inside of the saturation setting region 221R is touched and the dragging is executed in the vertical direction of the screen. Then, the CPU 110 displays the elastic dough-cursor Cs vertically elongating from the start point to the end point of the dragging on the screen in response to the dragging.

Here, when the CPU 110 recognizes that the direction of the elastic dough-cursor Cs being displayed is the vertical direction, the CPU 110 controls the adjustment speed of the saturation of the still image being displayed in accordance with the direction and the length of the elastic dough-cursor Cs of this time.

Specifically, when the direction of the elastic dough-cursor Cs being displayed is the upward direction, the CPU 110 sets the adjustment direction of the saturation so as to increase the saturation. On the other hand, when the direction of the elastic dough-cursor Cs being displayed is the downward direction, the CPU 110 sets the adjustment direction of the saturation so as to decrease the saturation. Further, the CPU 110 sets the value of the adjustment speed of the saturation to be larger, as the length of the elastic dough-cursor Cs is longer.

As a consequence, for example, when the elastic dough-cursor Cs elongates upwards for a long way by the dragging in the upward direction of the screen, the saturation of the still image being displayed increases at once.

For example, when the elastic dough-cursor Cs elongates downwards for a short way by the dragging in the downward direction of the screen, the saturation of the still image being displayed decreases slowly.

When the user does not move his or her finger after the dragging in the vertical direction of the screen without detaching his or her finger from the touch screen 102, the elastic dough-cursor Cs continues to be displayed without any change in the direction and the length thereof and the adjustment speed of this time is maintained.

Thus, the luminance or the saturation can be adjusted at the desired adjustment speed by the input operation executed with the elastic dough-cursor Cs, while the start/end point direction and the start/end point distance of the dragging are shown for the user on the luminance saturation palette 221 by the elastic dough-cursor Cs.

Since the luminance saturation palette 221 is transparent in the portion other than the outer frame, the user can adjust the luminance or the saturation while viewing the still image being displayed under the luminance saturation palette 221.

Thereafter, when the dragging ends, the CPU 110 approaches the end point of the elastic dough-cursor Cs toward the start point of the elastic dough-cursor Cs, shrinks the elastic dough-cursor Cs having elongated in the vertical direction up to the circle shape of the elastic dough-cursor Cs, deletes the elastic dough-cursor Cs from the screen, and then ends the adjustment of the luminance or the saturation. Thereafter, the luminance or the saturation immediately before the end of the dragging is maintained.

When an arbitrary portion of the still image being displayed on the still image reproduction screen 220 is long pressed in the still image reproduction app as described above, the elastic dough-cursor Cs with a circle shape is displayed at the long pressed position. Further, in the still image reproduction app, the long pressed position is set as the zoom center and the input operation executed by the dragging is changed from the scroll of the still image to the adjustment of the zoom rate.

In the still image reproduction app, the elastic dough-cursor Cs vertically elongates in response to the dragging in the vertical direction, and the adjustment direction of the zoom rate of the still image and the value of the adjustment speed are set in accordance with the direction (upward or downward) and the length of the elastic dough-cursor Cs.

In the still image reproduction app, when the dragging (flicking) is executed without the long press, the still image being displayed on the still image reproduction screen 220 is scrolled in response to the dragging.

Thus, in the still image reproduction app, the input operation executed by the dragging can be newly changed to the adjustment of the zoom rate or the scroll by the long press. Accordingly, the adjustment of the zoom rate or the scroll of the still image can be scrolled only by the dragging.

In the still image reproduction app, when the dragging is executed in the vertical direction using the inside of the luminance saturation palette 221 as a start point, the vertical elastic dough-cursor Cs is displayed in response to the dragging.

In the still image reproduction app, when the start point of the dragging is within the luminance setting region 221L of the luminance saturation palette 221, the adjustment direction of the luminance of the still image and the value of the adjustment speed are set in accordance with the direction and the length of the elastic dough-cursor Cs.

In the still image reproduction app, when the start point of the dragging is within the saturation setting region 221R of the luminance saturation palette 221, the adjustment direction of the saturation of the still image and the value of the adjustment speed are set in accordance with the direction and the length of the elastic dough-cursor Cs.

In the still image reproduction app, the input operation executed by the dragging can be newly changed to the adjustment of the luminance of the still image or the adjustment of the saturation of the still image in accordance with the position of the start point of the dragging within the luminance saturation palette 221.

In the still image reproduction app, the luminance or the saturation of the still image can be adjusted while the adjustment direction and the value of the adjustment speed are freely shifted only by the input operation executed with the elastic dough-cursor Cs in the dragging in the vertical direction.

As described above, the portable terminal 100 can easily reproduce a video, changes the display contents, scroll various kinds of lists, adjust various kinds of parameters, and the like only by the input operation executed with the elastic dough-cursor Cs in the dragging.

2-4. Input Operation Processing Sequence

Next, a specific sequence (referred to as an input operation processing sequence) will be described which is performed by the portable terminal 100 in response to the input operation executed with the elastic dough-cursor Cs.

2-4-1. Input Operation Processing Sequence of Video Reproduction Application

An input operation processing sequence will be described with reference to the flowchart shown in FIG. 20 when the reproduction of the chapters, the change between the chapters and the chapter list, and the scroll of the chapter list are performed by the video reproduction app.

An input operation processing sequence RT1 shown in FIG. 20 is a processing sequence performed by the CPU 110 of the portable terminal 100 in accordance with the program for the video reproduction app stored in the non-volatile memory 111.

When the CPU 110 operates the video reproduction app and one of the thumbnails of the listed videos is tapped, the CPU 110 starts the input operation processing sequence RT1. Then, the process proceeds to step SP1. In step SP1, the CPU 110 determines whether a touch operation is executed on the touch panel 102B based on a signal input from the touch panel 102B.

When a negative result is obtained, the CPU 110 allows the process to proceed to step SP2, reproduces the video corresponding to the tapped thumbnail in the forward direction at the normal speed (that is, performs normal reproduction), and then returns the process to step SP1.

On the other hand, when a positive result is obtained in step SP1 described above, the CPU 110 allows the process to proceed to step SP3. In step SP3, the CPU 110 appropriately displays the elastic dough-cursor Cs in response to this touch operation and determines whether the touch operation is the dragging in the horizontal direction of the screen.

When a negative result is obtained in step SP3, the CPU 110 returns the process to step SP1 again. On the other hand, when a positive result is obtained in step SP3, the CPU 110 allows the process to proceed to step SP4.

In step SP4, the CPU 110 determines whether the current display contents are the chapters. When a positive result is obtained in step SP4, the CPU 110 allows the process to proceed to step SP5.

In step SP5, the CPU 110 determines whether the end point (that is, the end point of the dragging) of the elastic dough-cursor Cs being displayed is within the left end region 200A or the right end region 200C.

When a negative result is obtained, the negative results indicates that the current display contents are the chapters and thus the end point of the elastic dough-cursor Cs is within the region other than the left end region 200A or the region other than the right end region 200C (that is, in the middle region 200B).

At this time, the CPU 110 allows the process to proceed to step SP6, controls the reproduction speed of the chapters in accordance with the direction and the length of the elastic dough-cursor Cs being displayed, and then returns the process to step SP1 again.

On the other hand, when a positive result is obtained in step SP5 described above, the positive result indicates that the current display contents are the chapters and the end point of the elastic dough-cursor Cs is within the left end region 200A or the right end region 200C (that is, the region other than the middle region 200B).

At this time, the CPU 110 allows the process to proceed to step SP7, transitions the display contents from the chapters to the chapter list serving as the information of the upper level, and then returns the process to step SP1 again.

On the other hand, when a negative result is obtained in step SP4 described above, the negative result indicates that the current display contents are the chapter list.

At this time, the CPU 110 allows the process to proceed to step SP8, controls the scroll speed of the chapter list in accordance with the direction and the length of the elastic dough-cursor Cs being displayed, and returns the process to step SP1 again.

According to this input operation processing sequence RT1, the CPU 110 performs the reproduction of the chapters, the change between the chapters and the chapter list, and the scroll of the chapter list in response to the input operation executed with the elastic dough-cursor Cs in the dragging.

Subsequently, an input operation processing sequence will be described with reference to the flowchart shown in FIG. 21 when the volume is adjusted by the video reproduction app.

Figure 21:
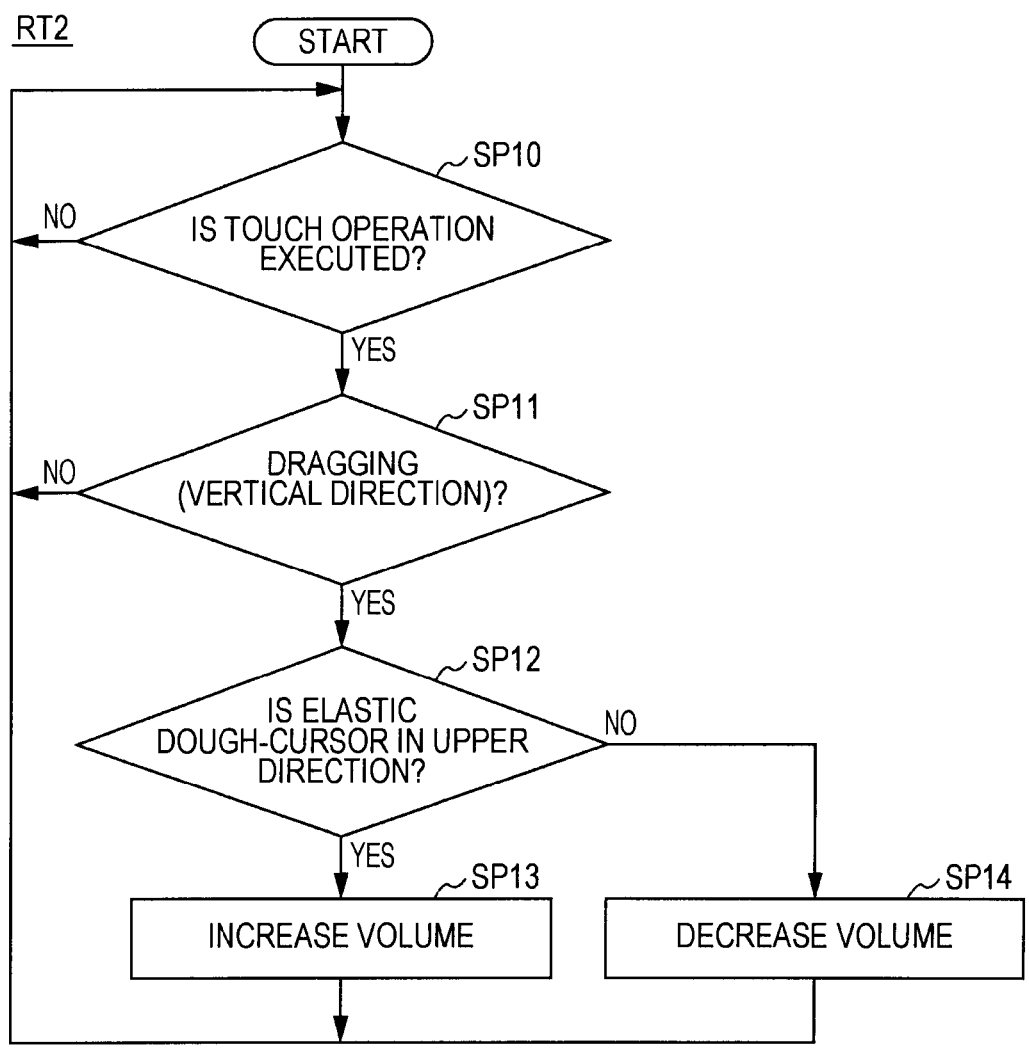
FIG. 21 is a flowchart illustrating an input operation processing sequence (2).

An input operation processing sequence RT2 shown in FIG. 21 is a processing sequence executed by the CPU 110 of the portable terminal 100 in accordance with the program for the video reproduction app stored in the non-volatile memory 111.

When the CPU 110 operates the video reproduction app and one of the thumbnails of the listed videos is tapped, the CPU 110 starts the input operation processing sequence RT2. Then, the process proceeds to step SP10. In step SP10, the CPU 110 determines whether a touch operation is executed on the touch panel 102B based on a signal input from the touch panel 102B.

In step SP10, the CPU 110 waits until obtaining a positive result. When the CPU 110 obtains the positive result, the CPU 110 allows the process to proceed to step SP11.

In step SP11, the CPU 110 appropriately displays the elastic dough-cursor Cs in response to the touch operation and determines whether the touch operation is the dragging in the vertical direction of the screen.

When a negative result is obtained in step SP11, the CPU 110 returns the process to step SP10 again. On the other hand, when a positive result is obtained in step SP11, the CPU 110 allows the process to proceed to step SP12.

In step SP12, the CPU 110 determines whether the direction of the elastic dough-cursor Cs being displayed at this time is the upward direction (that is, the end point of the dragging is located above the start point of the dragging).

When a positive result is obtained in step SP12, the positive result indicates that the direction of the elastic dough-cursor Cs is the upward direction (that is, the end point of the dragging is located above the start point of the dragging).

At this time, the CPU 110 allows the process to proceed to step SP13, increases the volume at the adjustment speed corresponding to the direction (upward direction) and the length of the elastic dough-cursor Cs being displayed at this time, and then returns the process to step SP10.

On the other hand, when a negative result is obtained in step SP12 described above, the negative result indicates that the direction of the elastic dough-cursor Cs is the downward direction (that is, the end point of the dragging is located below the start point of the dragging).

At this time, the CPU 110 allows the process to proceed to step SP14, decreases the volume at the adjustment speed corresponding to the direction (downward) and the length of the elastic dough-cursor Cs being displayed, and then returns the process to step SP10 again.

According to the input operation processing sequence RT2, the CPU 110 performs the adjustment of the volume in response to the input operation executed with the elastic dough-cursor Cs in the dragging.

2-4-2. Input Operation Processing Sequence of Music Reproduction Application

Next, an input operation processing sequence will be described with reference to the flowchart shown in FIG. 22 when the change between the track list and the album list and the scroll of the track list and the album list are performed by the music reproduction app.

Figure 22:
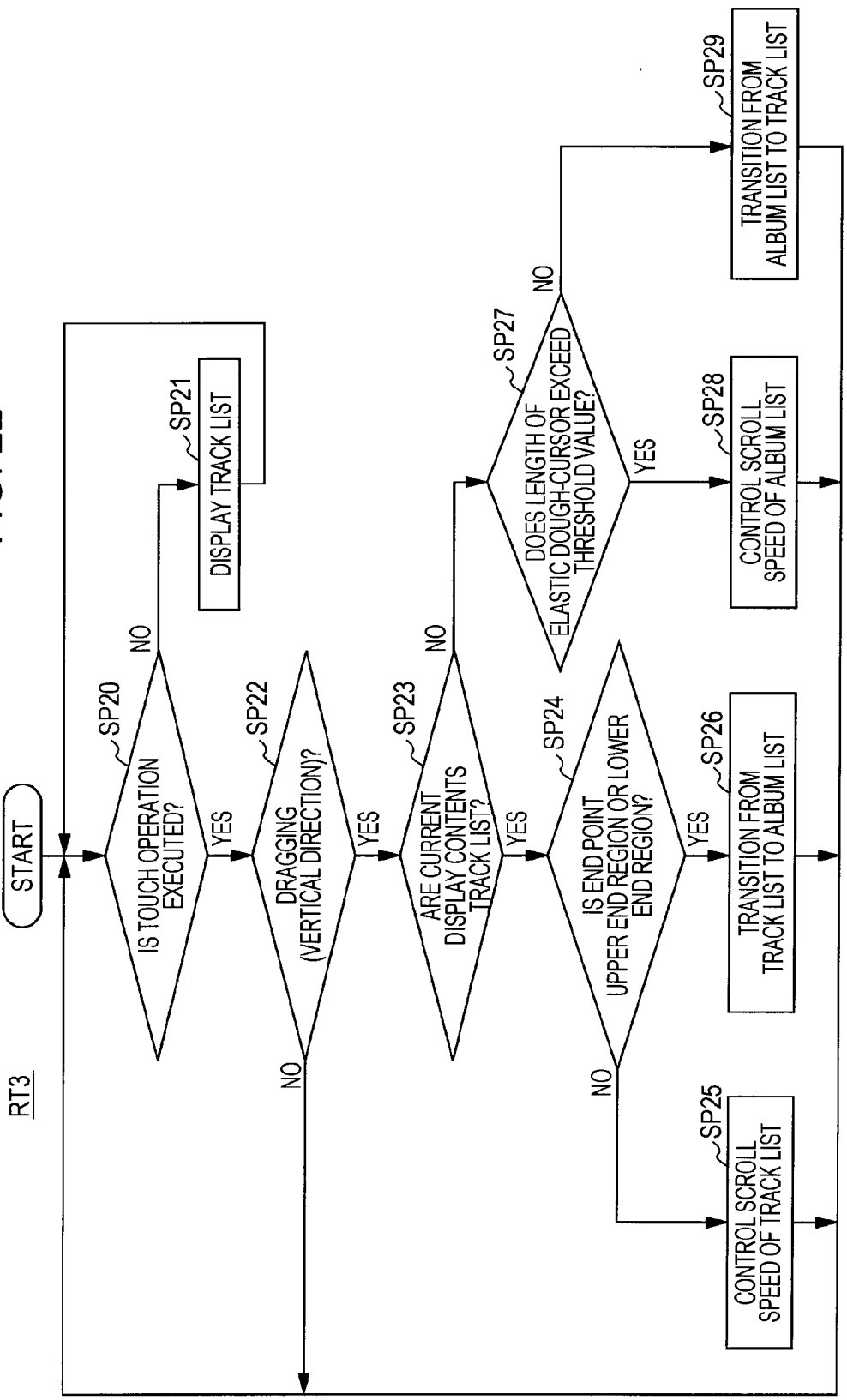
FIG. 22 is a flowchart illustrating an input operation processing sequence (3).

An input operation processing sequence RT3 shown in FIG. 22 is a processing sequence executed by the CPU 110 of the portable terminal 100 in accordance with the program for the music reproduction app stored in the non-volatile memory 111.

When the CPU 110 operates the music reproduction app, the CPU 110 starts the input operation processing sequence RT3. Then, the process proceeds to step SP20. In step SP20, the CPU 110 determines whether a touch operation is executed on the touch panel 102B based on a signal input from the touch panel 102B.

When a negative result is obtained in step SP20, the CPU 110 allows the process to proceed to step SP21, displays the track list on the track selection screen 210, and then returns the process to step SP20 again.

On the other hand, when a positive result is obtained in step SP20 described above, the CPU 110 allows the process to proceed to step SP22. In step SP22, the CPU 110 appropriately displays the elastic dough-cursor Cs in response to the touch operation and determines whether the touch operation is the dragging in the vertical direction of the screen.

When a negative result is obtained in step SP22, the CPU 110 returns the process to step SP20 again. On the other hand, when a positive result is obtained in step SP22, the CPU 110 allows the process to proceed to step SP23.

In step SP23, the CPU 110 determines whether the current display contents are the track list. When a positive result is obtained in step SP23, the CPU 110 allows the process to proceed to step SP24.

In step SP24, the CPU 110 determines whether the end point (that is, the end point of the dragging) of the elastic dough-cursor Cs being displayed is within the upper end region 210A or the lower end region 210C.

When a negative result is obtained in step SP24, the negative result indicates that the current display contents is the track list and the end point of the elastic dough-cursor Cs is not within the upper end region 210A and the lower end region 210C and is within the middle region 210B.

At this time, the CPU 110 allows the process to proceed to step SP25, controls the scroll speed of the track list in accordance with the direction and the length of the elastic dough-cursor Cs being displayed, and then returns the process to step SP20 again.

On the other hand, when a positive result is obtained in step SP24 described above, the positive result indicates that the current display contents are the track list and the end point of the elastic dough-cursor Cs is within the upper end region 210A or the lower end region 210C (that is, the region other than the middle region 210B).

At this time, the CPU 110 allows the process to proceed to step SP26, transitions the display contents from the track list to the album list serving as the information of the upper level, and then returns the process to step SP20 again.

On the other hand, when a negative result is obtained in step SP23 described above, the negative result indicates that the current display contents are the album list.

At this time, the CPU 110 allows the process to proceed to step SP27 and determines whether the length of the elastic dough-cursor Cs being displayed exceeds the predetermined threshold value.

When a positive result is obtained in step SP27, the positive result indicates that the current display contents are the album list and the length of the elastic dough-cursor Cs exceeds the predetermined threshold value.

At this time, the CPU 110 allows the process to proceed to step SP28, controls the scroll speed of the album list in accordance with the direction and the length of the elastic dough-cursor Cs, and then returns the process to step SP20 again.

On the other hand, when a negative result is obtained in step SP27 described above, the negative result indicates that the current display contents are the album list and the length of the elastic dough-cursor Cs is equal to or less than the predetermined threshold value.

At this time, the CPU 110 allows the process to proceed to step SP29, transitions the display contents from the album list to the track list serving as the information of the lower level, and then returns the process to step SP20 again.

According to this input operation processing sequence RT3, the CPU 110 performs the change in the display contents and the scroll of the track list and the album list in response to the input operation executed with the elastic dough-cursor Cs in the dragging.

2-4-3. Input Operation Processing Sequence of Still Image Reproduction Application Next, an input operation processing sequence will be described with reference to the flowchart shown in FIG. 23 when the adjustment of the zoom rate which is a parameter of the still image is performed by the still image reproduction app.

Figure 23:
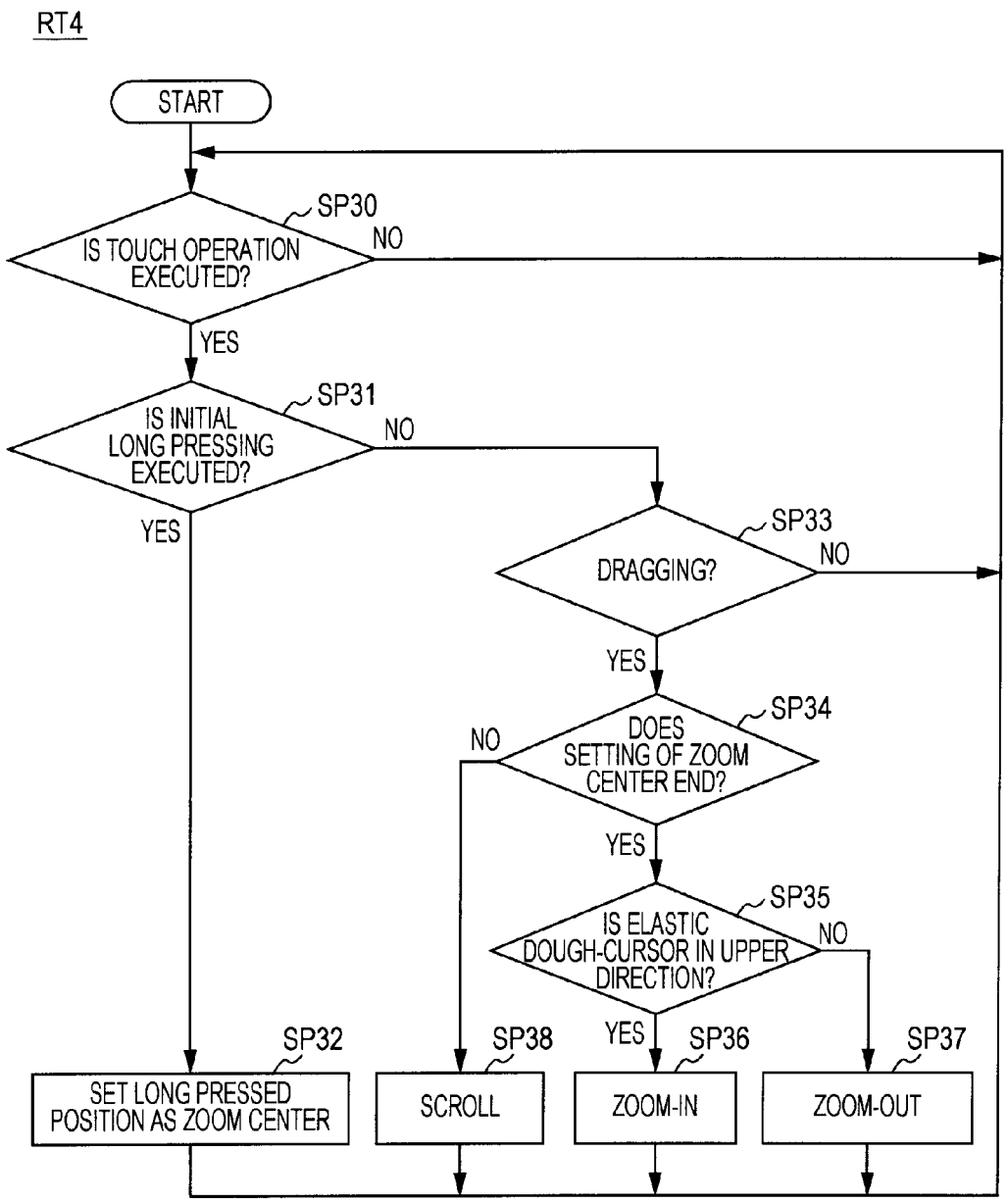
FIG. 23 is a flowchart illustrating an input operation processing sequence (4).

An input operation processing sequence RT4 shown in FIG. 23 is a processing sequence executed by the CPU 110 of the portable terminal 100 in accordance with the program for the still image reproduction app stored in the non-volatile memory 111.

When the CPU 110 operates the still image reproduction app and one of the thumbnails of the listed still images is tapped, the CPU 110 starts the input operation processing sequence RT4. Then, the process proceeds to step SP30. In step SP30, the CPU 110 determines whether a touch operation is executed on the touch panel 102B based on a signal input from the touch panel 102B.

In step SP30, the CPU 110 waits until obtaining a positive result. When the CPU 110 obtains the positive result, the CPU 110 allows the process to proceed to step SP31.

In step SP31, the CPU 110 determines whether this touch operation is the initial long press on the still image being displayed based on the signal input from the touch panel 102B. Here, the initial long press refers to a long press at an initially touched position during the series of touch operations in which the user touches the touch panel 102 with his or her finger and detaches his or her finger from the touch panel 102.

When a positive result is obtained in step SP31, the CPU 110 allows the process to proceed to step SP32. In step SP32, the CPU 110 displays the elastic dough-cursor Cs at the long pressed position, sets the long pressed position as the zoom center, and then returns the process to step SP30.

On the other hand, when a negative result is obtained in step SP31 described above, the CPU 110 allows the process to proceed to step SP33. In step SP33, the CPU 110 determines whether a touch operation is the dragging based on a signal input from the touch panel 102B.

When a negative result is obtained in step SP33, the CPU 110 returns the process to step SP30 again. On the other hand, when a positive result is obtained in step SP33, the CPU 110 allows the process to proceed to step SP34.

In step SP34, the CPU 110 determines whether the setting of the zoom center already ends.

When a positive result is obtained in step SP34, the positive result indicates that the setting of the zoom center ends, that is, the currently executed dragging is the dragging from the long press.

At this time, the CPU 110 allows the process to proceed to step SP35 and determines whether the direction of the elastic dough-cursor Cs being displayed is the upward direction (that is, the end point of the dragging is located above the start point of the dragging).

When a negative result is obtained in step SP35, the negative result indicates that the direction of the elastic dough-cursor Cs is the upward direction (that is, the end point of the dragging is located above the start point of the dragging).

At this time, the CPU 110 allows the process to proceed to step SP36. In step SP36, the CPU 110 increases (zooms in) the magnification rate of the still image at the adjustment speed corresponding to the direction (upward direction) and the length of the elastic dough-cursor Cs being displayed by using the position set as the zoom center as a center, and then returns the process to step SP30 again.

On the other hand, when a negative result is obtained in step SP35 described above, the negative result indicates that the direction of the elastic dough-cursor Cs is the downward direction (that is, the end point of the dragging is located below the start point of the dragging).

At this time, the CPU 110 allows the process to proceed to step SP37. In step SP37, the CPU 110 decreases (zooms out) the reduction rate of the still image at the adjustment speed corresponding to the direction (downward direction) and the length of the elastic dough-cursor Cs being displayed by using the position set the zoom center as a center, and then returns the process to step SP30 again.

On the other hand, when a negative result is obtained in step SP34 described above, the negative result indicates that the zoom center is not set, that is, the currently executed dragging is the dragging (or flicking) from the short press.

At this time, the CPU 110 allows the process to proceed to step SP38 and scrolls the still images in accordance with the direction and the length of the dragging (or the direction and the length of the flicking). Then, the process returns to step SP30.

According to this input operation processing sequence RT4, the CPU 110 performs the adjustment of the zoom rate which is a parameter of the still image in response to the input operation executed with the elastic dough-cursor Cs in the dragging.

Next, an input operation processing sequence will be described with reference to the flowchart shown in FIG. 24 when the adjustment of the luminance and the saturation is performed by the still image reproduction app.

Figure 24:
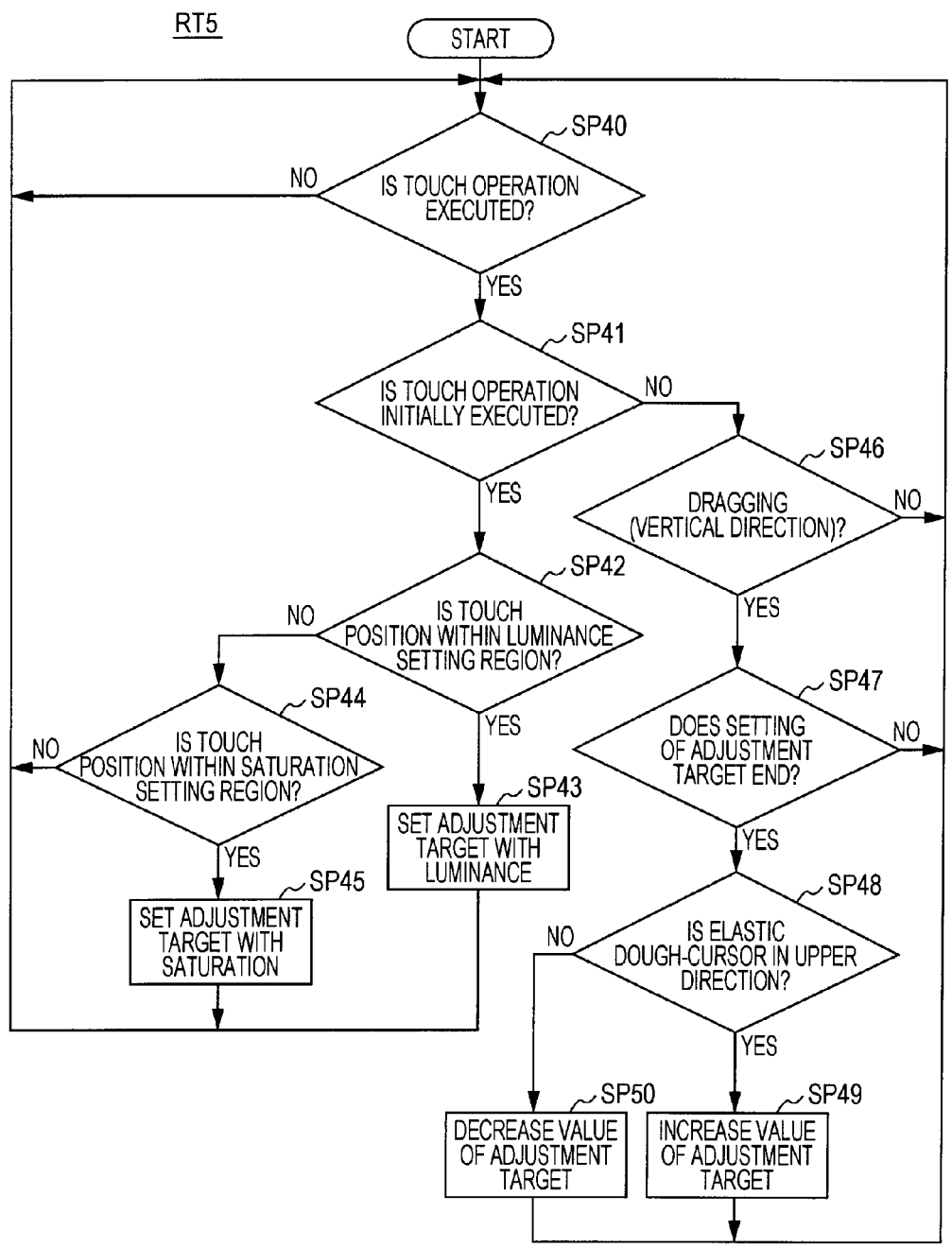
FIG. 24 is a flowchart illustrating an input operation processing sequence (5).

An input operation processing sequence RT5 shown in FIG. 24 is a processing sequence executed by the CPU 110 of the portable terminal 100 in accordance with the program for the still image reproduction app stored in the non-volatile memory 111.

When the CPU 110 extracts and displays the luminance saturation palette 221 on the still image reproduction screen 220, the CPU 110 starts the input operation processing sequence RT5. Then, the process proceeds to step SP40. In step SP40, the CPU 110 determines whether a touch operation is executed on the touch panel 102B based on a signal input from the touch panel 102B.

In step SP40, the CPU 110 waits until obtaining a positive result. When the CPU 110 obtains the positive result, the CPU 110 allows the process to proceed to step SP41.

In step SP41, the CPU 110 determines whether the touch operation is the initial touch. Here, the initial touch refers to a touch at an initially touched position during the series of touch operations in which the user touches the touch panel 102 with his or her finger and detaches his or her finger from the touch panel 102.

When a negative result is obtained in step SP41, the CPU 110 returns the process to step SP40 again. On the other hand, when a positive result is obtained in step SP41, the CPU 110 allows the process to proceed to step SP42.

In step SP42, the CPU 110 determines whether the initially touched position is within the luminance setting region 221L.

When a positive result is obtained in step SP42, the positive result indicates that the initially touched position is within the luminance setting region 221L. At this time, the CPU 110 allows the process to proceed to step SP43.

In step SP43, the CPU 110 displays the elastic dough-cursor Cs at the touched position, sets the luminance of an adjustment target, and then returns the process to step SP40 again.

On the other hand, when a negative result is obtained in step SP42, the negative result indicates that the initially touched position is not within the luminance setting region 221L.

At this time, the CPU 110 allows the process to proceed to step SP44 and determines whether the initially touched position is within the saturation setting region 221R.

When a negative result is obtained in step SP44, the negative result indicates that the initially touched position is not within the luminance setting region 221L and the saturation setting region 221R. At this time, the CPU 110 returns the process to step SP40 again.

On the other hand, when a positive result is obtained in step SP44, the positive result indicates that the initially touched position is within the saturation setting region 221R. At this time, the CPU 110 allows the process to proceed to step SP45.

In step SP45, the CPU 110 displays the elastic dough-cursor Cs at the touched position, sets the saturation of an adjustment target, and then returns the process to step SP40 again.

On the other hand, when a negative result is obtained in step SP41, the negative result indicates that the touch operation is not the initial touch.

At this time, the CPU 110 allows the process to proceed to step SP46 and determines whether this touch operation is the dragging in the vertical direction.

When a negative result is obtained in step SP46, the negative result indicates that the touch operation is neither the initial touch nor the dragging. At this time, the CPU 110 returns the process to step SP40 again.

On the other hand, when a positive result is obtained in step SP46 described above, the positive result indicates that the touch operation is the dragging in the vertical direction. At this time, the CPU 110 allows the process to proceed to step SP47.

In step SP47, the CPU 110 determines whether the setting of the adjustment target ends.

When a negative result is obtained in step SP47, the negative result indicates that the adjustment target is not set, that is, the currently executed dragging is the dragging from the touch executed toward the outside of the luminance setting region 221L and the saturation setting region 221R. At this time, the CPU 110 returns the process to step SP40 again.

On the other hand, when a positive result is obtained in step SP47 described above, the positive result indicates that the setting of the adjustment target already ends, that is, the currently executed dragging is the dragging from the touch executed within the luminance setting region 221L or the saturation setting region 221R.

At this time, the CPU 110 allows the process to proceed to step SP48 and determines whether the direction of the elastic dough-cursor Cs being displayed is the upward direction (that is, the end point of the dragging is located above the start point of the dragging).

When a negative result is obtained in step SP48, the negative result indicates that the direction of the elastic dough-cursor Cs is the upward direction (that is, the end point of the dragging is located above the start point of the dragging).

At this time, the CPU 110 allows the process to proceed to step SP49, increases the value of the adjustment target (luminance or saturation) at the adjustment speed corresponding to the direction (upward direction) and the length of elastic dough-cursor Cs being displayed, and then returns the process to step SP40 again.

On the other hand, when a negative result is obtained in step SP48 described above, the negative result indicates that the direction of the elastic dough-cursor Cs is the downward direction (that is, the end point of the dragging is located below the start point of the dragging).

At this time, the CPU 110 allows the process to proceed to step SP50, decreases the value of the adjustment target (luminance or saturation) at the adjustment speed corresponding to the direction (downward direction) and the length of the elastic dough-cursor Cs being displayed, and then returns the process to step SP40 again.

According to the input operation processing sequence RT5, the CPU 110 performs the adjustment of the luminance and the saturation, which are the parameters of the still image, in response to the input operation executed with the elastic dough-cursor Cs in the dragging.

2-5. Operations and Advantages of First Embodiment

In the above-described configuration, the CPU 110 of the portable terminal 100 displays the elastic dough-cursor Cs elongating from the start point to the end point of the dragging and has the shape thickening from the side of the start point to the side of the end point of the dragging when the dragging is executed on the touch screen 102.

Since the elastic dough-cursor Cs elongates from the start point to the end point of the dragging, the user can recognize the distance (start/end point distance) between the start point and the end point of the dragging in the portable terminal 100.

Further, since the elastic dough-cursor Cs has the shape thickening from the side of the start point to the side of the end point of the dragging, the size of one end portion of the elastic dough-cursor Cs on the start point side of the dragging is different from the size of the other end portion thereof on the end point side of the dragging.

Thus, in the portable terminal 100, the user can distinguish the start point side of the dragging from the end point side thereof in the elastic dough-cursor Cs. As a consequence, in the portable terminal 100, the user can recognize the positions (start/end point positions) of the start point and the end point of the dragging and the direction (start/end point direction) from the start point to the end point of the dragging.

Thus, in the portable terminal 100, the user can execute the dragging while recognizing the positions of the start point and the end point of the dragging, the distance between the start point and the end point of the dragging, and the direction from the start point to the end point of the dragging.

Instead of the elastic dough-cursor Cs, for example, it can be considered that one cursor is displayed in each of the start point and the end point of the dragging. In this case, however, since two cursors are separately displayed, it is difficult for the user to understand the relationship between the two cursors. Accordingly, it is difficult to show the user the fact that the two cursors indicate the positions of the start point and the end point of the dragging, respectively.

When two cursors are displayed, the user may not intuitively decide whether the apparatus exactly recognizes the movement of the finger as dragging or recognizes two portions to be erroneously tapped.

Accordingly, in the portable terminal 100 according to the embodiment of the disclosure, it is configured that one elastic dough-cursor Cs elongating from the start point to the end point of the dragging is displayed.

Thus, in the portable terminal 100, the user can easily recognize the positions of the start point and the end point of the dragging with the elastic dough-cursor Cs. Further, the fact that the movement of the finger is exactly recognized as the dragging can be fed back to the user.

In the portable terminal 100 according to the embodiment of the disclosure, the distance between the start point and the end point of the dragging is visualized with the length of the elastic dough-cursor Cs. Therefore, the user can recognize the distance between the start point and the end point of the dragging more clearly, compared to the case where two cursors are displayed, as described above.

Further, in the portable terminal 100 according to the embodiment of the disclosure, the direction from the start point to the end point of the dragging is visualized with the shape of the elastic dough-cursor Cs. Therefore, the user can recognize the direction from the start point to the end point of the dragging more clearly, compared to the case where two cursors are displayed, as described above.

According to the above-described configuration, the portable terminal 100 displays the elastic dough-cursor Cs elongating from the start point to the end point of the dragging and has the shape thickening from the start point side of the dragging in the end point side thereof on the touch screen 102. Thus, in the portable terminal 100, the user can execute the dragging while recognizing the positions of the start point and the end point of the dragging, the distance between the start point and the end point of the dragging, and the direction from the start point to the end point of the dragging. Accordingly, it is possible to further improve operability when an input operation is executed in the dragging.

3. SECOND EMBODIMENT

Next, a second embodiment will be described. In the second embodiment, an app (also referred to as a map display app) displaying a map is installed as an app corresponding to the input operation executed with the elastic dough-cursor Cs in the portable terminal 100.

The hardware configuration of the portable terminal 100 and the basic operation of the input operation executed with the elastic dough-cursor Cs are the same as those of the first embodiment, and thus will be described with reference to the first embodiment. Hereinafter, an input operation executed with the elastic dough-cursor Cs in the map display app will be described.

3-1. Example of Input Operation in Map Display App

When an icon used to operate the map display app is displayed on the touch screen 102 and this icon is tapped in this state, the CPU 110 of the portable terminal 100 receives this touch operation as an input operation of operating the map display app.

Then, the CPU 110 operates the map display app by reading a program for the map display app from the non-volatile memory 111 and executing the program.

Figure 25:
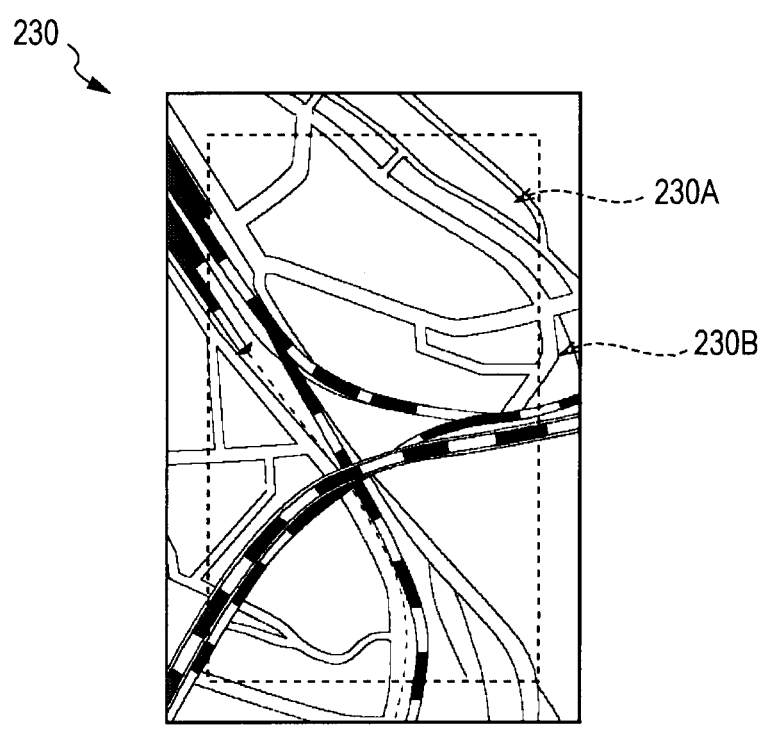
FIG. 25 is a schematic diagram illustrating the configuration of a map image.

When the CPU 110 operates the map display app, the CPU 110 displays a map screen 230 shown in FIG. 25 on the touch screen 102. The map screen 230 is a vertically long screen and is displayed on the entire surface of the touch screen 102 on the assumption that the map screen 230 is used in the vertical direction.

The map screen 230 is divided into two regions: a middle region 230A which is a rectangular region having the middle of the screen as a center and an outer region 230B which is a region surrounding the outside of the middle region 230A. Here, for example, it is supposed that the vertical length and the horizontal length of the middle region 230A are each about 80% of the vertical length and the horizontal length of the map screen. A frame Fr1 (see FIG. 26A) indicating the middle region 230A is displayed on the map screen 230.

The CPU 110 reads map information data of an arbitrary place (for example, a place set in advance for a user) from the non-volatile memory 110 and displays a map image on the map screen 230 based on the map information data. Further, at least a part of the map image is displayed on the map screen 230.

On the map screen 230, the scroll of the map image can be controlled by dragging.

In effect, as shown in FIG. 26A, it is supposed that the dragging is executed in the upper right direction of the screen. Then, the CPU 110 determines whether the end point of the dragging is within the middle region 230A of the screen.

When the end point of the dragging is within the middle region 230A, the CPU 110 sets a normal scroll mode as a scroll mode and controls the scroll of the map image in accordance with the direction and the length of the dragging. That is, the CPU 110 controls the scroll by general dragging.

Specifically, the CPU 110 scrolls the map image in the same direction as that of the dragging only by a distance corresponding to the length of the dragging. Since the direction of the dragging is the upper right direction of the screen in FIG. 26A, the CPU 110 scrolls the map image only in the upper right direction of the screen by a distance corresponding to the length of the dragging.

As shown in FIG. 26B, it is supposed that the end point of the dragging comes out of the middle region 230A (that is, within the outside region 230B).

Then, the CPU 110 transitions the scroll mode to a elastic dough-scroll mode to delete the frame Fr1 from the screen and display the elastic dough-cursor Cs elongating from the start point to the end point of the dragging on the screen. The elastic dough-cursor Cs is displayed until the user detaches his or her finger from the touch screen 102 and the dragging ends.

When the CPU 110 displays the elastic dough-cursor Cs, the CPU 110 controls the scroll of the map image in accordance with the direction and the length of the elastic dough-cursor Cs.

Specifically, the CPU 110 sets the same direction as the direction of the elastic dough-cursor Cs as the scroll direction of the map image. Further, the CPU 110 sets the value of the scroll speed to be larger, as the length of the elastic dough-cursor Cs is longer.

As a consequence, when the elastic dough-cursor Cs elongates long toward the upper right by the dragging in the upper right direction of the screen, as shown in FIG. 26B, the map image displayed on the map screen 230 is scrolled fast in the upper right direction.

When the user does not move his or her finger without detaching his or her finger from the touch screen 102 after this dragging, the elastic dough-cursor Cs continues to be displayed without any change in the direction and the length of the elastic dough-cursor Cs and the scroll speed (the scroll direction and the value of the scroll speed) is maintained.

Further, it is supposed that the dragging continues without detaching the finger after the dragging, and then the end point (the end point of the dragging) of the elastic dough-cursor Cs returns from the region other than the middle region 230A to the middle region 230A again, as shown in FIG. 26C.

In this case, the CPU 110 continues the elastic dough-scroll mode and continuously controls the scroll speed of the map image in accordance with the direction and the length of the elastic dough-cursor Cs. That is, after the transition to the elastic dough-scroll mode, the CPU 110 continues the elastic dough-scroll mode irrespective of the position of the end point of the dragging until the user detaches his or her finger and the dragging ends.

Thereafter, when the dragging ends, the CPU 110 ends the scroll of the map image, shrinks the elastic dough-cursor Cs having elongated up to the circle shape of the elastic dough-cursor Cs, deletes the elastic dough-cursor Cs from the screen, and then displays the frame Fr1 again.

When the dragging is executed in the map display app, as described above, the normal scroll mode is set and the scroll control is performed by the general dragging until the end point of the dragging comes out of the middle region 230A.

On the other hand, in the map display app, when the end point of the dragging comes out of the middle region 230A, the normal scroll mode is transitioned to the elastic dough-scroll mode and the scroll direction of the map image and the value of the scroll speed are controlled in accordance with the direction and the length of the elastic dough-cursor Cs.

Thus, in the map display app, the user just executes the simple operation of allowing the end point of the dragging to come out of the middle region 230A, so that the scroll control of the general dragging is transitioned to the control of the scroll speed performed with the elastic dough-cursor Cs.

Accordingly, the user can easily select the scroll control of the general dragging and the control of the scroll speed performed with the elastic dough-cursor Cs by executing only the dragging.

4. OTHER EMBODIMENTS

4-1. Other Embodiment 1

In the above-described first embodiment, the control of the reproduction speed of the chapters, the change between the chapters and the chapter list (change between the levels), and the control of the adjustment speed of the volume are configured to be performed by the input operation executed with the elastic dough-cursor Cs in the video reproduction app.

However, embodiments of the disclosure are not limited thereto. Instead, in another app, the control of the reproduction speed of various kinds of contents, the change between the levels, and the control of the adjustment speed of various kinds of parameters may be performed by the input operation executed with the elastic dough-cursor Cs.

For example, in the music reproduction app, the control of the reproduction speed of music (track) may be performed by an input operation executed with the elastic dough-cursor Cs.

In this case, for example, when a track is selected from a track list, the CPU 110 displays information (the title of the track, a jacket image, or the like) regarding the track and normally reproduces the track.

Thereafter, when the dragging is executed in the horizontal direction of the screen, the CPU 110 displays the elastic dough-cursor Cs in the horizontal direction in response to the dragging and sets the reproduction direction of the track and the value of the reproduction speed in accordance with the direction (left or right direction) and the length of the elastic dough-cursor Cs.

At this time, when the end point of the elastic dough-cursor Cs enters a predetermined region provided both right and left ends of the screen, the display contents of the screen may be transitioned from the information regarding the track to the track list of the upper level to newly change the level.

Thus, in the music reproduction app, the control of the reproduction speed of the music (track) and the change from the information regarding the track to the track list of the upper level can be performed, as in the video reproduction app.

In the above-described first embodiment, the scroll speed of the track list is controlled by the input operation executed with the elastic dough-cursor Cs in the music reproduction app.

However, embodiments of the disclosure are not limited thereto. In another app, the scroll speed of various displays (images, texts, lists, or the like) may be controlled by the input operation executed with the elastic dough-cursor Cs.

For example, in a Web browser, the scroll speed of a page image may be controlled by the input operation executed with the elastic dough-cursor Cs.

In this case, for example, when a page image is displayed on the screen of the Web browser and dragging is executed in the vertical direction of the screen in this state, the CPU 110 displays the elastic dough-cursor Cs in the vertical direction in response to the dragging. Then, the CPU 110 sets the scroll direction of the page image and the value of the scroll speed in accordance with the direction (upper or downward direction) and the length of the elastic dough-cursor Cs.

The scroll direction is not limited to a one-dimensional direction (a vertical direction or a horizontal direction). However, an entire display, such as a map, a photo, or an enlarged document, extending in the upper, lower, right, and left directions in the display range may be scrolled in a two-dimensional direction.

In some cases, some displays are easier to confirm visually when the displays are intermittently scrolled at a given unit interval than when the displays are continuously scrolled under to the control of the scroll speed.

For example, when one sheet of thumbnail is displayed and a few seconds are waited in a state where a list of the thumbnails is scrolled, an intermittent scroll of scrolling this thumbnail and displaying the subsequent thumbnail improves visibility for one thumbnail by one thumbnail.

In this case, the value of the scroll speed is not set in accordance with the length of the elastic dough-cursor Cs, but a waiting time may be set between the scrolls.

In this way, the scroll direction of the intermittent scroll and the waiting time can be controlled with the direction and the length of the elastic dough-cursor Cs.

The continuous scroll or the intermittent scroll may be set by the user. Alternatively, the CPU 110 may automatically set the continuous scroll or the intermittent scroll based on setting information set for each display.

As other examples in which the intermittent scroll is effective, a display is a document or a document plus a chart.

In effect, when the display is a document, for example, the intermittent scroll is sometimes executed in a line unit, a sentence unit, or a page unit including a retrieved word string.

When the display is a document plus a chart, for example, the intermittent scroll is sometimes executed in a page unit including the chart.

Further, embodiments of the disclosure are not limited to an app. Instead, in various kinds of software such as an OS, the control of the scroll speed of a display, a change between levels, the control of the adjustment speed of various kinds of parameters, and the control of the waiting time may be performed by the input operation executed with the elastic dough-cursor Cs. Here, the OS is an abbreviation of an operating system.

For example, in the OS, the scroll speed of a folder list or a file list may be controlled with an input operation executed with the elastic dough-cursor Cs. Further, the levels may be newly switched from a file to a folder. For example, the adjustment speed of the resolution of a screen may also be controlled. For example, a waiting time of a slide show of images may also be controlled.

4-2. Other Embodiment 2

In the above-described first embodiment, when an arbitrary portion of the still image continues to be touched for the predetermined time (that is, the long press can be executed) in the still image reproduction app, the elastic dough-cursor Cs is configured to be displayed at the touched position.

Figure 27A:
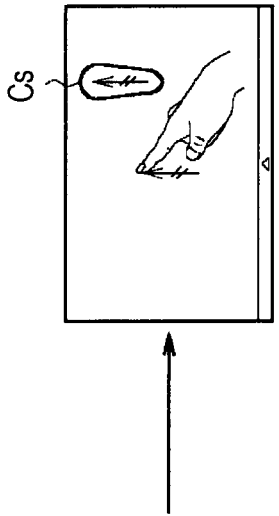
FIGS. 27A to 27C are schematic diagrams illustrating an example of an input operation executed with the elastic dough-cursor in a still image reproduction app according to a different embodiment.

However, embodiments of the disclosure are not limited thereto. Instead, when an arbitrary portion of the still image is tapped (a finger is touched and detached), as shown in FIG. 27A, the elastic dough-cursor Cs may be displayed at this position.

Specifically, when an arbitrary portion of the still image is tapped, the CPU 110 displays the elastic dough-cursor Cs with a circle shape having the tapped position as a center at the tapped position and sets the tapped position as a zoom center. The tapped position becomes the start point of the elastic dough-cursor Cs.

Thereafter, it is supposed that when the elastic dough-cursor Cs with the circle shape is touched and dragging is executed in the vertical direction of the screen. Then, in response to the dragging, the CPU 110 elongates the elastic dough-cursor Cs in the direction of the dragging from the start point of the elastic dough-cursor Cs so that the length of the elastic dough-cursor Cs is the same as the distance between the start point and the end point of the dragging.

Then, the CPU 110 controls the adjustment speed of the zoom rate (magnification rate/reduction rate) of the still image in accordance with the direction and the length of the elastic dough-cursor Cs of this time.

In this case, the circular elastic dough-cursor Cs may not be necessarily touched. Instead, even when a portion other than the elastic dough-cursor Cs is touched and dragged, the adjustment speed of the zoom rate may be controlled as in the case where the elastic dough-cursor Cs is touched and dragged.

Figure 27B:
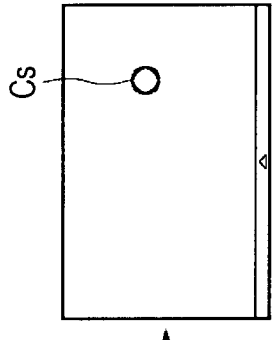
Figure 27C:
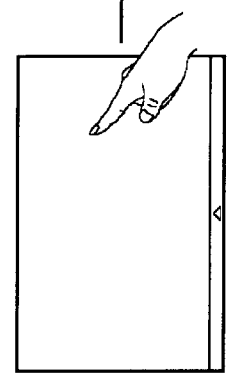

In effect, as shown in FIGS. 27B and 27C, it is supposed that when the circular elastic dough-cursor Cs is displayed, a portion other than the elastic dough-cursor Cs is touched and the dragging is executed in the vertical direction of the screen. In this case, in response to the dragging, the CPU 110 elongates the elastic dough-cursor Cs in a direction parallel to the direction of the dragging from the start point of the elastic dough-cursor Cs so that the length of the elastic dough-cursor Cs is the same as the distance between the start point and the end point of the dragging.

As a consequence, the elastic dough-cursor Cs elongates long as in the case where the elastic dough-cursor Cs is touched and dragged.

Then, the CPU 110 controls the adjustment speed of the zoom rate (magnification rate/reduction rate) of the still image in accordance with the direction and the length of the elastic dough-cursor Cs of this time.

As a consequence, the adjustment speed of the zoom rate becomes the same as the adjustment speed when the elastic dough-cursor Cs is touched.

Thus, the dragging is not executed after the elastic dough-cursor Cs is touched precisely. Therefore, the operability can be improved. In particular, it is more effective when the touch screen 102 is small and the elastic dough-cursor Cs being displayed is small.

Thereafter, when the dragging ends, the CPU 110 shrinks the elastic dough-cursor Cs up to the circle shape and pauses the adjustment of the zoom rate. When the tapping is executed again, the elastic dough-cursor Cs is deleted from the screen, the zoom center is reset, and the adjustment of the zoom rate ends. As well as the tapping, the elastic dough-cursor Cs may be displayed in response to various operations such as double-tapping (twice-continuously tapping). Further, embodiments of the disclosure are not limited thereto. Instead, the elastic dough-cursor Cs may be displayed at the time at which the touch position is moved by a distance equal to or greater than a predetermined threshold value and the CPU 110 determines that the touch operation is the dragging. The method of displaying the elastic dough-cursor Cs may be modified for each app.

4-3. Other Embodiment 3

In the above-described first embodiment, for example, in the music reproduction app, the information regarding the two levels of the track list and the album list is newly switched by the input operation executed with the elastic dough-cursor Cs.

However, embodiments of the disclosure are not limited thereto. Information regarding three or more levels may be changed by the input operation executed with the elastic dough-cursor Cs.

For example, it is supposed that a music file is managed with three hierarchical structures: the uppermost level of an artist name, the middle level of an album title, and the lowermost level of a track title.

In this case, for example, the CPU 110 first displays the track list serving as the information of the lowermost level on the track selection screen 210. Here, it is supposed that the end point of the elastic dough-cursor Cs comes from the middle region 210B to the upper end region 210A or the lower end region 210C by the dragging in the vertical direction of the screen. Then, the CPU 110 transitions the display contents from the track list to the album list serving as the information of the level higher by one.

Thereafter, it is supposed that the dragging continues and the length of the elastic dough-cursor Cs decreases up to a value equal to or less than a predetermined threshold value. Then, the CPU 110 transitions the display contents from the album list to the track list serving as the information of the level lower by one.

It is supposed that after the change to the album list is completed, the dragging continues so that the end point of the elastic dough-cursor Cs returns to the middle region 210B and comes within the upper end region 210A or the lower end region 210C again. Then, the CPU 110 transitions the display contents from the album list to the artist list serving as the information of the level upper by one.

Thereafter, it is supposed that the dragging continues so that the length of the elastic dough-cursor Cs decreases up to a value equal to or less than the predetermined threshold value. Then, the CPU 110 transitions the display contents from the artist list to the alum list serving as the information of the level lower by one.

When the dragging ends, the CPU 110 transitions the display contents to the track list serving as the information of the lowermost level irrespective of the current display contents.

Further, embodiments of the disclosure are not limited thereto. Instead, in various kinds of applications, information of a plurality of hierarchical levels may newly be changed in sequence when the end point of the elastic dough-cursor Cs comes within a predetermined region set in the screen.

In the above-described first embodiment, the information of the level is newly changed from the chapters to the chapter list in the video reproduction app. However, embodiments of the disclosure are not limited thereto. For example, the chapters may newly be changed from a chapter to the subsequent chapter.

That is, it is supposed that the CPU 110 allows the end point of the elastic dough-cursor Cs to come from the middle region 200B to the right end region 200C by the dragging in the horizontal direction of the screen. Then, the CPU 110 changes the display contents to the subsequent chapter of the currently displayed chapter.

On the other hand, it is supposed that the end point of the elastic dough-cursor Cs comes from the middle region 200B to the left end region 200A by the dragging in the horizontal direction of the screen. Then, the CPU 110 changes the display contents to the chapter immediately before the currently displayed chapter.

Thereafter, when the dragging ends, the CPU 110 returns the reproduction of the chapter being displayed at this time to the normal reproduction.

However, embodiments of the disclosure are not limited thereto. In various kinds of applications, the information to be displayed may newly be changed in sequence when the end point of the elastic dough-cursor Cs comes within a predetermined region set in the screen.

The position and the size of this region are not limited. However, in the video reproduction app, the position of the region is preferably in the right or left end located on the extension line of the elastic dough-cursor Cs in that the reproduction speed of the chapter is controlled by elongating the elastic dough-cursor Cs in the horizontal direction.

In the music reproduction app, the position of the region is preferably in the upper or lower end in that the scroll of the list is controlled by elongating the elastic dough-cursor Cs in the vertical direction.

4-4. Other Embodiment 4

In the above-described first embodiment, when the upper end portion of the luminance saturation palette 221 being displayed in the lower end of the still image reproduction screen 220 is touched and the flicking is executed in the upper direction of the screen, the luminance saturation palette 221 is configured to be extracted on the screen.

However, embodiments of the disclosure are not limited thereto. Instead, when a separate menu or the like is displayed on the still image reproduction screen 220 and a luminance saturation setting is selected in the menu, the luminance saturation palette 221 may be configured to be displayed on the screen.

In the above-described first embodiment, the luminance saturation palette 221 is configured to be displayed at the position and with the size of the entire screen.

However, embodiments of the disclosure are not limited thereto. For example, the luminance saturation palette 221 may be displayed at the position and with the size of the lower half or the upper half of the screen or may be displayed at the position and with the size of a middle portion including the center line halving the screen into the upper and lower parts.

At this time, when the start point of the dragging is a portion which is not covered with the luminance saturation palette 221, the still image being displayed on the screen may be scrolled in response to the dragging.

In this case, the CPU 110 controls the scroll of the still image in response to the direction and the length of the dragging (or flicking).

In this way, when the start point of the dragging is within the luminance saturation palette 221, the luminance and the saturation may be adjusted. When the start point of the dragging is on a still image other than the luminance saturation palette 221, the still image may be scrolled. In this way, the process to be performed may be changed depending on the position of the dragging.

In the above-described first embodiment, the luminance saturation palette 221 is displayed which includes the luminance setting region 221L used to adjust luminance and the saturation setting region 221R used to adjust saturation.

However, embodiments of the disclosure are not limited thereto. For example, a luminance palette (not shown) may be displayed which includes a luminance increase region used to increase luminance and a luminance decrease region used to decrease luminance.

In this case, when the dragging is executed in the vertical direction from the inside of the luminance increase region as the start point, the CPU 110 displays the elastic dough-cursor Cs of the vertical direction and gradually increases the luminance with the value of the adjustment speed corresponding to the length of the elastic dough-cursor Cs.

When the dragging is executed in the vertical direction from the inside of the luminance decrease region as the start point, the CPU 110 displays the elastic dough-cursor Cs of the vertical direction and gradually decreases the luminance with the value of the adjustment speed corresponding to the length of the elastic dough-cursor Cs.

Further, embodiments of the disclosure are not limited to the luminance or the saturation. Instead, regions corresponding to various kinds of parameters, such as lightness or sharpness, regarding an image quality may be provided and the parameter adjustable by the dragging may be changed depending on the region where the initial touch position is located.

4-5. Other Embodiment 5

In the above-described first and second embodiments, it is configured that the portable terminal 100 including the touch screen 102 is used as an operation device.

However, embodiments of the disclosure are not limited thereto, but may be applied to an information processing apparatus including other various kinds of operation devices.

Specifically, embodiments of the disclosure are applicable to an information processing apparatus including an operation device, such as a mouse, a button-attached touch pad, a button-attached joystick, a push-operable analog stick, or a camera, in which dragging is operable.

In effect, when the dragging is executed with a mouse, for example, the CPU 110 displays a pointer moving with the movement of the mouse on the screen. Thereafter, the user designates the start point of the dragging by moving the pointer to a desired position and clicking a button of the mouse. Here, the CPU 110 displays the elastic dough-cursor Cs. Then, the user executes the dragging by operating the mouse with the button clicked and moving the end point of the dragging (that is, the end point of the elastic dough-cursor Cs).

When the dragging is executed with the button-attached touch pad, for example, the CPU 110 displays the pointer moving in response to the touch operation executed on the screen with the touch pad. Thereafter, the user designates the start point of the dragging by moving the pointer to a desired position and pressing down the button of the touch pad. Here, the CPU 110 displays the elastic dough-cursor Cs. Then, the user executes the dragging by moving the touch position with the button pressed down and moving the end point of the dragging (that is, the end point of the elastic dough-cursor Cs).

When the dragging is executed with the joystick, for example, the CPU 110 displays a pointer moving in response to the slope of the joystick on the screen. Thereafter, the user designates the start point of the dragging by moving the pointer to a desired position and pressing down a button of the joystick. Here, the CPU 110 displays the elastic dough-cursor Cs. Then, the user executes the dragging by inclining the touch position with the button pressed down and moving the end point of the dragging (that is, the end point of the elastic dough-cursor Cs).

When the dragging is executed with the analog stick, for example, the CPU 110 displays a pointer moving in response to the slope of the analogy stick on the screen. Thereafter, the user designates the start point of the dragging by moving the pointer to a desired position and pushing in the analog stick. Here, the CPU 110 displays the elastic dough-cursor Cs. Then, the user executes the dragging by inclining the touch position with the analog stick pushed in and moving the end point of the dragging (that is, the end point of the elastic dough-cursor Cs).

When the dragging is executed with the camera, for example, the CPU 110 recognizes the motion of a finger based on an image photographed by the camera and displays a pointer moving in response to the motion of the finger on the screen. Thereafter, the user designates the start point of the dragging by moving the pointer to a desired position and executing a predetermined gesture (for example, a gesture of drawing a circle with the finger). Here, the CPU 110 displays the elastic dough-cursor Cs. Then, the user executes the dragging by further moving the finger and moving the end point of the dragging (that is, the end point of the elastic dough-cursor Cs).

The above-described operations are just examples. In other words, an operation of designating the start point and the end point of the dragging may be executed.

In the information processing apparatus including these operation devices as well as the touch screen 102, the operation device and the display device may be separately provided or the operation device may be connected to an external display device.

4-6. Other Embodiment 6

In the above-described first embodiment, the elastic dough-cursor Cs is configured to be displayed in response to the dragging.

Here, both the elastic dough-cursor Cs and processing information indicating which process is currently performed in response to the input operation executed with the elastic dough-cursor Cs may be displayed on the screen.

For example, when a video is being reproduced at an arbitrary reproduction speed in response to the input operation executed with the elastic dough-cursor Cs, the CPU 110 displays words such as "fast forward" or "rewind" representing the reproduction direction of this time on the screen. Alternatively, a numerals such as "2.0x" or "−1.5x" directly representing the reproduction direction and the value of the reproduction speed may be displayed or a sign such as ">>" or "<<<" indirectly representing the reproduction direction and the reproduction speed may be displayed.

Thus, the user can easily confirm which process is currently performed in response to the input operation executed with the elastic dough-cursor Cs.

When the value of the reproduction speed reaches the maximum value, the elastic dough-cursor Cs may not elongate over the maximum value. At this time, the elastic dough-cursor Cs may be displayed in a blinking manner or the information ("2.0x", ">>", or the like) representing the reproduction direction and the value of the reproduction speed may be displayed in a blinking manner.

That is, the display form of the elastic dough-cursor Cs or the information representing the value of the reproduction speed may be changed so that the user can know that the value of the reproduction speed reaches the maximum value.

4-7. Other Embodiment 7

In the above-described first embodiment, in the music reproduction app, the CPU 110 is configured to return from the album list to the track list so that the length of the elastic dough-cursor Cs is equal to or less than the predetermined threshold value after the transition to the album list.

Here, this operation may be applied to the video reproduction app. That is, in the video reproduction app, the CPU 110 may return from the chapter list to the chapters, when the length of the elastic dough-cursor Cs is equal to or less than the predetermined threshold value after the transition to the chapter list.

4-8. Other Embodiment 8

In the above-described first embodiment, the reproduction direction of the video and the value of the reproduction speed are configured to be controlled in accordance with the direction and the length of the elastic dough-cursor Cs.

However, embodiments of the disclosure are not limited thereto. The reproduction direction may be fixed and only the value of the reproduction speed of the video may be controlled in accordance with only the length of the elastic dough-cursor Cs irrespective of the direction of the elastic dough-cursor Cs.

Alternatively, the value of the reproduction speed of the video may be fixed and only the reproduction direction of the video may be controlled in accordance with only the direction of the elastic dough-cursor Cs irrespective of the length of the elastic dough-cursor Cs.

Alternatively, the scroll direction of the track list may be fixed and only the value of the scroll speed of the track list may be controlled in accordance with only the length of the elastic dough-cursor Cs irrespective of the direction of the elastic dough-cursor Cs.

Alternatively, the value of the scroll speed of the track list may be fixed and only the scroll direction of the track list may be controlled in accordance with only the direction of the elastic dough-cursor Cs irrespective of the length of the elastic dough-cursor Cs.

Alternatively, the value of the adjustment speed of the volume may be fixed and only the adjustment direction of the volume may be controlled in accordance with only the direction of the elastic dough-cursor Cs irrespective of the length of the elastic dough-cursor Cs.

Not only the reproduction of the contents, the change in the display contents, the scroll of the lists, and the adjustment of the parameters, but also other various processes may be performed by the input operation executed with the elastic dough-cursor Cs.

4-9. Other Embodiment 9

In the above-described first and second embodiments, the portable terminal 100 is configured to include the touch screen 102 that includes the liquid crystal panel 102A and the electrostatic capacity-type touch panel 102B.

However, embodiments of the disclosure are not limited thereto. Instead of the touch screen 102, the portable terminal 100 may include a liquid crystal display having a touch panel function.

Further, various displays, such as an EL (Electroluminescence) display, may be used as the liquid crystal panel 102A.

4-10. Other Embodiment 10

In the above-described first and second embodiments, the elastic dough-cursor Cs is configured to have the shape thickening from the start point C1 to the end point C2.

However, embodiments of the disclosure are not limited thereto. Instead, the shape of the elastic dough-cursor Cs may be various, as long as at least one of the size and the shape is different in one end portion which is the start point of the dragging and in the other end portion which is the end point of the dragging. Further, the size of the elastic dough-cursor Cs may be various.

Figure 28:
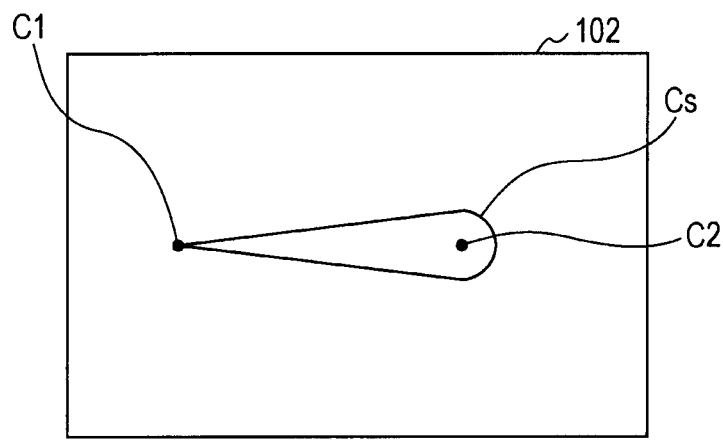
FIG. 28 is a schematic diagram illustrating a display (1) of the elastic dough-cursor according to a different embodiment.

For example, as shown in FIG. 28, the elastic dough-cursor Cs may be displayed with a so-called tear-type shape which thickens from the start point C1, which is the apex, to the end point C2 and in which the end of the end point C2 is round.

Figure 29:
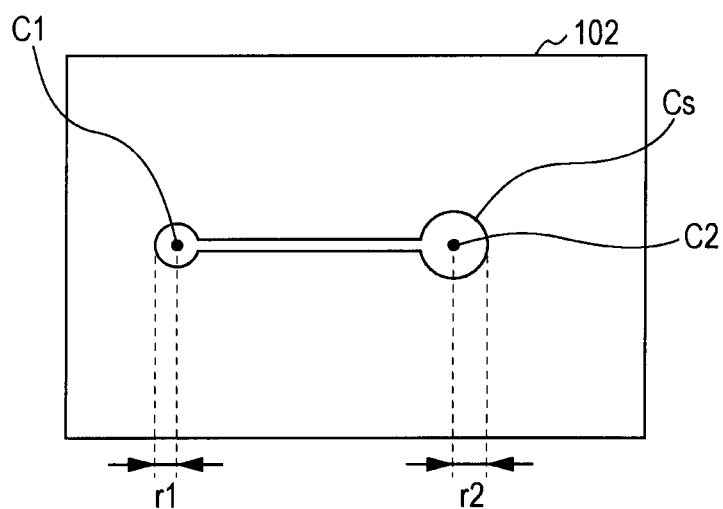
FIG. 29 is a schematic diagram illustrating a display (2) of the elastic dough-cursor according to a different embodiment.

For example, as shown in FIG. 29, the elastic dough-cursor Cs may be displayed so as to have a shape in which the end portion of the start point C1 has a circle with a radius r1, the end portion of the end point C2 has a circle with a radius r2 (where r2>r1), and the circles are connected to each other by a thin long rod-shaped line.

For example, the CPU 110 may display the elastic dough-cursor Cs with a shape thickening from the end point C2 to the start point C1 instead of the shape thickening from the start point C1 to the end point C2.

4-11. Other Embodiment 11

In the above-described first and second embodiments, the CPU 110 is configured to display the elastic dough-cursor Cs with the shape in which the circle with the radius r1 having the start point as a center is connected to the circle with the radius r2 having the end point as a center.

However, embodiments of the disclosure are not limited thereto. Instead, the CPU 110 may display the elastic dough-cursor Cs so that the width (in this case, the radius r1 and the radius r2) of the elastic dough-cursor Cs becomes thinner, as the length of the elastic dough-cursor Cs is longer.

Figure 30A:
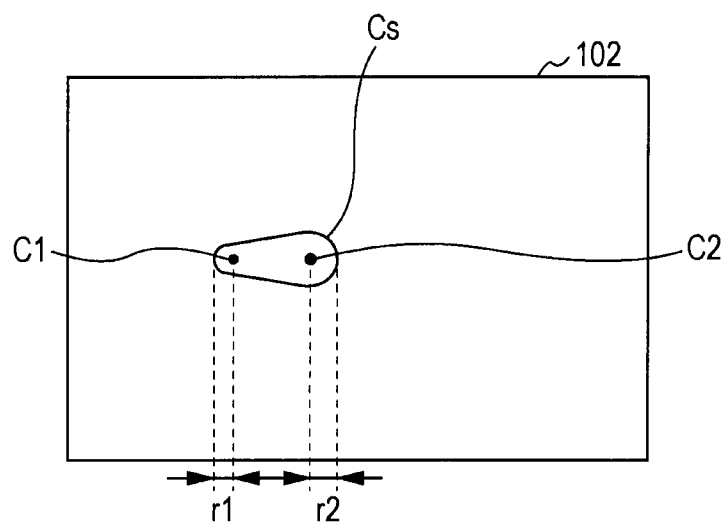
FIGS. 30A and 30B are schematic diagrams illustrating a display (3) of the elastic dough-cursor according to a different embodiment.
Figure 30B:
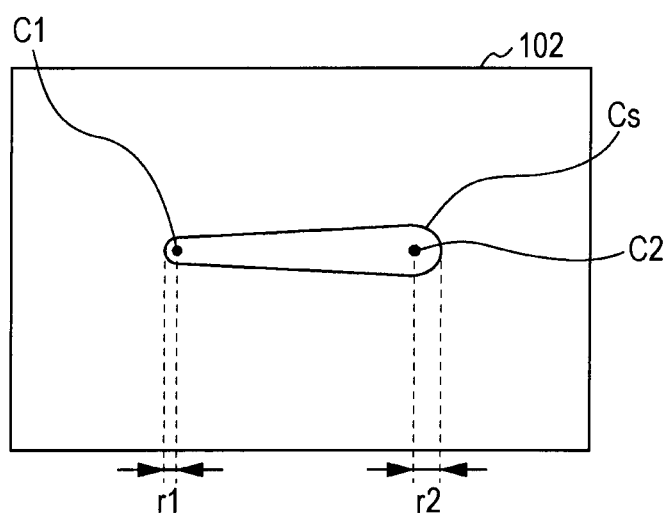

In this case, the elastic dough-cursor Cs may be thinned as the elastic dough-cursor Cs is longer, so that the display area of the elastic dough-cursor Cs is constant even when the length of the elastic dough-cursor Cs is varied. Thus, as shown in FIG. 30A, the elastic dough-cursor Cs becomes thick as a whole when the elastic dough-cursor Cs is relatively short. As shown in FIG. 30B, the elastic dough-cursor Cs becomes thin as a whole when the elastic dough-cursor Cs is longer. Even in this case, the CPU 110 typically sets the radius r2 to be larger than the radius r1 so that the elastic dough-cursor Cs is displayed to have the shape thickening from the start point C1 to the end point C2.

Thus, since the occupation area of the elastic dough-cursor Cs keeps normally constant with respect to the screen, it is possible to prevent a situation where the occupation area of the elastic dough-cursor Cs is larger as the elastic dough-cursor Cs is longer and thus a portion hidden by the elastic dough-cursor Cs is expanded on the screen.

Thus, it is possible to set the minimum size (that is, the size immediately after the start of the dragging) of the elastic dough-cursor Cs to be large so that the portion hidden by the elastic dough-cursor Cs is not considerably expanded.

4-12. Other Embodiment 12

In the above-described first and second embodiments, the CPU 110 is configured to display the elastic dough-cursor Cs in a translucent manner so that a background image of the elastic dough-cursor Cs can be viewed transparently.

However, embodiments of the disclosure are not limited thereto. Instead, the CPU 110 may vary the transmittance of the elastic dough-cursor Cs in accordance with the change in the length of the elastic dough-cursor Cs.

Figure 31A:
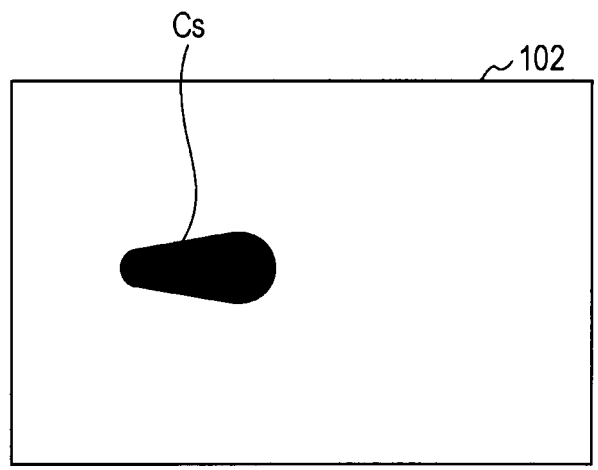
FIGS. 31A and 31B are schematic diagrams illustrating a display (4) of the elastic dough-cursor according to a different embodiment.
Figure 31B:
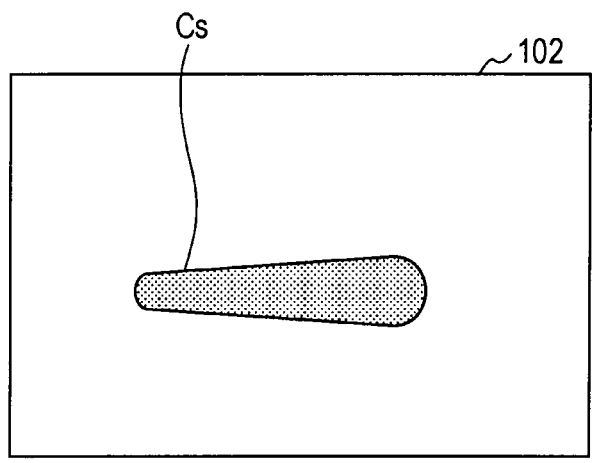

For example, as shown in FIG. 31A, the transmittance of the elastic dough-cursor Cs may become lower as the length of the elastic dough-cursor Cs is shorter. As shown in FIG. 31B, the transmittance of the elastic dough-cursor Cs may become higher as the length of the elastic dough-cursor Cs is longer.

Thus, even when the elastic dough-cursor Cs is longer, it is possible to prevent the background image of the elastic dough-cursor Cs from being rarely viewed. Moreover, when the elastic dough-cursor Cs is shorter, it is possible to prevent the elastic dough-cursor Cs itself from being rarely viewed.

For example, when the length of the elastic dough-cursor Cs is shorter than a predetermined value, the CPU 110 may increase the transmittance of the elastic dough-cursor Cs. When the length of the elastic dough-cursor Cs exceeds the predetermined value, the CPU 110 may decrease the transmittance of the elastic dough-cursor Cs.

However, embodiments of the disclosure are not limited thereto. Instead, the CPU 110 may change the color of the elastic dough-cursor Cs in response to the change in the length of the elastic dough-cursor Cs.

In this case, for example, in the video reproduction app, the value of the reproduction speed of the video is set in accordance with the length of the elastic dough-cursor Cs, as described above. Here, the CPU 110 changes the value of the reproduction speed in response to the change in the length of the elastic dough-cursor Cs and also changes the color of the elastic dough-cursor Cs.

Thus, in the portable terminal 100, the user can recognize the change in the value of the reproduction speed of the video by the change in the color of the elastic dough-cursor Cs.

For example, when one cursor is displayed at each of the start point and the end point of the dragging instead of the elastic dough-cursor Cs, the cursor at the end point is completely hidden by a finger if this cursor is not displayed larger than the finger. Therefore, the user may not recognize the color of the cursor. However, when the cursor is displayed larger than the finger, on the contrary, it is difficult to view the background image of the cursor.

Thus, in the portable terminal 100 according to the embodiments of the disclosure, as described above, the elastic dough-cursor Cs is displayed so as to elongate from the start point to the end point of the dragging. Therefore, even when the elastic dough-cursor Cs is not displayed so as to be larger than the finger, a portion not hidden by the finger occurs. Accordingly, the portable terminal 100 according to the embodiments of the disclosure is configured so that the user can view the portion of the elastic dough-cursor Cs not hidden by his or her finger and thus can recognize the change or the like in the color of the elastic dough-cursor Cs.

However, embodiments of the disclosure are not limited thereto. The CPU 110 may display only the outline of the elastic dough-cursor Cs with a line without coloring the entire elastic dough-cursor Cs. Moreover, the CPU 110 may display a mark (for example, a circular shape or a "x" shape) at the positions of the start point and the end point of the elastic dough-cursor Cs. Thus, the user can recognize the positions of the start point and the end point of the elastic dough-cursor Cs more clearly.

However, embodiments of the disclosure are not limited thereto. The CPU 110 may set the color (filled color or an outline color) of the elastic dough-cursor Cs in accordance with the color of the background image of the elastic dough-cursor Cs. In this case, for example, the CPU 110 sets, as the color of the elastic dough-cursor Cs, the complementary color of the color largely included in the background image of the elastic dough-cursor Cs. Thus, the portable terminal 100 can set the elastic dough-cursor Cs so as not to be hidden in the image and thus can easily view the elastic dough-cursor Cs.

However, embodiments of the disclosure are not limited thereto. The CPU 110 may change the color of the elastic dough-cursor Cs in response to the change in the direction of the elastic dough-cursor Cs.

In this case, for example, in the video reproduction app, the adjustment direction of the volume is set in accordance with the direction of the elastic dough-cursor Cs, as described above. Here, the CPU 110 changes the color of the elastic dough-cursor Cs, when the direction of the elastic dough-cursor Cs is changed from the upward direction to the downward direction or is changed from the downward direction to the upward direction.

Thus, in the portable terminal 100, the user can visually recognize the change in the adjustment direction of the volume due to the change in the color of the elastic dough-cursor Cs.

For example, in the video reproduction app, as described above, the reproduction speed of the video is controlled when the direction of the elastic dough-cursor Cs is the horizontal direction. The adjustment speed is controlled when the direction of the elastic dough-cursor Cs is the vertical direction. Here, the CPU 110 changes the color of the elastic dough-cursor Cs, when the direction of the elastic dough-cursor Cs is changed from the vertical direction to the horizontal direction or is changed from the horizontal direction to the vertical direction.

Thus, due to the change in the color of the elastic dough-cursor Cs, the user can visually recognize that the input operation executed with the elastic dough-cursor Cs is changed from the control of the reproduction speed to the control of the adjustment speed of the volume or is changed from the control of the adjustment speed of the volume to the control of the reproduction speed.

However, embodiments of the disclosure are not limited thereto. Instead, the CPU 110 may change the color of the elastic dough-cursor Cs in response to the change in a process performed in response to the input operation executed with the elastic dough-cursor Cs.

In this case, for example, in the video reproduction app, as described above, the display contents are transitioned from the chapters to the chapter list when the end point of the elastic dough-cursor Cs comes out of the middle region 200B of the screen. At this time, the CPU 110 changes the process performed in response to the input operation executed with the elastic dough-cursor Cs from the control of the reproduction speed of the chapters to the control of the scroll speed of the chapter list and also changes the color of the elastic dough-cursor Cs.

Thus, in the portable terminal 100, the user can visually recognize the change in the process performed in response to the input operation executed with the elastic dough-cursor Cs due to the change in the color of the elastic dough-cursor Cs.

4-13. Other Embodiment 13

In the above-described first embodiment, when the dragging ends, it is configured that the CPU 110 approaches the end point of the elastic dough-cursor Cs to the start point thereof, shrinks the elastic dough-cursor Cs having elongated up to the circle shape, and then deletes the elastic dough-cursor Cs from the screen.

However, embodiments of the disclosure are not limited thereto. Instead, the CPU 110 may shrink the elastic dough-cursor Cs from the end point to the start point, display an animation effect (for example, of repeating oscillation several times) of bouncing an elastic portion, and delete the elastic dough-cursor Cs from the screen.

However, embodiments of the disclosure are not limited thereto. Instead, the CPU 110 may delete the elastic dough-cursor Cs from the screen without shrinking the elastic dough-cursor Cs, when the dragging ends.

4-14. Other Embodiment 14

In the above-described second embodiment, it is configured that when the end point of the dragging comes out of the middle region 230A in the map display app, the mode is transitioned to the elastic dough-scroll mode and the scroll speed of the map image is controlled by the input operation executed with the elastic dough-cursor Cs.

However, embodiments of the disclosure are not limited thereto. Instead, in the map display app, when the dragging is executed with no position of the end point of the dragging, the elastic dough-scroll mode may typically be set and the scroll speed of the map image may be controlled by the input operation executed with the elastic dough-cursor Cs.

Figure 32:
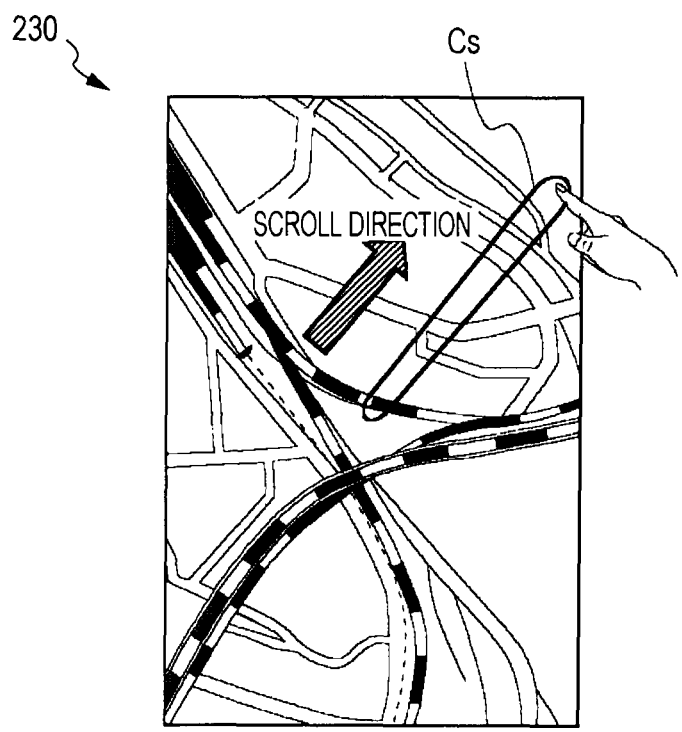
FIG. 32 is a schematic diagram illustrating an example of an input operation (1) executed with the elastic dough-cursor in a map display app according to a different embodiment.

In this case, when the dragging is executed, as shown in FIG. 32, the CPU 110 displays the elastic dough-cursor Cs in response to the dragging. Then, the CPU 110 sets the same direction as the direction of the elastic dough-cursor Cs being displayed, as the scroll direction of the map image, and sets the value of the scroll speed to be larger, as the length of the elastic dough-cursor Cs is longer.

However, embodiments of the disclosure are not limited thereto. The normal scroll mode and the elastic dough-scroll mode may newly be changed depending on whether the start point of the dragging is within a predetermined region of the screen.

Figure 33C:
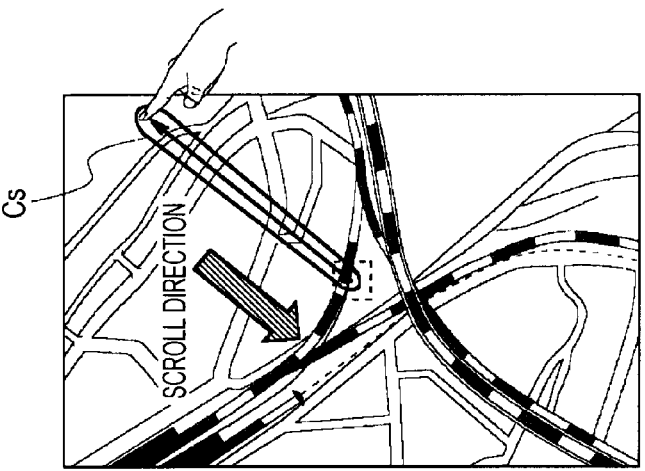
FIGS. 33A to 33C are schematic diagrams illustrating an example of an input operation (2) executed with the elastic dough-cursor in a map display app according to a different embodiment.
Figure 33B:
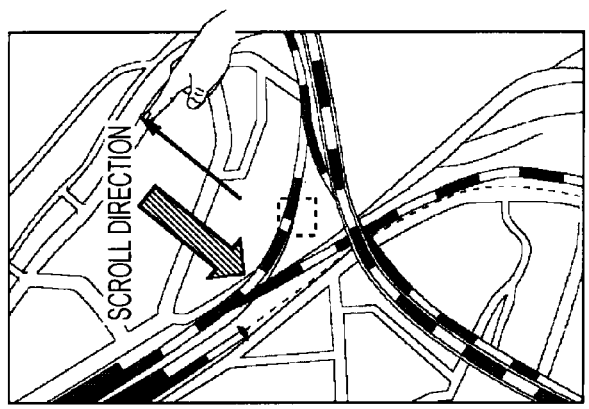
Figure 33A:
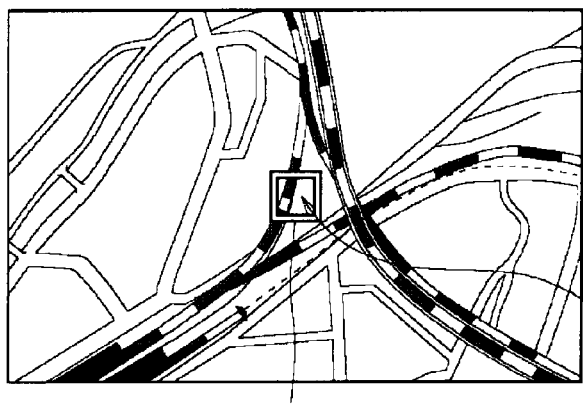

In this case, as shown in FIG. 33A, for example, a middle region 230C which a rectangular region with a size slightly protruding from a finger is set in the middle of the map screen 230. When the map display app is operated, the CPU 110 displays the map image on the map screen 230 and displays a frame Fr2 indicating the middle region 230C.

When the dragging is executed, the CPU 110 determines whether the start point of the dragging is within the middle region 230C of the screen.

When the start point of the dragging is out of the middle region 230C, as shown in FIG. 33B, the CPU 110 sets the normal scroll mode as the scroll mode and deletes the frame Fr2 from the screen.

Then, the CPU 110 controls the scroll of the map image in accordance with the direction and the length of the dragging. Specifically, the CPU 110 scrolls the map image in a direction opposite to the direction of the dragging by a distance corresponding to the length of the dragging.

On the other hand, when the start point of the dragging is within the middle region 230C, as shown in FIG. 33C, the CPU 110 sets the elastic dough-scroll mode as the scroll mode. At this time, the CPU 110 deletes the frame Fr2 from the screen and displays the elastic dough-cursor Cs elongating from the start point to the end point of the dragging on the screen.

When the elastic dough-cursor Cs is displayed, the CPU 110 controls the scroll of the map image in accordance with the direction and the length of the elastic dough-cursor Cs.

Specifically, the CPU 110 sets, as the scroll direction of the map image, the direction opposite to the direction of the elastic dough-cursor Cs being displayed. Further, the CPU 110 sets the value of the scroll speed to be larger, as the length of the elastic dough-cursor Cs is longer.

When the dragging ends, the CPU 110 ends the scroll of the map image. When the elastic dough-cursor Cs is displayed, the CPU 110 deletes the elastic dough-cursor Cs from the screen and displays the frame Fr2 again.

Thus, the CPU 110 performs scroll control by general dragging when the start point of the dragging is out of the middle region 230C. On the contrary, the CPU 110 controls the scroll speed executed with the elastic dough-cursor Cs when the start point of the dragging is within the middle region 230C.

Thus, in the portable terminal 100, the user can execute a simple operation of changing the start point of the dragging to select the scroll control performed by the general dragging or the control of the scroll speed performed with the elastic dough-cursor Cs.

4-15. Other Embodiment 15

In the above-described first embodiment, in the music reproduction app, the scroll direction of the track list is set to be opposite to the direction of the elastic dough-cursor Cs.

However, embodiments of the disclosure are not limited thereto. Instead, in the music reproduction app, the scroll direction of the track list may be set to be the same as the direction of the elastic dough-cursor Cs.

However, embodiments of the disclosure are not limited thereto. Instead, in another app, the scroll direction may be set to the same as the direction of the elastic dough-cursor Cs. Alternatively, the scroll direction may be set to be opposite to the direction of the elastic dough-cursor Cs. In other words, whether the scroll direction is set to be the same as the direction of the elastic dough-cursor Cs or to be opposite to the direction of the elastic dough-cursor Cs is appropriately determined appropriately depending on each app.

4-16. Other Embodiment 16

In the above-described first and second embodiments, the portable terminal 100 serving as the information processing apparatus is configured to include, the touch screen 102 serving as the operation unit and the display unit and the CPU 110 serving as the control unit.

However, embodiments of the disclosure are not limited thereto. The respective function units (the operation unit, the display unit, and the control unit) of the above-described portable terminal 100 may be configured by various different hardware units, as long as the same functions are provided.

4-17. Other Embodiment 17

In the above-described first and second embodiments, programs for executing various kinds of processes are stored in the non-volatile memory 111 of the portable terminal 100.

However, embodiments of the disclosure are not limited thereto. For example, the portable terminal 100 may be provided with a slot for a storage medium such as a memory card and the CPU 110 reads the programs from the storage medium inserted into the slot to execute the programs. Further, the CPU 110 may install the programs read from the storage medium in the non-volatile memory 111. Furthermore, the CPU 110 may download the programs from an apparatus on a network via the network interface 113 and install the downloaded programs in the non-volatile memory 111.

4-18. Other Embodiment 18

The embodiments of the disclosure are not limited to the first and second embodiments and the other embodiments described above. That is, parts or the entirety of the above-described first and second embodiments and other embodiments may be combined arbitrarily or parts thereof may be extracted within the scope of the disclosure.

The present disclosure contains subject matter related to that disclosed in Japanese Priority Patent Application JP 2010-172893 filed in the Japan Patent Office on Jul. 30, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a control unit configured to perform a process corresponding to dragging and displaying, on a display screen, a cursor which elastically elongates between a first point related to a start point of the dragging and a second point related to an end point of the dragging and of which at least one of a size and a shape is different at one end portion, which is on a side of the start point of the dragging, and at the other end portion, which is on a side of the end point of the dragging, when the dragging is executed through an operation unit,
wherein the control unit thins the cursor, as the cursor is longer,
wherein, when the dragging ends, the control unit is further configured to perform a process corresponding to transforming the elastically elongated cursor by shrinking the cursor and displaying, on the display screen, an animation effect of retracting an elongated portion of the cursor back to the first point related to the start point of the dragging and of bouncing an elastic portion, and then deleting the cursor, and
wherein the control unit is implemented via a processor.

2. The information processing apparatus according to claim 1, wherein the control unit displays the cursor with the shape thickening from the one end portion to the other end portion.

3. The information processing apparatus according to claim 1, wherein the control unit thins the cursor so that a display area of the cursor keeps constant, as the cursor is longer.

4. The information processing apparatus according to claim 1, wherein the control unit displays the cursor with a shape connecting a first circle that has the start point of the dragging as a center to a second circle that is larger than the first circle and has the end point of the dragging as a center.

5. The information processing apparatus according to claim 1, wherein the control unit displays the cursor in response to the dragging and changes a color of the displayed cursor when the process is newly changed.

6. The information processing apparatus according to claim 1, wherein the control unit displays the cursor in response to the dragging and changes a color of the cursor in response to a change in at least one of a direction from the one end portion of the displayed cursor to the other end portion of the displayed cursor and a length of the cursor.

7. The information processing apparatus according to claim 1, wherein the control unit changes transmittance of the cursor in response to the change in the length of the cursor.

8. The information processing apparatus according to claim 1, wherein the control unit displays the cursor with the shape thickening from the other end portion to the one end portion.

9. The information processing apparatus according to claim 1, wherein the control unit displays the cursor with a shape connecting a first circle that has the start point of the dragging as a center to a second circle that is smaller than the first circle and has the end point of the dragging as a center.

10. The information processing apparatus according to claim 1, wherein the control unit thins a width of the cursor in a direction the cursor becomes longer.

11. The information processing apparatus according to claim 1, wherein after the animation effect is displayed on the display screen, the cursor is displayed to have a same size and a same display location as prior to being elastically elongated by the dragging.

12. A display control method comprising:
performing a process corresponding to dragging and displaying, on a display screen, a cursor which elastically elongates between a first point related to a start point of the dragging and a second point related to an end point of the dragging and of which at least one of a size and a shape is different at one end portion, which is on a side of the start point of the dragging, and at the other end portion, which is on a side of the end point of the dragging, when the dragging is executed through an operation unit,
wherein the cursor is thinned as the cursor becomes longer, and
wherein, when the dragging ends, the elastically elongated cursor is transformed by shrinking the cursor and displaying, on the display screen, an animation effect of retracting an elongated portion of the cursor back to the first point related to the start point of the dragging and of bouncing an elastic portion, and then deleting the cursor.

13. A non-transitory computer readable medium having embodied thereon a display control program, which when executed by a computer causes the computer to perform a method, the method comprising:

performing a process corresponding to dragging and displaying, on a display screen, a cursor which elastically elongates between a first point related to a start point of the dragging and a second point related to an end point of the dragging and of which at least one of a size and a shape is different at one end portion, which is on a side of the start point of the dragging, and at the other end portion, which is on a side of the end point of the dragging, when the dragging is executed through an operation unit, wherein the cursor is thinned as the cursor becomes longer, and wherein, when the dragging ends, the elastically elongated cursor is transformed by shrinking the cursor and displaying, on the display screen, an animation effect of retracting an elongated portion of the cursor back to the first point related to the start point of the dragging and of bouncing an elastic portion, and then deleting the cursor.

14. An information processing apparatus comprising:

a control unit performing a process corresponding to a dragging, on a display screen, wherein when the dragging is executed through an operation unit, a displayed cursor is elastically elongated between a first point related to a start point and a second point related to an end point and at least one of a width and a shape is different at one end portion of the cursor, which corresponds to a start point of the dragging, and at another end portion of the cursor, which corresponds to an end point of the dragging, wherein the control unit thins the cursor, as the cursor is longer, wherein, when the dragging ends, the control unit is further configured to perform a process corresponding to transforming the elastically elongated cursor by shrinking the cursor and displaying, on the display screen, an animation effect of retracting an elongated portion of the displayed cursor back to the first point related to the start point and of bouncing an elastic portion, and then deleting the cursor, and wherein the control unit is implemented via a processor.

15. A display control method comprising:

performing a process corresponding to a dragging, on a display screen, wherein when the dragging is executed through an operation unit, a displayed cursor is elastically elongated between a first point related to a start point and a second point related to an end point and at least one of a width and a shape is different at one end portion of the cursor, which corresponds to a start point of the dragging, and at another end portion, which corresponds to an end point of the dragging, wherein the cursor is thinned as the cursor becomes longer, and wherein, when the dragging ends, the elastically elongated cursor is transformed by shrinking the cursor and displaying, on the display screen, an animation effect of retracting an elongated portion of the displayed cursor back to the first point related to the start point and of bouncing an elastic portion, and then deleting the cursor.

16. A non-transitory computer readable medium having embodied thereon a display control program, which when executed by a computer causes the computer to perform a method, the method comprising:

performing a process corresponding to a dragging, on a display screen, wherein when the dragging is executed through an operation unit, a displayed cursor is elastically elongated between a first point related to a start point and a second point related to an end point and at least one of a width and a shape is different at one end portion of the cursor, which corresponds to a start point of the dragging, and at another end portion, which corresponds to an end point of the dragging, wherein the cursor is thinned as the cursor becomes longer, and wherein, when the dragging ends, the elastically elongated cursor is transformed by shrinking the cursor and displaying, on the display screen, an animation effect of retracting an elongated portion of the displayed cursor back to the first point related to the start point and of bouncing an elastic portion, and then deleting the cursor.

* * * * *